US009183466B2

(12) United States Patent
Siskind et al.

(10) Patent No.: US 9,183,466 B2
(45) Date of Patent: Nov. 10, 2015

(54) CORRELATING VIDEOS AND SENTENCES

(71) Applicant: Purdue Research Foundation, West Lafayette, IN (US)

(72) Inventors: Jeffrey Mark Siskind, West Lafayette, IN (US); Andrei Barbu, Cambridge, MA (US); Siddharth Narayanaswamy, West Lafayette, IN (US); Haonan Yu, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 231 days.

(21) Appl. No.: 14/099,300

(22) Filed: Dec. 6, 2013

(65) Prior Publication Data

US 2014/0369596 A1 Dec. 18, 2014

Related U.S. Application Data

(60) Provisional application No. 61/835,541, filed on Jun. 15, 2013.

(51) Int. Cl.
| | |
|---|---|
| *G06K 9/62* | (2006.01) |
| *G06K 9/72* | (2006.01) |
| *G06K 9/00* | (2006.01) |
| *G06F 17/30* | (2006.01) |

(52) U.S. Cl.
CPC ............ *G06K 9/723* (2013.01); *G06F 17/3079* (2013.01); *G06F 17/30793* (2013.01); *G06K 9/00751* (2013.01); *G06K 9/00771* (2013.01); *G06K 9/6297* (2013.01)

(58) Field of Classification Search
None
See application file for complete search history.

(56) References Cited

U.S. PATENT DOCUMENTS

| | | | |
|---|---|---|---|
| 5,835,667 | A | 11/1998 | Wactlar et al. |
| 6,445,834 | B1 | 9/2002 | Rising, III |
| 6,845,485 | B1 | 1/2005 | Shastri et al. |
| 8,489,987 | B2 | 7/2013 | Erol et al. |
| 2006/0112028 | A1* | 5/2006 | Xiao .................. G06N 3/08 706/15 |
| 2007/0209025 | A1 | 9/2007 | Jing et al. |
| 2009/0254515 | A1 | 10/2009 | Terheggen et al. |

OTHER PUBLICATIONS

Motwani, Tanvi S. et al., "Improving Video Activity Recognition using Object Recognition and Text Mining," in the Proceedings of the 20th European Conference on Artificial Intelligence (ECAI-2012), Aug. 2012, 6 pgs.

* cited by examiner

*Primary Examiner* — Utpal Shah
*Assistant Examiner* — Mai Tran
(74) *Attorney, Agent, or Firm* — Lee & Hayes, PLLC; Christopher J. White

(57) ABSTRACT

A method of testing a video against an aggregate query includes automatically receiving an aggregate query defining participant(s) and condition(s) on the participant(s). Candidate object(s) are detected in the frames of the video. A first lattice is constructed for each participant, the first-lattice nodes corresponding to the candidate object(s). A second lattice is constructed for each condition. An aggregate lattice is constructed using the respective first lattice(s) and the respective second lattice(s). Each aggregate-lattice node includes a scoring factor combining a first-lattice node factor and a second-lattice node factor. respective aggregate score(s) are determined of one or more path(s) through the aggregate lattice, each path including a respective plurality of the nodes in the aggregate lattice, to determine whether the video corresponds to the aggregate query. A method of providing a description of a video is also described and includes generating a candidate description with participant(s) and condition(s) selected from a linguistic model; constructing component lattices for the participant(s) or condition(s), producing an aggregate lattice having nodes combining component-lattice factors, and determining a score for the video with respect to the candidate description by determining an aggregate score for a path through the aggregate lattice. If the aggregate score does not satisfy a termination condition, participant(s) or condition(s) from the linguistic model are added to the condition, and the process is repeated. A method of testing a video against an aggregate query by mathematically optimizing a unified cost function is also described.

19 Claims, 33 Drawing Sheets

THE PERSON PICKED UP THE TRAFFIC CONE TO THE LEFT OF THE STOOL

THE PERSON PICKED UP THE TRAFFIC CONE.

THE PERSON CARRIED THE CHAIR.

THE CHAIR APPROACHED THE TRAFFIC CONE SLOWLY.

THE PERSON CARRIED THE CHAIR AWAY FROM THE BACKPACK.

THE CHAIR APPROACHED THE BACKPACK.

CORRELATING VIDEOS AND SENTENCES

CROSS-REFERENCE TO RELATED APPLICATIONS

This nonprovisional application claims the benefit of U.S. Provisional Patent Application Ser. No. 61/835,541, filed Jun. 15, 2013, and entitled "Grounded Language Learning from Video Described with Sentences," the entirety of which is incorporated herein by reference.

STATEMENT OF FEDERALLY SPONSORED RESEARCH OR DEVELOPMENT

This invention was made with government support under Contract No. W911NF-10-2-0060 awarded by the Defense Advanced Research Projects Agency (DARPA). The government has certain rights in the invention.

INCORPORATION-BY-REFERENCE OF MATERIAL SUBMITTED BY EFS-WEB

A computer program listing appendix is submitted with this patent document by the Office's electronic filing system (EFS-Web) in one text file. All material in the computer program listing appendix, including all material in the text file, is incorporated by reference herein. The computer program listing appendix includes a copyrighted plain-text file that includes a computer source code listing in the Scheme programming language for carrying out various methods described herein. The file has an original filename of p3066050.txt, is dated Dec. 5, 2013, and has a file size of 29,836 bytes. The text file is a Microsoft Windows (or DOS) compatible ASCII-encoded file in IBM-PC machine format which may be opened with a plain text editor, uses DOS-standard line terminators (ASCII Carriage Return plus Line Feed), is not dependent on control characters or codes which are not defined in the ASCII character set, and is not compressed.

COPYRIGHT NOTICE AND AUTHORIZATION

A portion of the disclosure of this patent document contains material which is subject to copyright protection. The copyright owner has no objection to the facsimile reproduction by anyone of the patent document or the patent disclosure material, as it appears in the Patent and Trademark Office patent file or records, but otherwise reserves all copyright rights whatsoever.

BACKGROUND

People learn language through exposure to a rich perceptual context. Language is grounded by mapping words, phrases, and sentences to meaning representations referring to the world.

It has been shown that even with referential uncertainty and noise, a system based on cross-situational learning can robustly acquire a lexicon, mapping words to word-level meanings from sentences paired with sentence-level meanings. However, it did so only for symbolic representations of word- and sentence-level meanings that were not perceptually grounded. An ideal system would not require detailed word-level labelings to acquire word meanings from video but rather could learn language in a largely unsupervised fashion, just as a child does, from video paired with sentences.

There has been research on grounded language learning. It has been shown to pair training sentences with vectors of real-valued features extracted from synthesized images which depict 2D blocks-world scenes, to learn a specific set of features for adjectives, nouns, and adjuncts.

It has been shown to pair training images containing multiple objects with spoken name candidates for the objects to find the correspondence between lexical items and visual features.

It has been shown to pair narrated sentences with symbolic representations of their meanings, automatically extracted from video, to learn object names, spatial-relation terms, and event names as a mapping from the grammatical structure of a sentence to the semantic structure of the associated meaning representation.

It has been described to learn the language of sportscasting by determining the mapping between game commentaries and the meaning representations output by a rule-based simulation of the game.

It has been presented that Montague-grammar representations of word meanings can be learned together with a combinatory categorial grammar (CCG) from child-directed sentences paired with first-order formulas that represent their meaning.

Although most of these methods succeed in learning word meanings from sentential descriptions they do so only for symbolic or simple visual input (often synthesized); they fail to bridge the gap between language and computer vision, i.e., they do not attempt to extract meaning representations from complex visual scenes. On the other hand, there has been research on training object and event models from large corpora of complex images and video in the computer-vision community. However, most such work requires training data that labels individual concepts with individual words (i.e., objects delineated via bounding boxes in images as nouns and events that occur in short video clips as verbs).

Reference is made to: U.S. Pat. No. 5,835,667 to Wactlar et al., issued Nov. 10, 1998; U.S. Pat. No. 6,445,834 to Rising, III, issued Sep. 3, 2002; U.S. Pat. No. 6,845,485 to Shastri et al., issued Jan. 18, 2005; U.S. Pat. No. 8,489,987 to Erol et al., issued Jul. 16, 2013; US2007/0209025 by Jing et al., published Sep. 6, 2007; and US2009/0254515 by Terheggen et al., published Oct. 8, 2009, the disclosure of each of which is incorporated herein by reference. Reference is also made to "Improving Video Activity Recognition using Object Recognition and Text Mining" by Tanvi S. Motwani and Raymond J. Mooney, in the Proceedings of the 20th European Conference on Artificial Intelligence (ECAI-2012), August 2012.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

Figure 1A:
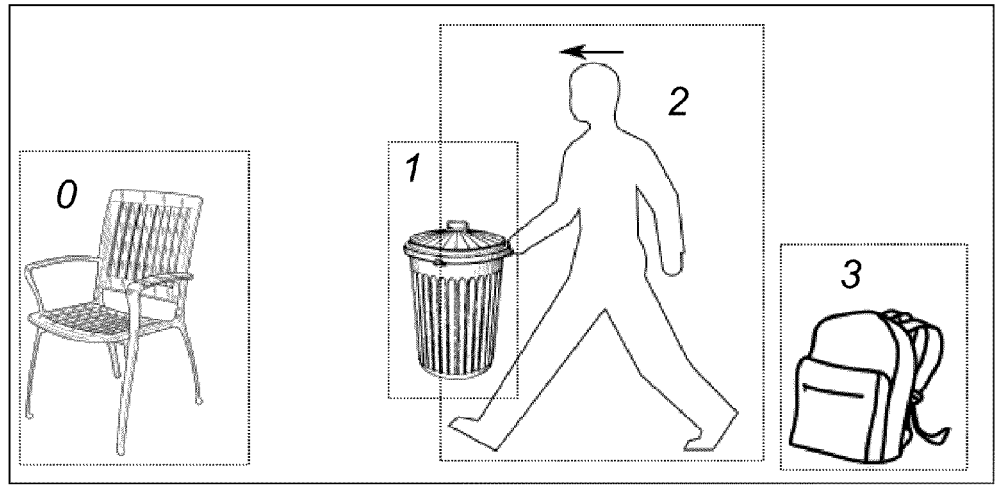
FIGS. 1A and 1B show an exemplary frame of video and a representative sentence.

The attached drawings are for purposes of illustration and are not necessarily to scale.

DETAILED DESCRIPTION

Throughout this description, some aspects are described in terms that would ordinarily be implemented as software programs. Those skilled in the art will readily recognize that the equivalent of such software can also be constructed in hardware, firmware, or micro-code. Because data-manipulation algorithms and systems are well known, the present description is directed in particular to algorithms and systems forming part of, or cooperating more directly with, systems and methods described herein. Other aspects of such algorithms and systems, and hardware or software for producing and otherwise processing signals or data involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

The notation "<<name>>" used herein serves only to highlight relationships between various quantites and is not limiting.

Various aspects relate to Grounded Language Learning from Video Described with Sentences.

Unlike prior schemes, various aspects advantageously model phrasal or sentential meaning or acquire the object or event models from training data labeled with phrasal or sentential annotations. Moreover, various aspects advantageously use distinct representations for different parts of speech; e.g., object and event recognizers use different representations.

Presented is a method that learns representations for word meanings from short video clips paired with sentences. Unlike prior findings on learning language from symbolic input, the present input includes video of people interacting with multiple complex objects in outdoor environments. Unlike prior computer-vision approaches that learn from videos with verb labels or images with noun labels, the present labels are sentences containing nouns, verbs, prepositions, adjectives, and adverbs. The correspondence between words and concepts in the video is learned in an unsupervised fashion, even when the video depicts simultaneous events described by multiple sentences or when different aspects of a single event are described with multiple sentences. The learned word meanings can be subsequently used to automatically generate description of new video. Presented is a method that learns representations for word meanings from short video clips paired with sentences. Various aspects differ from prior research in at least three ways. First, the input is made up of realistic video filmed in an outdoor environment. Second, the entire lexicon, including nouns, verbs, prepositions, adjectives, and adverbs, simultaneously from video described with whole sentences. Third, a uniform representation is adopted for the meanings of words in all parts of speech, namely Hidden Markov Models (HMMs) whose states and distributions allow for multiple possible interpretations of a word or a sentence in an ambiguous perceptual context.

The following representation is employed to ground the meanings of words, phrases, and sentences in video clips. An object detector is run first on each video frame to yield a set of detections, each a subregion of the frame. In principle, the object detector need just detect the objects rather than classify them. In practice, a collection of class-, shape-, pose-, and viewpoint-specific detectors is employed and pool the detections to account for objects whose shape, pose, and viewpoint may vary over time. The presented methods can learn to associate a single noun with detections produced by multiple detectors. Detections from individual frames are strung together to yield tracks for objects that temporally span the video clip. Associate a feature vector with each frame (detection) of each such track. This feature vector can encode image features (including the identity of the particular detector that produced that detection) that correlate with object class; region color, shape, and size features that correlate with object properties; and motion features, such as linear and angular object position, velocity, and acceleration, that correlate with event properties. Computing features between pairs of tracks to encode the relative position and motion of the pairs of objects that participate in events that involve two participants is also possible. In principle, computing features between tuples of any number of tracks can be done.

The meaning of an intransitive verb, like "jump", can be represented as a two-state HMM over the velocity-direction feature, modeling the requirement that the participant move upward then downward. The meaning of a transitive verb is represented, like "pick up", as a two-state HMM over both single-object and object-pair features: the agent moving toward the patient while the patient is as rest, followed by the agent moving together with the patient. This general approach is extended to other parts of speech. Nouns, like "person", can be represented as one-state HMMs over image features that correlate with the object classes denoted by those nouns. Adjectives, like "red", "round", and "big", can be represented as one-state HMMs over region color, shape, and size features that correlate with object properties denoted by such adjectives. Adverbs, like "quickly", can be represented as one-state HMMs over object-velocity features. Intransitive prepositions, like "leftward", can be represented as one-state HMMs over velocity-direction features. Static transitive prepositions, like "to the left of", can be represented as one-state HMMs over the relative position of a pair of objects. Dynamic transitive prepositions, like "towards", can be represented as HMMs over the changing distance between a pair of objects. Note that with this formulation, the representation of a verb, like "approach", might be the same as a dynamic transitive preposition, like "towards". While it might seem like overkill to represent the meanings of words as one-state-HMMs, in practice, such concepts are often encoded with multiple states to allow for temporal variation in the associated features due to changing pose and viewpoint as well as deal with noise and occlusion. Moreover, the general framework of modeling word meanings as temporally variant time series via multi-state HMMs allows denominalized verbs to be modeled, i.e., nouns that denote events, as in "The jump was fast".

The HMMs are parameterized with varying arity. Some, like jump($\alpha$), person($\alpha$), red($\alpha$), round($\alpha$), big($\alpha$), quickly ($\alpha$), and leftward($\alpha$) have one argument, while others, like pick-up($\alpha,\beta$), to-the-left-of($\alpha,\beta$), and towards($\alpha,\beta$), have two arguments (In principle, any arity can be supported.) HMMs are instantiated by mapping their arguments to tracks. This involves computing the associated feature vector for that HMM over the detections in the tracks chosen to fill its arguments. This is done with a two-step process to support compositional semantics. The meaning of a multi-word phrase or sentence is represented as a joint likelihood of the HMMs for the words in that phrase or sentence. Compositionality is handled by linking or coindexing the arguments of the conjoined HMMs. Thus a sentence like "The person to the left of the backpack approached the trash-can" would be represented as a conjunction of person($p_0$), to-the-left-of($p_0$, $p_1$), backback($p_1$), approached($p_0$, $p_2$), and trash-can($p_2$) over the three participants $p_0$, $p_1$, and $p_2$. This whole sentence is then grounded in a particular video by mapping these participants to particular tracks and instantiating the associated HMMs over those tracks, by computing the feature vectors for each HMM from the tracks chosen to fill its arguments.

Various aspects described herein make six assumptions. First, for example, conclude that the part of speech $C_m$ associated with each lexical entry m is known, along with the part-of-speech dependent number of states $I_c$ in the HMMs used to represent word meanings in that part of speech, the part-of-speech dependent number of features $N_c$ in the feature vectors used by HMMs to represent word meanings in that part of speech, and the part-of-speech dependent feature-vector computation $\Phi_c$ used to compute the features used by HMMs to represent word meanings in that part of speech. Second, individual sentences are paired each with a short video clip that depicts that sentence. The algorithm is not able to determine the alignment between multiple sentences and longer video segments. Note that there is no requirement that the video depict only that sentence. Other objects may be present and other events may occur. In fact, nothing precludes a training corpus with multiple copies of the same video, each paired with a different sentence describing a different aspect of that video. Moreover, the algorithm potentially can handle a small amount of noise, where a video clip is paired with an incorrect sentence that the video does not depict. Third, conclude that (pre-trained) low-level object detectors capable of detecting instances of the target event participants in individual frames of the video have been found. Such detections are allowed to be unreliable; the method can handle a moderate amount of false positives and false negatives. It is not necessary to know the mapping from these object-detection classes to words; the algorithm determines that. Fourth, it is concluded that the arity of each word in the corpus is known, i.e., the number of arguments that that word takes. For example, if it is known that the word person($\alpha$) takes one argument and the word approached($\alpha,\beta$) takes two arguments. Fifth, that it is known that the total number of distinct participants that collectively fill all of the arguments for all of the words in each training sentence is known. For example, for the sentence "The person to the left of the backpack approached the trash-can", it can be that it is known that there are three distinct objects that participate in the event denoted. Sixth, it can be thought that it is known the "argument-to-participant mapping" for each training sentence. Thus, for example, for the above sentence it would be known person ($p_0$), to-the-left-of($p_0$, $p_1$), backback($p_1$), approached($p_0$, $p_2$), and trash-can($p_2$). The latter two items can be determined by parsing the sentence, which is what is done. It can be imagined that learning the ability to automatically perform the latter two items, and even the fourth item above, by learning the grammar and the part of speech of each word, such as done by some prior schemes.

Figure 14:
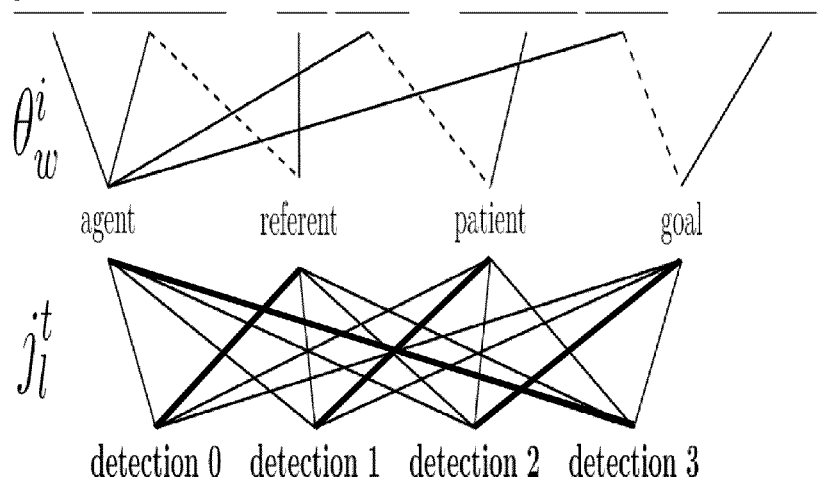
FIG. 14 shows an illustration of an exemplary linking function used by the sentence tracker.

FIG. 14 illustrates a single frame from a potential training sample provided as input to the learner. It includes a video clip paired with a sentence, where the arguments of the words in the sentence are mapped to participants. From a sequence of such training samples, the learner determines the objects tracks and the mapping from participants to those tracks, together with the meanings of the words.

Below are described: lexical acquisition from video; various aspects of the sentence tracker, a method for jointly tracking the motion of multiple objects in a video that participate in a sententially-specified event; using the sentence tracker to support lexical acquisition; and an example of this lexical acquisition algorithm.

Figure 1B:
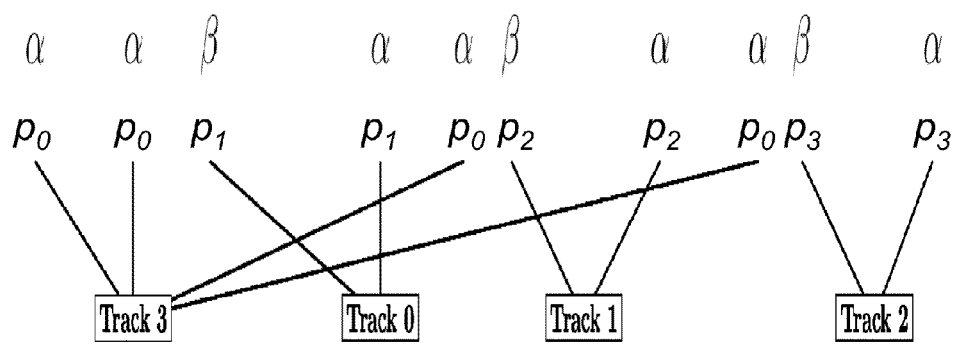

FIGS. 1A and 1B show an illustration of a problem to be solved. FIG. 1A is a graphical representation of an exemplary frame of video including image data of a chair (participant 0 or $p_0$), a trash can (participant 1), a person (participant 2) carrying the trash can, and a backpack (participant 3). Dotted boxes represent object detections of each of the participants.

FIG. 1B is a diagram of a representative sentence. Each word in the sentence has one or more arguments ($\alpha$ and possibly $\beta$), each argument of each word is assigned to a participant ($p_0, \ldots, p_3$) in the event described by the sentence, and each participant can be assigned to any object track in the video. This figure shows a possible (but erroneous) interpretation of the sentence where the mapping is: $p_0 \mapsto$ Track 3, $p_1 \mapsto$ Track 0, $p_2 \mapsto$ Track 1, and $p_3 \mapsto$ Track 2, which might (incorrectly) lead the learner to conclude that the word "person" maps to the backpack, the word "backpack" maps to the chair, the word "trash-can" maps to the trash-can, and the word "chair" maps to the person.

Various aspects relate to scoring a video/query pair. Recognition of words can be linked with tracking, e.g., by forming a cross-product of tracker lattices and event-recognizer lattices. Such cross-products and other unified cost functions can be used to co-optimize the selection of per-frame object detections so that the selected detections depict a track and the track depicts a word or event.

Figure 21:
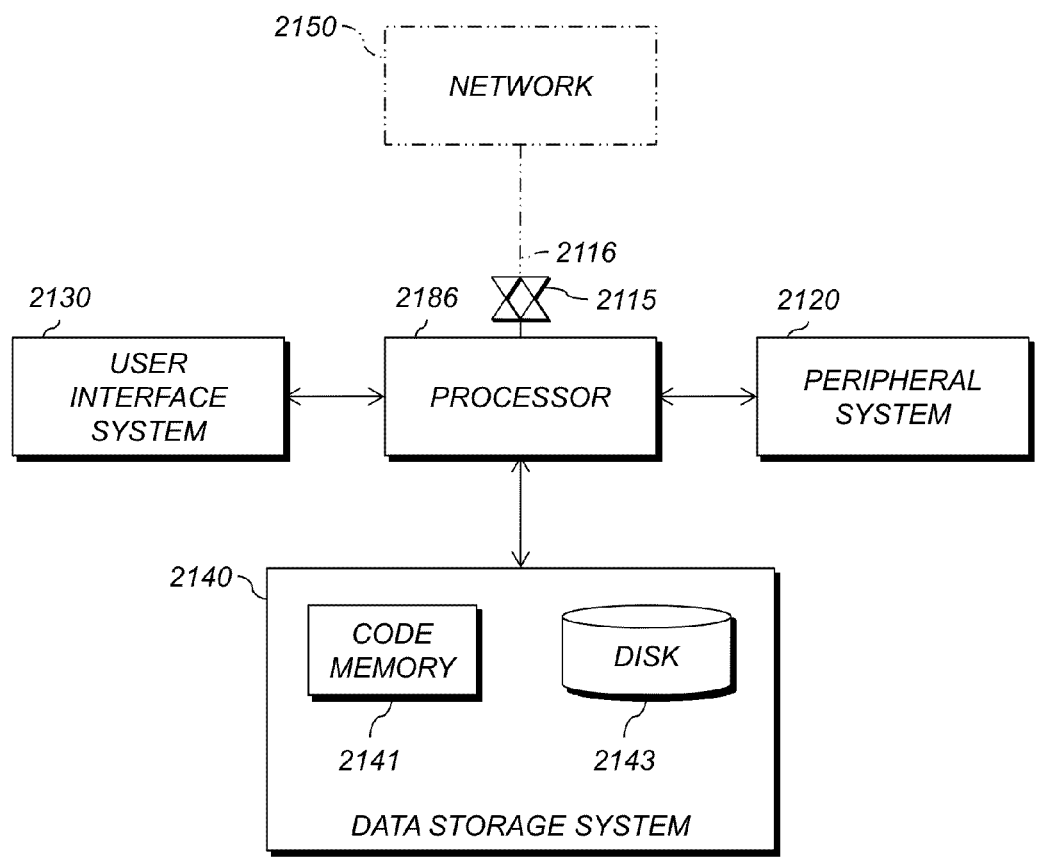
FIG. 21 is a high-level diagram showing components of a data-processing system.
Figure 22:
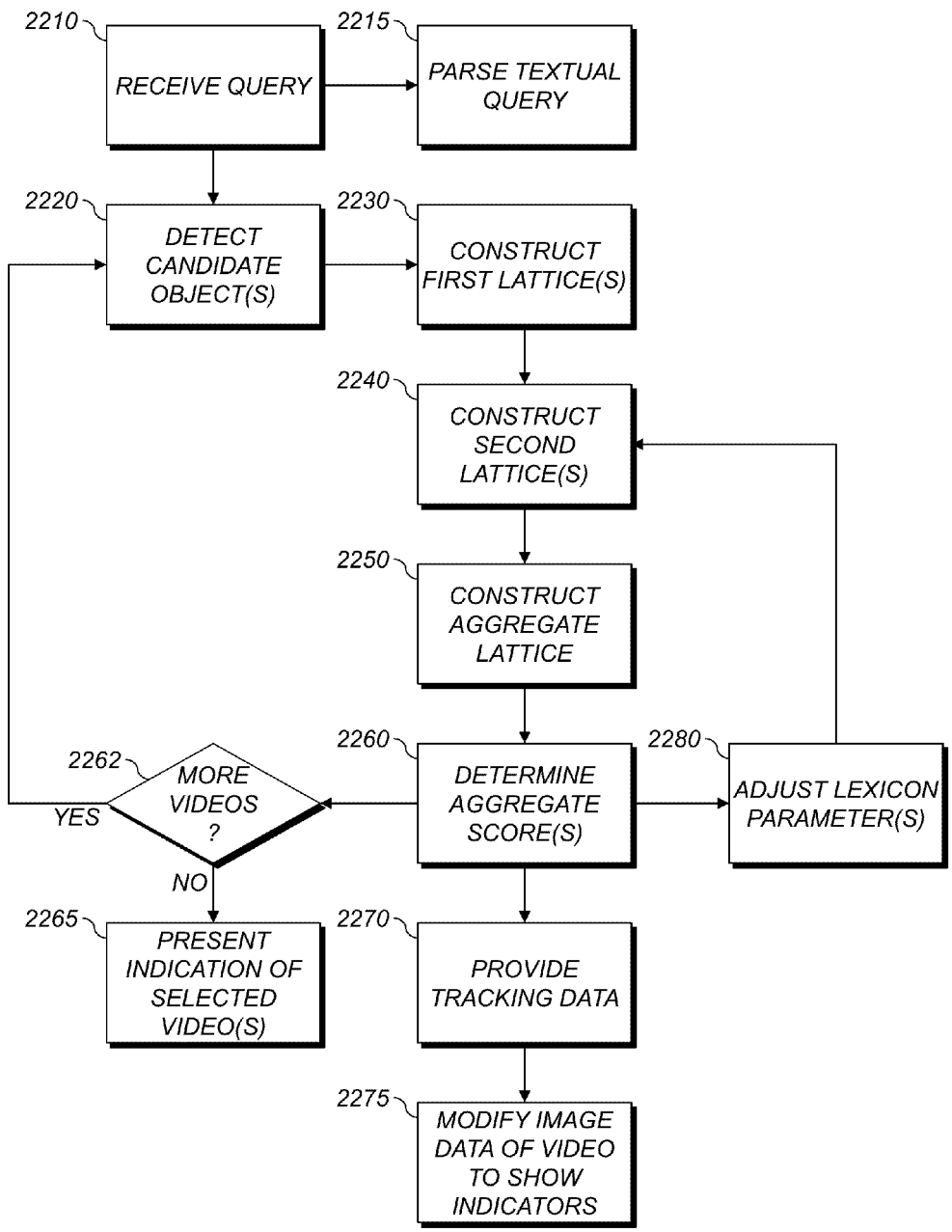
FIG. 22 shows a flowchart illustrating an exemplary method for testing a video against an aggregate query.

FIG. 22 shows a flowchart illustrating an exemplary method for testing a video against an aggregate query. In various aspects, the video includes image data of each of a plurality of frames. The steps can be performed in any order except when otherwise specified, or when data from an earlier step is used in a later step. In at least one example, processing begins with step 2210. The method can include automatically performing below-described steps using a processor 2186 (FIG. 21). For clarity of explanation, reference is herein made to various equations, processes, and components described herein that can carry out or participate in the steps of the exemplary method. It should be noted, however, that other equations, processes, and components can be used; that is, exemplary method(s) shown in FIG. 22 are not limited to being carried out by the identified components.

In step 2210, an aggregate query is received. The aggregate query defines one or more participant(s) and one or more condition(s) with respect to the participant(s). The aggregate query can include a sentence or a logical or encoded representation of the participant(s) and condition(s). An exemplary logical representation is shown in Eq.

In step 2220, one or more candidate object(s) (e.g., object detections, as discussed herein) are detected in each of the plurality of frames of the video; Detections can be only for a single frame or for multiple frames.

In step 2230, a respective first lattice is constructed corresponding to each of the identified participant(s). Examples of first lattices are tracker lattices discussed herein. Each first lattice includes a plurality of nodes, and each node in each first lattice includes a respective factor corresponding to one of the candidate objects detected in one or more of the frames of the video.

In step 2240, a respective second lattice is constructed corresponding to each of the identified condition(s). Examples are condition lattices discussed herein. Each second lattice including a plurality of nodes having respective factors. In various examples, at least one of the second lattices corresponds to a finite state machine (FSM) or hidden Markov model (HMM). For example, a lattice can represent an unrolled FSM or HMM.

In step 2250, an aggregate lattice (e.g., a cross-product lattice) is constructed using the respective first lattice(s) and the respective second lattice(s), the aggregate lattice including a plurality of nodes, wherein each of the nodes of the aggregate lattice includes a scoring factor computed using the factor in a corresponding one of the nodes in a corresponding one of the first lattice(s) and the factor in a corresponding one of the nodes in a corresponding one of the second lattice(s). Each factor corresponds to ≥1 item from ≥1 participants, and ≥1 states from ≥1 nodes from ≥1 conditional lattices.

In step 2260, processor 2186 determines whether the video corresponds to the aggregate query by determining respective aggregate score(s) of one or more path(s) through the aggregate lattice, each path including a respective plurality of the nodes in the aggregate lattice. Paths can be, e.g., accepting paths through lattices corresponding to FSMs, or paths through lattices corresponding to HMMs.

In various aspects, step 2260 includes locating a path through the aggregate lattice having a preferred respective aggregate score. For example, for scores on [0, 1], paths can be searched (e.g., using the Viterbi algorithm or Monte Carlo techniques) to find a path with the highest score of those tested, or a path with a score within some distance of 1.0. In one example, step 2260 includes using substantially a Viterbi algorithm to determine the one of the path(s) through the aggregate lattice that is mathematically optimal.

In various aspects, step 2210 includes parsing step 2215 of parsing a textual query to determine the one or more participant(s) identified in the textual query and the one or more condition(s) identified in the textual query with respect to the identified participant(s). Exemplary conditions include predicates or regular expressions discussed below. Steps 2210 or 2215 can include a linking process described below. The textual query can include at least two words having respective, different parts of speech selected from the group consisting of noun, verb, adjective, adverb, and preposition. An aggregate query not expressed in textual form can include relationships corresponding to those parts of speech.

Even for a simple query, such as "horse," there is a single participant, the horse, and there is a condition: "horseness." That is, a track of candidate object(s) is determined to be a horse if it satisfies selected predicates chosen to identify horses (e.g., size, color, or motion profile).

Figure 5:
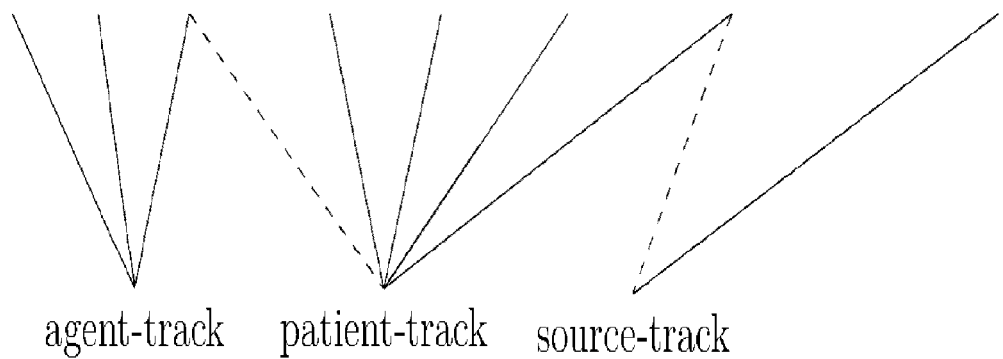
FIG. 5 shows an example of a sentence and trackers.

In various aspects, at least one of the condition(s) includes two or more arguments and the parsing step 2215 or the receiving step 2210 includes identifying a respective one of the participant(s) for each of the arguments. One or more conditions can be linked to a each participant. FIG. 5 shows an example of a sentence in which the arguments of the condition(s) are not symmetrical. In various aspects, the condition(s) include at least one asymmetric condition relating to two or more of the participant(s). Linking processes herein can be used whether or not asymmetric conditions are present. This advantageously permits searching for noun+verb phrases in combination with detection-based tracking.

In various aspects, step 2260 is followed by decision step 2262, which is followed by step 2220 if there are more videos to process. In this way, the detecting, constructing-first-lattice(s), constructing-second-lattice(s), constructing-aggregate-lattice, and determining steps are repeated with respect to each of a plurality of videos. In these aspects, determining step 2260 includes selecting one of the aggregate score(s) for each video as a respective score for that video. Step 2260 or decision step 2262 can be followed by step 2265.

In step 2265, one or more video(s) in the plurality of videos are selected using the respective scores and a visual indication is presented, e.g., via user interface system 2130, FIG. 21, of the selected video(s). This provides a technical effect of searching for videos corresponding to a query and displaying the results, e.g., in rank order, to the user. Other uses for the scores can include making a recommendation to a customer as to which product to buy or detecting a pedestrian in the path of a vehicle and automatically applying the brakes.

In various aspects, step 2260 is followed by step 2270. In step 2270, if the video does correspond to the aggregate lattice (e.g., determined by thresholding the aggregate score(s) or the video score) tracking data are provided of which of the detected candidate object(s) were determined to correspond to path(s) through the lattice having selected aggregate score(s) or ranges thereof. A track collection is produced, as described below, each track being a sequence of candidate-object detections, each detection specified by an image coordinate, size, and aspect ratio, though the detections don't have to be rectangles but can be any shape.

In step 2275, the image data of the video is modified to include respective visual indicator(s) for at least one of the detected candidate object(s) in the tracking data, wherein each visual indicator is applied to a plurality of the frames of the video.

Various aspects relate to learning a lexicon, as described herein. In some of these aspects, step 2240 of constructing the respective second lattice(s) includes determining a parameter of each respective second lattice using a lexicon having one or more lexicon parameter(s), e.g., parameters $\lambda^*$ discussed below. Determining step 2260 includes determining a discrimination score for the video using at least one of the aggregate score(s). Step 2260 can be followed by step 2280.

In step 2280, one or more of the lexicon parameter(s) are adjusted (some lexicon parameter(s) can be left unchanged) using the determined discrimination score. Step 2280 is followed by step 2240 so that the constructing-second-lattice, constructing-aggregate-lattice, and determining steps are repeated using the lexicon having the adjusted parameter(s). Adjustment can include, e.g., stochastic optimization. The lexicon parameters can be used as, or to determine, values input to Eq. 33. In various examples, adjusting step 2280 includes adjusting the one or more of the parameter(s) substantially using a Baum-Welch algorithm.

Learning can be performed on a corpus. In various aspects, the method further includes including repeating the detecting, constructing-first-lattice(s), constructing-second-lattice(s), constructing-aggregate-lattice, and determining steps 2220, 2230, 2240, 2250, and 2260 (respectively) for each of a plurality of videos and respective textual queries. Adjusting-parameters step 2280 then includes forming a composite score from the discrimination scores determined for each of the videos and adjusting the one or more of the lexicon parameter(s) based on the composite score. In this way, the composite score is computed for multiple video-sentence pairs, and the lexicon is adjusted based on the composite score. This can then be repeated to form a new composite score and further adjust the lexicon parameters until, e.g., a desired lexicon quality is reached.

In various aspects, for each of the plurality of videos, at least one respective negative aggregate query (e.g., sentence) is received that does not correspond to the respective video. The constructing-first-lattice(s), constructing-second-lattice(s), constructing-aggregate-lattice, and determining steps 2230, 2240, 2250, and 2260 are repeated for each of the plurality of videos and respective negative aggregate queries to provide respective competition scores. Adjusting step 2280, e.g., the forward part of Baum-Welch, includes forming a composite competition score using the determined respective competition scores and further adjusting the one or more of the lexicon parameter(s) based on the determined composite competition score. This is referred to below as "Discriminative training" or "DT", since it trains on both positive and negative sentences, not just positive sentences (as does Maximum likelihood or "ML" training, discussed below).

As described below, training can proceed in phases. ML can be used followed by DT. Alternatively or in combination, simpler sentences (e.g., NV) can be trained first, followed by more complicated sentences (e.g., including ADJ, ADV, PP, or other parts of speech).

In various aspects, the detecting, constructing-first-lattice(s), constructing-second-lattice(s), constructing-aggregate-lattice, and determining steps 2220, 2230, 2240, 2250, 2260 are repeated for a second aggregate query, wherein the second aggregate query includes a condition corresponding to a part of speech not found in the aggregate query.

Figure 23:
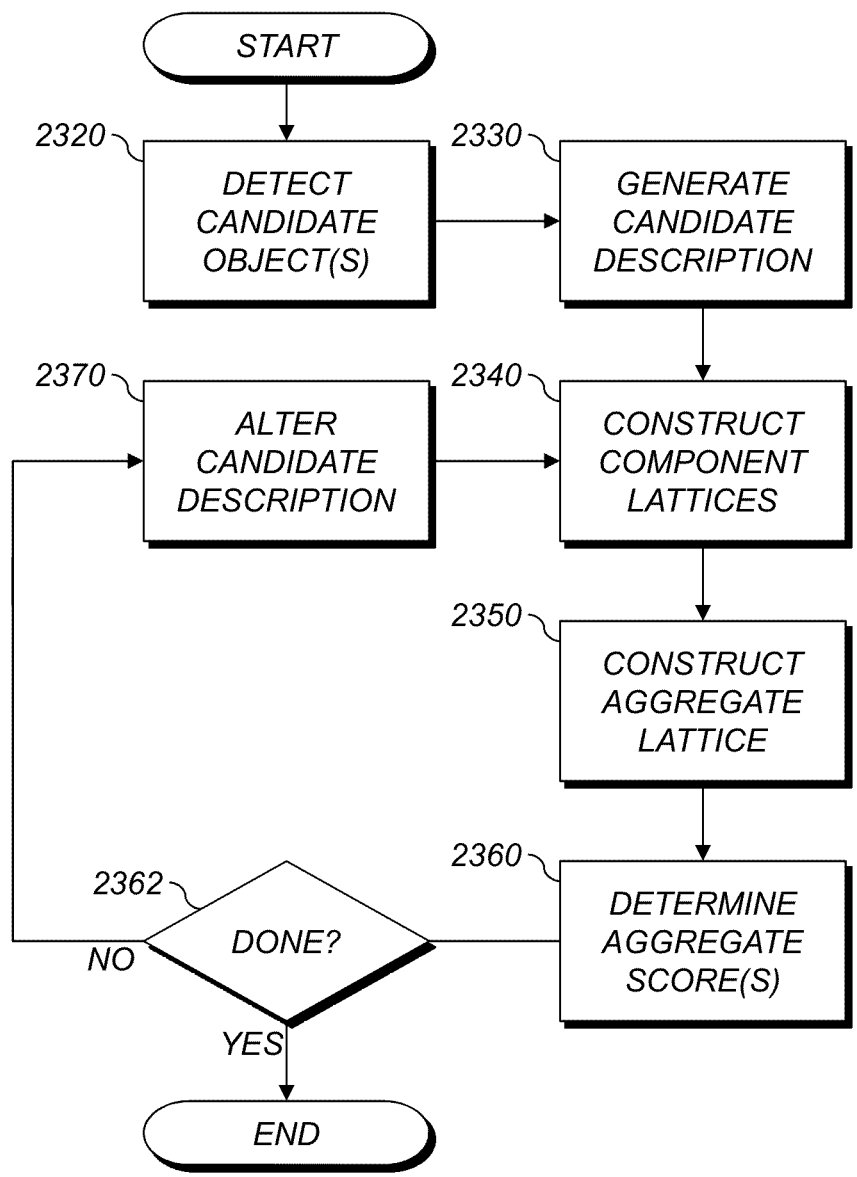
FIG. 23 shows a flowchart illustrating an exemplary method for providing a description of a video.

FIG. 23 shows a flowchart illustrating an exemplary method for providing a description of a video. The steps can be performed in any order, and are not limited to identified equations or components, as discussed above with reference to FIG. 22. In at least one example, processing begins with step 2320. The method can include automatically performing below-described steps using a processor 2186 (FIG. 21).

In step 2320, one or more candidate object(s) are detected in each of a plurality of frames of the video using image data of the plurality of frames. This can be as discussed above with reference to step 2220.

In step 2330, a candidate description is generated. The candidate description, which can be, e.g., a sentence, includes one or more participant(s) and one or more condition(s) applied to the participant(s). Whether or not the form of the candidate description is text, the conditions and participants are selected from a linguistic model, such as a grammar or lexicon described herein.

In step 2340, a plurality of respective component lattices are constructed. The component lattices can be, e.g., tracker or word lattices described herein. The component lattices correspond to the participant(s) or condition(s) in the candidate description. For example, the candidate description "horse" has 1 participant (the track representing the horse) and one condition ("horseness" as defined by selected predicates). At least one of the component lattices includes a node corresponding to one of the candidate objects detected in one of the frames of the video.

In step 2350, an aggregate lattice is produced having a plurality of nodes. Each node includes a respective factor computed from corresponding nodes in a respective plurality of corresponding ones of the component lattices. That is, at least two components feed each node in the aggregate lattice. The aggregate lattice can have other nodes not discussed here. Step 2350 can include locating a path through the aggregate lattice having a preferred aggregate score. This can be done using substantially a Viterbi algorithm to determine the path through the aggregate lattice that is mathematically optimal.

In step 2360, a score is determined for the video with respect to the candidate description by determining an aggregate score for a path through the aggregate lattice. This can be done, e.g., using the Viterbi algorithm. Continuing the "horse" example above, the aggregate score represents the combination of detecting an object that moves smoothly, as a horse should, and detecting that the smoothly-moving object is a horse (and not, say, a dog or an airplane). The relative weight given to smooth motion versus "horseness" can be changed. Using aggregate scores, e.g., with mathematical optimization via the Viterbi or other algorithm, advantageously permits providing sentences that reflect videos of more than one item. This can be used to provide an automatic summary of a video that can be transmitted using much less bandwidth and power than that video itself.

In decision step 2362, it is determined whether the aggregate score satisfies a termination condition. If so, the method concludes. If not, step 2370 is next.

In step 2370, the candidate description is altered by adding to it one or more participant(s) or condition(s) selected from the linguistic model. The next step is step 2340. In this way, the constructing, producing, and determining steps are repeated with respect to the altered candidate description.

Figure 24:
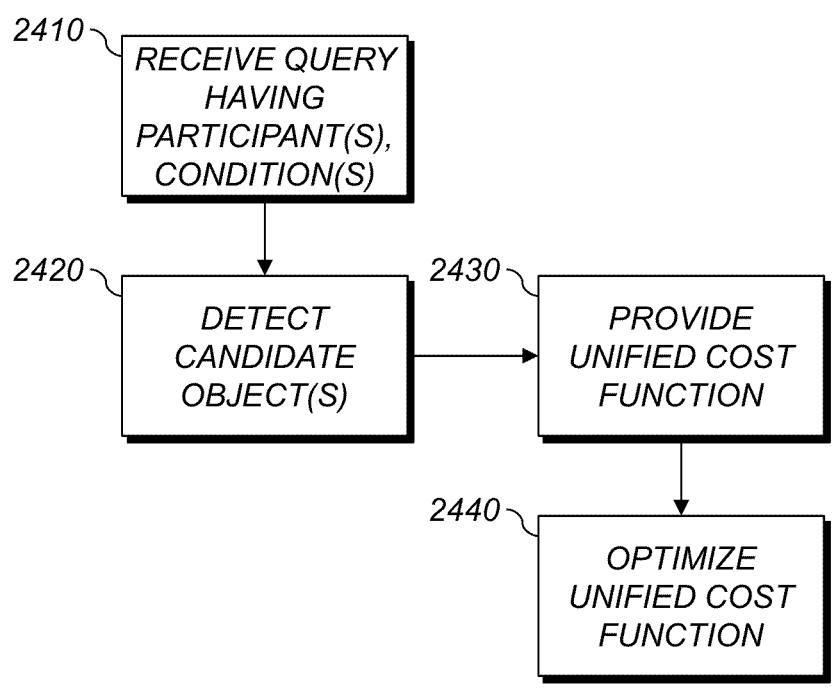
FIG. 24 shows a flowchart illustrating an exemplary method for testing a video against an aggregate query.

FIG. 24 shows a flowchart illustrating an exemplary method for testing a video against an aggregate query. The video includes image data of each of a plurality of frames. The steps can be performed in any order, and are not limited to identified equations or components, as discussed above with reference to FIG. 22. In at least one example, processing begins with step 2410. The method can include automatically performing below-described steps using a processor 2186 (FIG. 21).

In step 2410, an aggregate query is received defining one or more participant(s) and one or more condition(s) with respect to the participant(s). This can be as discussed with reference to step 2210.

In step 2420, one or more candidate object(s) are detected in each of the plurality of frames of the video, e.g., as discussed above with reference to step 2220.

In step 2430, a unified cost function is provided using the detected candidate object(s). This can be done, e.g., by table lookup, constructing an equation, providing parameters to be used in a known form of a function, or other techniques, or any combination thereof. An exemplary unified cost function is Eq. 33. The unified cost function computes how closely an input combination of the candidate object(s) corresponds to one or more object track(s) (e.g., smooth motion) and how closely the corresponding one or more object track(s) correspond to the participant(s) and the condition(s) (e.g., "horseness").

In step 2440, it is determined whether the video corresponds to the aggregate query by mathematically optimizing the unified cost function to select a combination of the detected candidate object(s) that has an aggregate cost with respect to the participant(s) and the condition(s). The optimization does not have to be carried out to determine a global optimum. It can be used to determine a local extremum or a value within a selected target range (e.g., [0.9, 1.0] for scores on [0, 1]). The optimization can also include Monte Carlo simulation, e.g., by selecting random j and k values for Eq. 33, followed by selecting a combination of the random parameters that provides a desired result. Step 2440 can also include testing the aggregate cost against a threshold or target range. Various examples of this determination are discussed below.

In various aspects, lowercase letters are used for variables or hidden quantities while uppercase ones are used for constants or observed quantities.

In a lexicon $\{1, \ldots, M\}$, m denotes a lexical entry. A sequence $D=(D_1, \ldots, D_R)$ of video clips $D_r$ is given, each paired with a sentence $S_r$ from a sequence $S=(S_1, \ldots, S_R)$ of sentences. $D_r$ paired with $S_r$ is referred to as a "training sample". Each sentence $S_r$ is a sequence $(S_{r,1}, \ldots, S_{r,L_r})$ of words $S_{r,l}$, each an entry from the lexicon. A given entry may potentially appear in multiple sentences and even multiple times in a given sentence. For example, the third word in the first sentence might be the same entry as the second word in the fourth sentence, in which case $S_{1,3}=S_{4,2}$. This is what allows cross-situational learning in the algorithm.

Each video clip $D_r$ can be processed to yield a sequence $(\tau_{r,1}, \ldots, \tau_{r,U_r})$ of object tracks $\tau_{r,u}$. In an example, $D_r$ is paired with sentence $S_r$=The person approached the chair, specified to have two participants, $p_{r,0}$ and $p_{r,1}$, with the mapping person($p_{r,0}$), chair($p_{r,1}$), and approached($p_{r,0}$, $p_{r,1}$). Further, for example, a mapping from participants to object tracks is given, say $p_{r,0} \mapsto \tau_{r,39}$ and $p_{r,1} \mapsto \tau_{r,51}$. This permits instantiating the HMMs with object tracks for a given video clip: person($\tau_{r,39}$), chair($\tau_{r,51}$), and approached($\tau_{r,39}$, $\tau_{r,51}$). Further, for example, each such instantiated HMM can be scored and the scores for all of the words in a sentence can be aggregated to yield a sentence score and the scores for all of the sentences in the corpus can be further aggregated to yield a corpus score. However, the parameters of the HMMs are not initially known. These constitute the unknown meanings of the words in the corpus which for which understanding is sought. It is desirable to simultaneously determine (a) those parameters along with (b) the object tracks and (c) the mapping from participants to object tracks. This is done by finding (a)-(c) that maximizes the corpus score.

Various aspects relate to a "sentence tracker." It is presented that a method that first determines object tracks from a single video clip and then uses these fixed tracks with HMMs to recognize actions corresponding to verbs and construct sentential descriptions with templates. Prior schemes relate to the problem of solving (b) and (c) for a single object track constrained by a single intransitive verb, without solving (a), in the context of a single video clip. The group has generalized various aspects to yield an algorithm called the "sentence tracker" which operates by way of a factorial HMM framework. It is introduced that here is the foundation of the extension.

Each video clip $D_r$ contains $T_r$ frames. An object detector is run on each frame to yield a set $D_r^t$ of detections. Since the object detector is unreliable, it is biased to have high recall but low precision, yielding multiple detections in each frame. An object track is formed by selecting a single detection for that track for each frame. For a moment, consider a single video clip with length T, with detections $D^t$ in frame t. Further, that, for example, a single object track in that video clip is sought. Let $j^t$ denote the index of the detection from $D^t$ in frame t that is selected to form the track. The object detector scores each detection. Let $F(D^t, j^t)$ denote that score. Moreover, it is wished that the track to be temporally coherent; it is desired that the objects in a track to move smoothly over time and not jump around the field of view. Let $G(D^{t-1}, j^{t-1}, D^t, j^t)$ denote some measure of coherence between two detections in adjacent frames. (One possible such measure is consistency of the displacement of $D^t$ relative to $D^{t-1}$ with the velocity of $D^{t-1}$ computed from the image by optical flow.) The detections can be selected to yield a track that maximizes both the aggregate detection score and the aggregate temporal coherence score.

$$\max_{j^1, \ldots, j^T} \left( \sum_{t=1}^T F(D^t, j^t) + \sum_{t=2}^T G(D^{t-1}, j^{t-1}, D^t, j^t) \right) \quad (1)$$

This can be determined with the "Viterbi" algorithm (A. J. Viterbi. Error bounds for convolutional codes and an asymtotically optimum decoding algorithm. "IEEE Transactions on Information Theory", 13:260-267, 1967b). Various aspects are known as "detection-based tracking".

The meaning of an intransitive verb as an HMM over a time series of features extracted for its participant in each frame. Let $\lambda$ denote the parameters of this HMM, $(q^1, \ldots, q^T)$ denote the sequence of states $q^t$ that leads to an observed track, $B(D^t, j^t, q^t, \lambda)$ denote the conditional log probability of observing the feature vector associated with the detection selected by $j^t$ among the detections $D^t$ in frame t, given that the HMM is in state $q^t$, and $A(q^{t-1}, q^t, \lambda)$ denote the log transition probability of the HMM. For a given track $(j^1, \ldots, j^T)$, the state sequence that yields the maximal likelihood is given by:

$$\max_{q^1, \ldots, q^T} \left( \sum_{t=1}^T B(D^t, j^t, q^t, \lambda) + \sum_{t=2}^T A(q^{t-1}, q^t, \lambda) \right) \quad (2)$$

which can also be found by the Viterbi algorithm.

A given video clip may depict multiple objects, each moving along its own trajectory. There may be both a person jumping and a ball rolling. How is one track selected over the other? Various aspects of the insight of the sentence tracker is to bias the selection of a track so that it matches an HMM. This is done by combining the cost function of Eq. 1 with the cost function of Eq. 2 to yield Eq. 3, which can also be determined using the Viterbi algorithm. This is done by forming the cross product of the two lattices. This jointly selects the optimal detections to form the track, together with the optimal state sequence, and scores that combination:

$$\max_{\substack{j^1,\ldots,j^T \\ q^1,\ldots,q^T}} \left( \begin{array}{l} \sum_{t=1}^{T} F(D^t, j^t) + B(D^t, j^t, q^t, \lambda) + \\ \sum_{t=2}^{T} G(D^{t-1}, j^{t-1}, D^t, j^t) + A(q^{t-1}, q^t, \lambda) \end{array} \right) \quad (3)$$

While the above is formulated around a single track and a word that contains a single participant, it is straightforward to extend this so that it supports multiple tracks and words of higher arity by forming a larger cross product. When doing so, $j^t$ is generalized to denote a sequence of detections from $D^t$, one for each of the tracks. F needs to be further generized so that it computes the joint score of a sequence of detections, one for each track, G so that it computes the joint measure of coherence between a sequence of pairs of detections in two adjacent frames, and B so that it computes the joint conditional log probability of observing the feature vectors associated with the sequence of detections selected by $j^t$. When doing this, note that Eqs. 1 and 3 maximize over $j^1, \ldots, j^T$ which denotes T sequences of detection indices, rather than T individual indices.

It is further straightforward to extend the above to support a sequence $(S_1, \ldots, S_L)$ of words $S_l$ denoting a sentence, each of which applies to different subsets of the multiple tracks, again by forming a larger cross product. When doing so, $q^t$ is generalized to denote a sequence $(q_1^t, \ldots, q_L^t)$ of states $q_l^t$, one for each word l in the sentence, and use $q_l$ to denote the sequence $(q_l^1, \ldots, q_l^T)$ and q to denote the sequence $(q_1, \ldots, q_L)$. B needs to be further generalized so that it computes the joint conditional log probability of observing the feature vectors for the detections in the tracks that are assigned to the arguments of the HMM for each word in the sentence and A so that it computes the joint log transition probability for the HMMs for all words in the sentence. This allows selection of an optimal sequence of tracks that yields the highest score for the sentential meaning of a sequence of words. Modeling the meaning of a sentence through a sequence of words whose meanings are modeled by HMMs, defines a factorial HMM for that sentence, since the overall Markov process for that sentence can be factored into independent component processes for the individual words. In this view, q denotes the state sequence for the combined factorial HMM and $q_l$ denotes the factor of that state sequence for word l. Various aspects wrap this sentence tracker in Baum Welch.

The sentence tracker is adapted to training a corpus of R video clips, each paired with a sentence. Thus the notation is augmented, generalizing $j^t$ to $j_r^t$ and $q_l^t$ to $q_{r,l}^t$. Below, $j_r$ is used to denote $(j_r^1, \ldots, j_r^{T_r})$, j to denote $(j_1, \ldots, j_R)$, $q_{r,l}$ to denote $(q_{r,l}^1, \ldots, q_{r,l}^{T_r})$, $q_r$ to denote $(q_{r,1}, \ldots, q_{r,L_r})$, and q to denote $(q_1, \ldots, q_R)$.

Discrete features are used, namely natural numbers, in the feature vectors, quantized by a binning process. It is accepted that the part of speech of entry m is known as $C_m$. The length of the feature vector may vary across parts of speech. Let $N_c$ denote the length of the feature vector for part of speech c, $x_{r,l}$ denote the time-series $(x_{r,l}^1, \ldots, x_{r,l}^{T_r})$ of feature vectors $x_{r,l}^t$, associated with $S_{r,l}$ (which recall is some entry m), and $x_r$ denote the sequence $(x_{r,1}, \ldots, x_{r,L_r})$. It is accepted that a function is given $\Phi_c(D_r^t, j_r^t)$ that computes the feature vector $x_{r,l}^t$ for the word $S_{r,l}$ whose part of speech is $C_{S_{r,l}} = c$. Note that $\Phi$ is allowed to be dependent on c allowing different features to be computed for different parts of speech, since m and thus $C_m$ can be determined from $S_{r,l}$. $N_c$ and $\Phi_c$ have been chosen to depend on the part of speech c and not on the entry m since doing so would be tantamount to encoding the to-be-learned word meaning in the provided feature-vector computation.

The goal of training is to find a sequence $\lambda = (\lambda_1, \ldots, \lambda_M)$ of parameters $\lambda_m$ that explains the R training samples. The parameters $\lambda_m$ constitute the meaning of the entry m in the lexicon. Collectively, these are the initial state probabilities $a_{0,k}^m$, for $1 \leq k \leq I_{C_m}$, the transition probabilities $a_{i,k}^m$, for $1 \leq i, k \leq I_{C_m}$, and the output probabilities $b_{i,n}^m(x)$, for $1 \leq i \leq I_{C_m}$ and $1 \leq n \leq N_{C_m}$, where $I_{C_m}$ denotes the number of states in the HMM for entry m. Like before, a distinct $I_m$ could exist for each entry m but instead have $I_{C_m}$ depend only on the part of speech of entry m, and, for example, that the fixed I for each part of speech is known. In the present case, $b_{i,n}^m$ is a discrete distribution because the features are binned.

Instantiating the above approach to perform learning requires a definition for what it means to explain the R training samples. Towards this end, the score of a video clip $D_r$ paired with sentence $S_r$ given the parameter set $\lambda$ is defined to characterize how well this training sample is explained. While the cost function in Eq. 3 may qualify as a score, it is easier to fit a likelihood calculation into the Baum-Welch framework than a MAP estimate. Thus the max in Eq. 3 is replaced with a $\Sigma$ and redefine the scoring function as follows:

$$L(D_r; S_r, \lambda) = \sum_{j_r} P(j_r | D_r) P(x_r | S_r, \lambda) \quad (4)$$

The score in Eq. 4 can be interpreted as an expectation of the HMM likelihood over all possible mappings from participants to all possible tracks. By definition, $$P(j_r | D_r) = \frac{V(D_r, j_r)}{\sum_{j_r'} V(D_r, j_r')},$$

where the numerator is the score of a particular track sequence $j_r$ while the denominator sums the scores over all possible track sequences. The log of the numerator $V(D_r, j_r)$ is simply Eq. 1 without the max. The log of the denominator can be computed efficiently by the forward algorithm of Baum.

The likelihood for a factorial HMM can be computed as:

$$P(x_r | S_r, \lambda) = \sum_{q_r} \prod_l P(x_{r,l}, q_{r,l} | S_{r,l}, \lambda) \quad (5)$$

i.e., summing the likelihoods for all possible state sequences. Each summand is simply the joint likelihood for all the words in the sentence conditioned on a state sequence $q_r$. For HMMs:

$$P(x_{r,l}, q_{r,l} | S_{r,l}, \lambda) = \prod_t a_{q_{r,l}^{t-1}, q_{r,l}^t}^{S_{r,l}} \prod_n b_{q_{r,l}^t, n}^{S_{r,l}}(x_{r,l,n}^t) \quad (6)$$

Finally, for a training corpus of R samples, the joint score is maximized:

$$L(D; S, \lambda) = \prod_r L(D_r; S_r, \lambda) \quad (7)$$

A local maximum can be found by employing the Baum-Welch algorithm.

By constructing an auxiliary function, it can be derived that the reestimation formula in Eq. 8, where $x_{r,l,n}^t = h$ denotes the selection of all possible $j_r^t$ such that the nth feature computed by $\Phi_{C_m}(D_r^t, j_r^t)$ is h. The coefficients $\theta_i^m$ and $\psi_{i,n}^m$ are for normalization.

The reestimation formulas involve occurrence counting. However, since a factorial HMM is used that involves a cross-product lattice and use a scoring function derived from Eq. 3 that incorporates both tracking (Eq. 1) and word models (Eq. 2), the frequency of transitions need to be counted in the whole cross-product lattice. As an example of such cross-product occurrence counting, $$a_{i,k}^m = \theta_i^m \sum_{r=1}^R \sum_{l=1}^{L_r} \sum_{t=1}^{T_r} \frac{L(q_{r,l}^{t-1} = i, q_{r,l}^t = k, D_r; S_r, \lambda')}{L(D_r; S_r, \lambda')} \quad (8)$$
$$\text{s.t. } S_{r,l}=m \qquad \xi(r,l,i,k,t)$$

$$b_{i,n}^m(h) = \psi_{i,n}^m \sum_{r=1}^R \sum_{l=1}^{L_r} \sum_{t=1}^{T_r} \frac{L(q_{r,l}^t = i, x_{r,l,n}^t = h, D_r; S_r, \lambda')}{L(D_r; S_r, \lambda')}$$
$$\text{s.t. } S_{r,l}=m \qquad \gamma(r,l,n,i,h,t)$$

when counting the transitions from state i to k for the lth word from frame t−1 to t, i.e., $\xi(r, l, i, k, t)$, all the possible paths through the adjacent factorial states $(j_r^{t-1}, q_{r,1}^{t-1}, \ldots, q_{r,L_r}^{t-1})$ and $(j_r^t, g_{r,1}^t, \ldots, q_{r,L_r}^t)$ such that $q_{r,l}^{t-1} = i$ and $q_{r,l}^t = k$ need to be counted. Similarly, when counting the frequency of being at state i while observing h as the nth feature in frame t for the lth word of entry m, i.e., $\gamma(r, l, n, i, h, t)$, all the possible paths through the factorial state $(j_r^t, g_{r,l}^t, \ldots, g_{r,L_r}^t)$ need to be counted such that $q_{r,l}^t = i$ and the nth feature computed by $\Phi_{C_m}(D_r^t, j_r^t)$ is h.

The reestimation of a single component HMM can depend on the previous estimate for other component HMMs. This dependence happens because of the argument-to-participant mapping which coindexes arguments of different component HMMs to the same track. It is precisely this dependence that leads to cross-situational learning of two kinds: both inter-sentential and intra-sentential. Acquisition of a word meaning is driven across sentences by entries that appear in more than one training sample and within sentences by the requirement that the meanings of all of the individual words in a sentence be consistent with the collective sentential meaning.

An experiment was performed. Sixty-one (61) video clips (each 3-5 seconds at 640×480 resolution and 40 fps) were filmed that depict a variety of different compound events. Each clip depicts multiple simultaneous events between some subset of four objects: a person, a backpack, a chair, and a trash-can. These clips were filmed in three different outdoor environments which are used for cross validation. Each video is manually annotated with several sentences that describe what occurs in that video. The sentences were constrained to conform to the grammar in Table 1. The corpus of 159 training samples pairs some videos with more than one sentence and some sentences with more than one video, with an average of 2.6 sentences per video.

TABLE 1

S → NP VP
NP → D N [PP]
D → "the"
N → "person" | "backpack" | "trash-can" | "chair"
PP → P NP
P → "to the left of" | "to the right of"
VP → V NP [ADV] [PPM]
V → "picked up" | "put down" | "carried" | "approached"
ADV → "quickly" | "slowly"
PPM → PM NP
PM → "towards" | "away from"

Table 1 shows the grammar used for annotation and generation. The lexicon contains 1 determiner, 4 nouns, 2 spatial relation prepositions, 4 verbs, 2 adverbs, and 2 motion prepositions for a total of 15 lexical entries over 6 parts of speech.

The semantics of all words except determiners are modeled and learned. Table 2 specifies the arity, the state number $I_c$, and the features computed by $\Phi_c$ for the semantic models for words of each part of speech c. While a different subset of features for each part of speech is specified, it is presumed that, in principle, with enough training data, all features in all parts of speech could be included and automatically learn which ones are noninformative and lead to uniform distributions.

TABLE 2

| c | arity | $I_c$ | $\Phi_c$ |
|---|---|---|---|
| N | 1 | 1 | α detector index |
| V | 2 | 3 | α VEL MAG |
|   |   |   | α VEL ORIENT |
|   |   |   | β VEL MAG |
|   |   |   | β VEL ORIENT |
|   |   |   | α-β DIST |
|   |   |   | α-β size ratio |
| P | 2 | 1 | α-β x-position |
| ADV | 1 | 3 | α VEL MAG |
| PM | 2 | 3 | α VEL MAG |
|   |   |   | α-β DIST |

Table 2 shows Arguments and model configurations for different parts of speech c. VEL stands for velocity, MAG for magnitude, ORIENT for orientation, and DIST for distance.

An off-the-shelf object detector is used which outputs detections in the form of scored axis-aligned rectangles. Four object detectors were trained, one for each of the four object classes in the corpus: person, backpack, chair, and trash-can. For each frame, the two highest-scoring detections produced by each object detector are picked and the results pooled yielding eight detections per frame. Having a larger pool of detections per frame can better compensate for false negatives in the object detection and potentially yield smoother tracks but it increases the size of the lattice and the concomitant running time and does not lead to appreciably improved performance on the corpus.

Continuous features, such as velocity, distance, size ratio, and x-position are computed solely from the detection rectangles and quantize the features into bins as in Table 3.

TABLE 3

| velocity | To reduce noise, the velocity of a participant is computed by averaging the optical flow in the detection rectangle. The velocity magnitude is quantized into 5 levels: "absolutely stationary", "stationary", "moving", "fast moving", and "quickly". The velocity orientation is quantized into 4 directions: "left", "up", "right", and "down". |
|---|---|

TABLE 3-continued

| | |
|---|---|
| distance | The Euclidean distance between the detection centers of two participants, which is quantized into 3 levels: "near", "normal", and "far away", is computed. |
| size ratio | The ratio of detection area of the first participant to the detection area of the second participant is computed, quantized into 2 possibilities: "larger/smaller than". |
| x-position | The difference is computed between the x-coordinates of the participants, quantized into 2 possibilities: "to the left/right of". |

The binning process was determined by a preprocessing step that clustered a subset of the training data. The index of the detector that produced the detection as a feature is also incorporated. The particular features computed for each part of speech are given in Table 2.

Note that while English phrases, like "to the left of", are used to refer to particular bins of particular features, and object detectors exist which are trained on samples of a particular object class such as "backpack", such phrases are only mnemonic of the clustering and object-detector training process. There is no fixed correspondence between the lexical entries and any particular feature value. Moreover, that correspondence need not be one-to-one: a given lexical entry may correspond to a (time variant) constellation of feature values and any given feature value may participate in the meaning of multiple lexical entries.

A three-fold cross validation is performed, taking the test data for each fold to be the videos filmed in a given outdoor environment and the training data for that fold to be all training samples that contain other videos. For testing, 24 sentences generated by the grammar in Table 1 were hand selected, where each sentence is true for at least one test video. Half of these sentences (designated NV) contain only nouns and verbs while the other half (designated ALL) contain other parts of speech. The latter are longer and more complicated than the former. Each testing video paired with every sentence in both NV and ALL is scored. With respect to the results, the correctness of each such pair is manually annotated.

Video-sentence pairs could be scored with Eq. 4. However, the score depends on the sentence length, the collective numbers of states and features in the HMMs for words in that sentence, and the length of the video clip. To render the scores comparable across such variation a sentence prior to the per-frame score is incorporated:

$$\hat{L}(D_r, S_r; \lambda) = [L(D_r; S_r, \lambda)]^{\frac{1}{T_r}} \pi(S_r) \quad (9)$$

where $$\pi(S_r) = \exp \sum_{l=1}^{L_r} \left( E(I_{C_{S_{r,l}}}) + \sum_{n=1}^{N_{C_{S_{r,l}}}} E(Z_{C_{S_{r,l}},n}) \right) \quad (10)$$

In the above, $Z_{C_{S_{r,l}},n}$ is the number of bins for the nth feature of $S_{r,l}$ of part of speech $C_{S_{r,l}}$ and $$E(Y) = -\sum_{y=1}^{Y} \frac{1}{Y} \log \frac{1}{Y} = \log Y$$

is the entropy of a uniform distribution over Y bins. This prior prefers longer sentences which describe more information in the video.

The scores are thresholded to decide hits, which together with the manual annotations, can generate TP, TN, FP, and FN counts. The threshold that leads to the maximal F1 score on the training set is selected, use this threshold to compute F1 scores on the test set in each fold, and average F1 scores across the folds.

The F1 scores are listed in the column labeled "Our" in Table 4. For comparison, the F1 scores for three baselines: "Chance", "Blind", and "Hand" are also reported. The "Chance" baseline randomly classifies a video-sentence pair as a hit with probability 0.5. The "Blind" baseline determines hits by potentially looking at the sentence but never looking at the video. An upper bound on the F1 score can be found that any blind method could have on each of the test sets by solving a 0-1 fractional programming problem per Dinkelbach.

Figure 2:
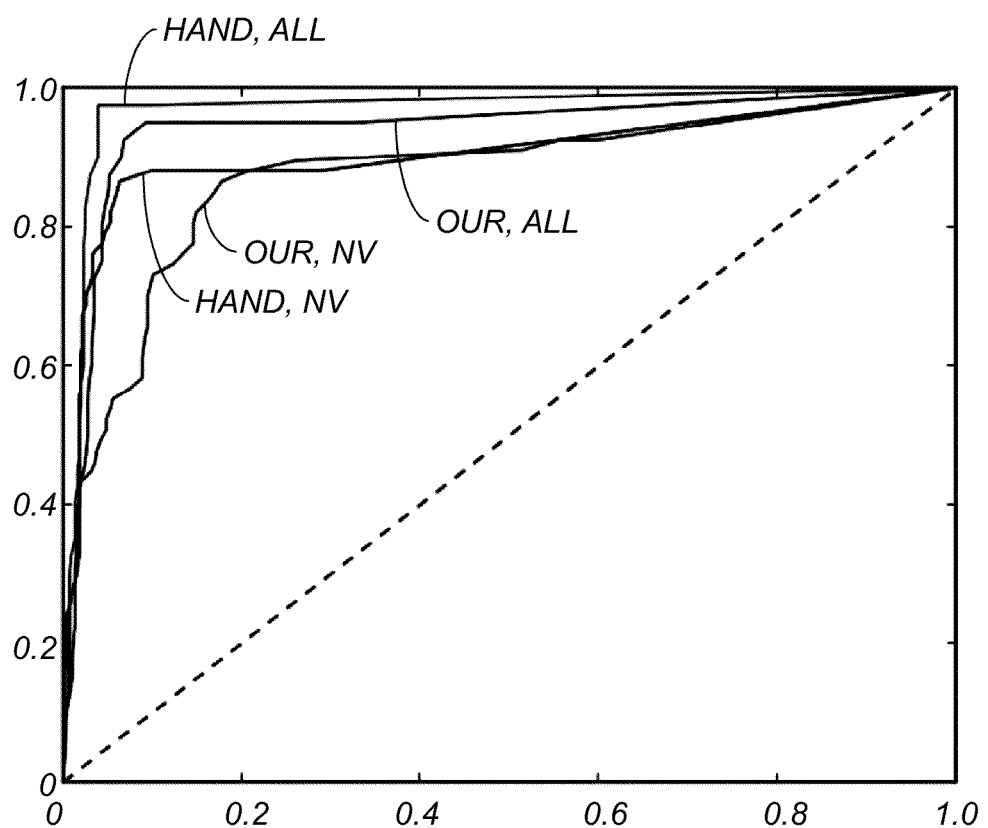
FIG. 2 shows exemplary relative operating characteristic (ROC) curves of trained models and hand-written models.

The "Hand" baseline determines hits with hand-coded HMMs, carefully designed to yield what is believed to be near-optimal performance. As can be seen from Table 4, which shows F1 scores of different methods, the trained models perform substantially improved than the "Chance" and "Blind" baselines and approach the performance of the ideal "Hand" baseline. It can further be seen from the relative operating characteristic (ROC) curves in FIG. 2, comparing the trained and hand-written models on both NV and ALL, that the trained models are close to optimal. The abscissa in FIG. 2 and other ROC plots herein is the false positive rate and the ordinate is the true positive rate. A curve for mathematically optimal classification passes through the point (0, 1). In this example, performance on ALL exceeds that on NV with the trained models. This is because longer sentences with varied parts of speech incorporate more information into the scoring process.

TABLE 4

| | Chance | Blind | Our | Hand |
|---|---|---|---|---|
| NV | 0.155 | 0.265 | 0.545 | 0.748 |
| ALL | 0.099 | 0.198 | 0.639 | 0.786 |

FIG. 2 shows ROC curves of trained models and hand-written models.

A method that learns word meanings from video paired with sentences is presented. The method deals with realistic video scenes labeled with whole sentences, not individual words labeling hand delineated objects or events. The experiment shows that it can correctly learn the meaning representations in terms of HMM parameters for the lexical entries, from highly ambiguous training data. The maximum-likelihood method makes use of only positive sentential labels. As such, it might require more training data for convergence than a method that also makes use of negative training sentences that are not true of a given video. Such can be handled with discriminative training, a topic to be addressed in the future.

It is believed that this will allow learning larger lexicons from more complex video without excessive amounts of training data.

Below is presented an upper bound on the F1 score of blind methods according to various aspects. A "Blind" algorithm makes identical decisions on the same sentence paired with different video clips. An optimal algorithm will try to find a decision $s_i$ for each test sentence i that maximizes the F1 score. Suppose, the ground-truth yields FP, false positives and $TP_i$ true positives on the test set when $s_i=1$. Also suppose that setting $s_i=0$ yields $FN_i$ false negatives. Then the F1 score is $$F1 = \cfrac{1}{1 + \cfrac{\sum_i s_i FP_i + (1-s_i)FN_i}{\underbrace{\sum_i 2s_i TP_i}_{\Delta}}} \quad (11)$$

Thus the desire is to minimize the term $\Delta$. This is an instance of a 0-1 fractional programming problem which can be solved by binary search or Dinkelbach's algorithm.

Various aspects relate to discriminative training, e.g., learning to describe video with sentences, from video described with sentences.

A method for learning word meanings from complex and realistic video clips by discriminatively training (DT) positive sentential labels against negative ones, and then use the trained word models to generate sentential descriptions for new video is presented. A maximum likelihood (ML) framework has been adopted to address the same problem using only positive sentential labels. The new method, like the ML-based one, is able to automatically determine which words in the sentence correspond to which concepts in the video (i.e., ground words to meanings) in a weakly supervised fashion. While both DT and ML yield comparable results with sufficient training data, in various aspects DT outperforms ML with smaller training sets because it can exploit negative training labels to constrain the learning problem.

Various aspects of generating a linguistic description of visual data is a topic at the intersection of computer vision, machine learning, and natural-language processing. While most prior aspects focus on describing static images, little focuses on describing video data. In some prior schemes, it has been established the correspondence between linguistic concepts and semantic features extracted from video to produce case frames which were then translated into textual descriptions. A stochastic context free grammar (SCFG) has been used to infer events from video images parsed into scene elements. Text sentences were then generated by a simplified head-driven phrase structure grammar (HPSG) based on the output of the event inference engine. High level features (e.g., semantic keywords) have been extracted from video and then a template filling approach implemented for sentence generation. A detection-based tracker to track object motion has been used, hidden Markov models (HMM) to classify the object motion into verbs, and templates to generate sentences from the verbs, detected object classes, and track properties. It has been shown to combine object and activity detectors with knowledge automatically mined from web-scale text corpora to select the most likely subject-verb-object (SVO) triplet. This triplet was then expanded into a sentence by filling a template. These approaches use a common strategy for generating descriptions, namely mosaicing together different parts of a sentence. They often employ different mechanisms for different parts of speech; while verbs are often represented by learned event models or grammars, ad hoc hand-coded knowledge is often used to represent other word types such as prepositions and adverbs. Such separate handling of different parts of speech is unprincipled and requires greater effort to craft a system by hand or label larger amounts of training data. A method has been presented that combines detection-based tracking with event recognition based on HMMs. This scheme forms a factorial HMM with the cross product of the lattices for both the detection-based tracking process and the event recognition HMM, finding the maximum a posteriori probability (MAP) estimate of a track that both exhibits temporal coherency as required by detection-based tracking and the motion profile described by the HMM.

Various aspects relate to supporting multiple object tracks mutually constrained by multiple hand-coded HMMs denoting the semantic meaning representations for different words in a sentence, each applied to a subset of the tracks, referred to herein as a "sentence tracker".

The sentence tracker can be built upon various aspects to train the HMMs from a corpus of video clips paired with sentential descriptions. Word meanings can be learned in a weakly supervised fashion: while the video clips were paired with multi-word sentential labels, the learner is not provided the mapping from the individual words to the corresponding semantic notions in the video. This approach is an example of cross-situational learning While there exist many potential word-to-meaning mappings that are consistent with a single video-sentence training sample, fewer such mappings will be consistent as the number of training samples increases. This yields a constraint satisfaction problem (CSP), where each training sample acts as a constraint on the mutual meanings of the words in that sentence and information learned about the meaning of one word flows to other words in that sentence and on to other words in other sentences. This cross-situational aspect of the algorithm allowed it to correctly learn the meanings of all words in all sentences that appeared in a training corpus. After this, the algorithm was used to decide whether a video depicted a new sentence by thresholding the video-sentence score computed with the learned word HMMs.

A maximum likelihood (ML) formulation works well when sufficient training data is provided to constrain the problem so that only a single word-to-meaning mapping is consistent with the training set. When multiple word-to-meaning mappings are consistent, it is possible that an incorrect mapping yields higher likelihood. Having only a small number of sentential labels for a small number of video clips may yield insufficient constraint on the learning problem. This problem can be remedied by automatically generating negative training sentences for a video, thus increasing the degree of constraint on the consistent word-to-meaning mappings without requiring additional training video clips. These automatically generated negative (training) sentences describe what did not occur in a video clip in contrast to the manually specified positive (training) sentences. The hypothesis is that such information will yield a more constrained learning problem with the same amount of video data. Presented is a discriminative training (DT) formulation for training positive sentences against negative ones. This strictly generalizes the ML-based method, as ML is equivalent to DT with an empty negative training set.

Below are described: as follows. the ML formulation; the DT formulation and learning algorithm; a two-phase regimen combining ML and DT for training; and an advantage of DT over ML in an example.

Table 5 summarizes various notation used herein. The training set contains training samples, each pairing a video clip with a sentence. The method starts by processing each video clip with an object detector to yield a number of detections for each object class in each frame. To compensate for false negatives in object detection, detections in each frame are overgenerated. Consider a track $\tau_u$ to be a sequence of detections, one in each frame, constrained to be of the same class. Conceptually, there are exponentially many possible tracks, though it is not necessary to explicitly enumerate such, instead implicitly quantifying over such by way of the Viterbi algorithm.

The method is also given the argument-to-participant mapping for each sentence. For example, a sentence like "The person to the left of the backpack approached the trash-can" would be represented as a conjunction:

$$\text{person}(p_0) \wedge \text{to-the-left-of}(p_0, p_1) \wedge \text{backpack}(p_1)$$
$$\wedge \text{approached}(p_0, p_2) \wedge \text{trash-can}(p_2) \quad (12)$$

over the three participants $p_0$, $p_1$, and $p_2$. This could be done in the abstract, without reference to a particular video, and can be determined by parsing the sentence with a known grammar and a lexicon with known arity for each lexical entry. Each lexical entry is associated with an HMM that models its semantic meaning. HMMs associated with entries of the same part-of-speech have the same model configuration (i.e., number of states, parametric form of output distribution, etc.).

TABLE 5

| | |
|---|---|
| M | number of entries in the lexicon |
| $C_m$ | part-of-speech of lexical entry m |
| R | number of training samples |
| $D_r$ | video clip in training sample r |
| $S_r$ | sentence in training sample r |
| $L_r$ | number of words in sentence $S_r$ |
| $S_{r,l}$ | lth word in sentence $S_r$ |
| $T_r$ | number of frames in video $D_r$ |
| <<red>>$j_r^t$ | sequence of detection indices in frame t of video $D_r$, one index per track |
| <<red>>$j_r$ | $(j_r^1, \ldots, J_r^{T_r})$ |
| <<red>>$q_{r,l}^t$ | state of the HMM for word l in sentence $S_r$ at frame t |
| <<red>>$q_{r,l}$ | $(q_{r,l}^1, \ldots, q_{r,l}^{T_r})$ |
| <<red>>$q_r$ | $(q_{r,1}, \ldots, q_{r,L_r})$ |
| $I_c$ | number of states in the HMM for part-of-speech c |
| $N_c$ | length of the feature vector for part-of-speech c |
| <<red>>$\chi_{r,l}^t$ | feature vector associated with word $S_{r,l}$ at frame t of video $D_r$ |
| <<red>>$\chi_{r,l}$ | $(\chi_{r,l}^1, \ldots, \chi_{r,l}^{T_r})$ |
| <<red>>$\chi_r$ | $(\chi_{r,1}, \ldots, \chi_{r,L_r})$ |
| <<green>>$a_{0,k}^m$ | initial probability at state k of the HMM for entry m, with $1 \leq k \leq I_{C_m}$ |
| <<green>>$a_{i,k}^m$ | transition probability from state i to state k of the HMM for entry m, with $1 \leq i, k \leq I_{C_m}$ |
| <<green>>$b_{i,n}^m(\chi)$ | output probability of observing $\chi$ as the nth feature at state i of the HMM for entry m, with $1 \leq i \leq I_{C_m}$, $1 \leq n \leq N_{C_m}$, and $1 \leq \chi \leq Z_{C_m,n}$ |
| $Z_{c,n}$ | number of bins for the nth feature of the HMM for part-of-speech c |
| <<green>>$\lambda$ | entire HMM parameter space |
| $G_r$ | size of the competition set for video $D_r$ |
| $S_r^g$ | gth sentence in the competition set for video $D_r$ |
| $L_{r,g}$ | number of words in sentence $S_r^g$ |

(Quantities marked <<red>> are hidden. Quantities marked <<green>> are learned. Other quantities are provided.)

An unknown participant-to-track mapping bridges the gap between the sentence and the video. Consider a potential mapping $p_0 \mapsto \tau_{947}$, $p_1 \mapsto \tau_{319}$, and $p_2 \mapsto \tau_{239}$. This would result in the above sentence being grounded in a set of tracks as follows:

$$\text{person}(\tau_{947}) \wedge \text{to-the-left-}$$
$$\text{of}(\tau_{947}, \tau_{319}) \wedge \text{backpack}(\tau_{319}) \wedge \text{approached}$$
$$(\tau_{947}, \tau_{239}) \wedge \text{trash-can}(\tau_{239}) \quad (13)$$

In such grounding, tracks are bound to words first through the participant-to-track mapping and then through the argument-to-participant mapping. This allows the HMM for each word in the sentence to be instantiated for a collection of tracks. With known HMM parameters, an instantiated HMM can be used to score the observation of features calculated from those tracks. A sentence score can then be computed by aggregating the scores of all of the words in that sentence.

The above mechanism can either compute a MAP estimate of the most probable participant-to-track mapping or an exhaustive score summing all possible such mappings. The former can be computed with the algorithm and the latter can be computed with the forward algorithm. These computations are similar, differing only by replacing max with $\Sigma$.

The ML formulation scores a video-sentence pair r with:

$$L(D_r; S_r, \lambda) = \sum_{j_r} \underbrace{P(j_r | D_r)}_{\text{Track}} \underbrace{P(x_r | S_r, \lambda)}_{\text{Sentential}} \quad (14)$$

where $j_r$ denotes a transposition of a collection of object tracks for video clip r, one per participant. For example, if the tracks for the two participants were $\tau_{r,239}=(4, 2, 7, 8, 3)$ and $\tau_{r,947}=(1, 3, 7, 4, 9)$ (where each element in a sequence is the index of a detection in a particular frame, e.g., '2' means the second detection from the detection pool in the second frame, '7' means the seventh detection in the third frame, etc.), then $j_r=((4, 1), (2, 3), (7, 7), (8,4), (3,9))$. The sequence of features $x_r$ are computed from tracks $j_r$ that are bound to the words in $S_r$. Eq. 14 sums over the unknown participant-to-track mappings and in each such mapping it combines a "Sentential" score, in the form of the joint HMM likelihoods, with a "Track" score, which internally measures both detection quality in every frame and temporal coherence between every two adjacent frames. The Sentential score is itself $$P(x_r | S_r, \lambda) = \sum_{q_r} \prod_{l=1}^{L_r} P(x_{r,l}, q_{r,l} | S_{r,l}, \lambda) \quad (15)$$

$$P(x_{r,l}, q_{r,l} | S_{r,l}, \lambda) = \prod_{t=1}^{T_r} a_{q_{r,l}^{t-1}, q_{r,l}^t}^{S_{r,l}} \prod_{n=1}^{N_{C_{S_{r,l}}}} b_{q_{r,l}^t, n}^{S_{r,l}}(x_{r,l,n}^t) \quad (16)$$

A lexicon is learned by determining the unknown HMM parameters that explains the R training samples. The ML approach does this by finding the optimal parameters $\lambda^*$ that maximize a joint score $$L(D; S, \lambda) = \prod_{r=1}^{R} (D_r; S_r, \lambda) \quad (17)$$

Once $\lambda$ is learned, one can determine whether a given video depicts a given sentence by thresholding the score for that pair produced by Eq. 14.

Various aspects relate to discriminative training. The ML framework employs occurrence counting via Baum Welch on video clips paired with positive sentences. This framework to support DT on video clips paired with both positive and negative sentences is extended. As shown by way of experiments discussed herein, DT usually outperforms ML when there is a limited quantity of positive-labeled video clips.

Towards this end, for training sample r, let $G_r$ be the size of its competition set, a set formed by pooling one positive sentence and multiple negative sentences with video clip $D_r$. The ML score from Eq. 14 can be extended to yield a discrimination score between the positive sentences and the corresponding competition sets for each training sample, aggregated over the training set.

$$O(\lambda) = \sum_{r=1}^{R}\left[\underbrace{\log L(D_r; S_r, \lambda)}_{\text{Positive score}} - \underbrace{\log \sum_{g=1}^{G_r} L(D_r; S_r^g, \lambda)}_{\text{Competition score}}\right] \quad (18)$$

The Positive score is the log of Eq. 14 so the left half of $O(\lambda)$ is the log of the ML objective function Eq. 17. The Competition score is the log of the sum of scores so the right half measures the aggregate competition within the R competition sets. With parameters that correctly characterize the word and sentential meanings in a corpus, the positive sentences can all be true of their corresponding video clips, and thus have high score, while the negative sentences can all be false of their corresponding video clips, and thus have low score. Since the scores are products of likelihoods, they are nonnegative. Thus the Competition score is always larger than the Positive score and $O(\lambda)$ is always negative. Discrimination scores closer to zero yield positive sentences with higher score and negative sentences with lower score. Thus the goal is to maximize $O(\lambda)$.

This discrimination score is similar to the Maximum Mutual Information (MMI) criterion and can be maximized with the Extended Baum-Welch (EBW) algorithm used for speech recognition.

However, the discrimination score differs from that used in speech recognition in that each sentence score L is formulated on a cross product of Viterbi lattices, incorporating both a factorial HMM of the individual lexical entry HMMs for the words in a sentence, and tracks whose individual detections also participate in the Markov process as hidden quantities. It can be derived that the following reestimation formulas by constructing the primary and secondary auxiliary functions in EBW to iteratively maximize $O(\lambda)$:

$$a_{i,k}^m = \theta_i^m \sum_{\substack{r=1 \\ s.t.\ S_r^g = m}}^{R}\sum_{g=1}^{G_r}\sum_{l=1}^{L_{r,g}}\sum_{t=1}^{T_r}\left[\underbrace{\frac{L(q_{r,l}^{t-1} = i, q_{r,l}^t = k, D_r; S_r^g, \lambda')}{L(D_r; S_r^g, \lambda')}\epsilon(r, g)}_{\Delta\xi(r,g,l,i,k,t)} + C \cdot a_{i,k}^m\right] \quad (19)$$

$$b_{i,n}^m(h) = \phi_{i,n}^m \sum_{\substack{r=1 \\ s.t.\ S_{r,l}^g = m}}^{R}\sum_{g=1}^{G_r}\sum_{l=1}^{L_{r,g}}\sum_{t=1}^{T_r}\left[\underbrace{\frac{L(q_{r,l}^t = i, x_{r,l,n}^t = h, D_r; S_r^g, \lambda')}{L(D_r; S_r^g, \lambda')}\epsilon(r, g)}_{\Delta\gamma(r,g,l,n,i,h,t)} + C \cdot b_{i,n}^m(h)\right]$$

In the above, the coefficients $\theta_i^m$ and $\phi_{i,n}^m$ are for sum-to-one normalization, $L_{r,g}$ is the number of words in sentence $S_r^g$, $\epsilon(r,g)=\delta(S_r^g)-L(D_r; S_r^g, \lambda')/\Sigma_g L(D_r; S_r^g, \lambda')$ with $\delta(S_r^g)=1$ iff $S_r^g=S_r$, and $\alpha_{i,k}^{m'}$ and $b_{i,n}^{m'}(h)$ are in the parameter set $\lambda'$ of the previous iteration. The damping factor C is chosen to be sufficiently large so that the reestimated parameters are all nonnegative and $O(\lambda) \geq O(\lambda')$. In fact, C can be selected or calculated independently for each sum-to-one distribution (e.g., each row in the HMM transition matrix or the output distribution at each state). The $\Delta\epsilon(r, g, l, i, k, t)$ and $\Delta\gamma(r, g, l, n, i, h, t)$ in Eq. 19 are analogous to the occurrence statistics in the reestimation formulas of the ML framework and can be calculated efficiently using the Forward-Backward algorithm.

The difference is that they additionally encode the discrimination $\epsilon(r,g)$ between the positive and negative sentences into the counting.

While Eq. 19 efficiently yields a local maximum to $O(\lambda)$, it was found that, in practice, such local maxima do not achieve the global optimum sought. There are two reasons for this. First, the objective function has many shallow maxima which occur when there are points in the parameter space, far from the correct solution, where there is little difference between the scores of the positive and negative sentences on individual frames. At such points, a small domination of the positive samples over the negative ones in many frames, when aggregated, can easily overpower a large domination of the negative samples over the positive ones in a few frames. Second, the discrimination score from Eq. 18 tends to assign a larger score to shorter sentences. The reason is that longer sentences tend to have greater numbers of tracks and Eq. 14 takes a product over all of the tracks and all of the features for all of the words.

One remedy for both of these problems is to incorporate a sentence prior to the per-frame score:

$$\hat{L}(D_r, S_r; \lambda) = [L(D_r; S_r, \lambda)]^{\frac{1}{T_r}}\pi(S_r) \quad (20)$$

where $$\pi(S_r) = \exp\sum_{l=1}^{L_r}\left[E(I_{C_{S_{r,l}}}) + \sum_{n=1}^{N_{C_{S_{r,l}}}}E(Z_{C_{S_{r,l}},n})\right] \quad (21)$$

In the above, $Z_{C_{S_{r,l}},n}$ is the number of bins for the nth feature of the word $S_{r,l}$ whose part of speech is $C_{S_{r,l}}$ and $E(Y)=\log Y$ is the entropy of a uniform distribution over Y bins. Replacing L with $\hat{L}$ in Eq. 18 yields a new discrimination score:

$$\hat{O}(\lambda) = \sum_{r=1}^{R}\left[\log\hat{L}(D_r, S_r; \lambda) - \log\sum_{g=1}^{G_r}\hat{L}(D_r, S_r^g; \lambda)\right] \quad (22)$$

$\hat{O}$ is smoother than O which prevents the training process from being trapped in shallow local maxima.

Unfortunately, a way is not known how to adapt the Extended Baum-Welch algorithm to this objective function because of the exponents $1/T_r$ in Eq. 20. Fortunately, for any parameter $\lambda_{i,j}$ in the parameter set $\lambda$ that can obey a sum-toone constraint $\Sigma_k \lambda_{i,k}=1$, there exists a general reestimation formula using the Growth Transformation (GT) technique:

$$\lambda_{i,j} = \frac{\lambda'_{i,j}\left[\frac{\partial \hat{O}}{\partial \lambda_{i,j}}\bigg|_{\lambda_{i,j}=\lambda'_{i,j}} + C_i\right]}{\sum_k \lambda'_{i,k}\left[\frac{\partial \hat{O}}{\partial \lambda_{i,j}}\bigg|_{\lambda_{i,j}=\lambda'_{i,k}} + C_i\right]} \quad (23)$$

which guarantees that $\hat{O}(\lambda) \geq \hat{O}(\lambda')$ and that the updated parameters are nonnegative given sufficiently large values $C_i$ for every $\lambda_{i,j}$, similar to Eq. 19.

Two issues can be addressed to use Eq. 23. First, there is a need to compute the gradient of the objective function $\hat{O}$. Automatic differentiation (AD) is employed, specifically the ADOL-C package, which yields accurate gradients up to machine precision. The gradient computation can be sped up by rewriting the partial derivatives in Eq. 23 with the chain rule as $$\frac{\partial \hat{O}}{\partial \lambda_{i,j}} = \sum_{r=1}^{R}\left[\frac{\frac{\partial \hat{L}(D_r, S_r; \lambda)}{\partial \lambda_{i,j}}}{\hat{L}(D_r, S_r; \lambda)} - \frac{\sum_{g=1}^{G_r}\frac{\partial \hat{L}(D_r, S_r; \lambda)}{\partial \lambda_{i,j}}}{\sum_{g=1}^{G_r}\hat{L}(D_r, S_r; \lambda)}\right] \quad (24)$$

which decomposes the derivative of the entire function into the independent derivatives of the scoring functions. This decomposition also enables taking derivatives in parallel within a competition set.

The second issue to be addressed is how to pick values for $C_i$. On one hand, $C_i$ can be sufficiently large enough to satisfy the GT conditions (i.e., growth and nonnegativity). On the other hand, if it is too large, the growth step of each iteration will be small, yielding slow convergence. An adaptive method is employed to select $C_i$. Let y be the last iteration in which the objective function value increased. $C_i$ for the current iteration w+1 is selected by comparison between y and the previous iteration w:

$$C_i = \begin{cases} \max\left(0, -\min_k \frac{\partial \hat{O}}{\partial \lambda_{i,k}}\bigg|_{\lambda_{i,k}=\lambda'_{i,k}}\right) & w = y \\ \max(C'_i, \varepsilon) \cdot \chi & w > y \end{cases} \quad (25)$$

where $C'_i$ is the damping factor of the previous iteration w, $\chi > 1$ is a fixed punishment used to decrease the step size if the previous iteration failed, and $\varepsilon > 0$ is a small value in case $C'_i = 0$. Using this strategy, the algorithm usually converges within a few dozen iterations.

Successful application of DT to the problem requires that negative sentences in the competition set of a video clip adequately represent the negative sentential population of that video clip. It is desired to differentiate a positive sentence from as many varied negative sentences as possible. Otherwise the discrimination between a positive label and only small portion of the negative population would be maximized. Poor selection of negative sentences will fail to avoid local optima.

With larger, and potentially recursive, grammars, the set of all possible sentences can be large and even infinite. It is thus infeasible to annotate video clips with every possible positive sentence. Without such annotation, it is not possible to take the set of negative sentences as the complement of the set of positive sentences relative to the set of all possible sentences generated by a grammar and lexicon. Instead, a restricted grammar is created that generates a small finite subset of the full grammar. All sentences generated by this restricted grammar that are true of a given video clip and take the population of negative sentences for this video clip to be the complement of that set relative to the restricted grammar are manually annotated. However, the optimization problem would be intractable if this entire set of negative sentences were used, as it could be large. Instead, negative sentences from this population are randomly sampled. Ideally, it is desired that the size of this set to be sufficiently small to reduce computation time but sufficiently large to be representative.

Nevertheless, it is still difficult to find a restricted grammar that both covers the lexicon and has a sufficiently small set of possible negative sentences so that an even smaller representative set can be selected. Thus a two-phase regimen is adopted where a subset of the lexicon is trained that admits a suitable restricted grammar using DT and then train the full lexicon using ML where the initial lexicon for ML contains the output entries for those words trained by DT. Choosing a subset of the lexicon that admits a suitable restricted grammar allows a small set of negative sentences to adequately represent the total population of negative sentences relative to that restricted grammar and enables DT to quickly and correctly train the words in that subset. That subset 'seeds' the subsequent larger ML problem over the entire lexicon with the correct meanings of those words facilitating improved convergence to the correct entries for all words. A suitable restricted grammar is one that generates sentences with just nouns and a single verb, omitting prepositions and adverbs. Since verbs have limited arity, and nouns simply fill argument positions in verbs, the space of possible sentences generated by this grammar is thus sufficiently small.

To compare ML and DT on this problem, the same experimental setup was used as that in the ML framework. This includes the dataset (61 videos with 159 annotated positive sentences), the off-the-shelf object detector, the HMM configurations, the features, the three-fold cross-validation design, the baseline methods CHANCE, BLIND, and HAND, and the twenty-four test sentences divided into two sets NV and ALL. Each test sentence, either in NV or in ALL, is paired with every test video clip. The trained models are used to score every video-sentence pair produced by such according to Eq. 20. Then a binary judgment is made on the pair deciding whether or not the video clip depicts the paired sentence. This entire process is not exactly the same on the baseline methods: CHANCE randomly classifies a video-sentence pair as a hit with probability 0.5; BLIND only looks at the sentence but never looks at the video, whose performance can be bounded through yielding the optimal classification result in terms of the maximal F1 score with known groundtruth; HAND uses human engineering HMMs instead of trained HMMs.

As discussed herein, two-phase training regimen is adopted which discriminatively trains positive and negative sentences that only contain nouns and a single verb in the first phase and trains all sentences over the entire lexicon based on ML in the second phase. In the first phase, for each positive sentence in a training sample, 47 sentences are randomly selected from the corresponding negative population and form a competition set of size 48 by adding in the positive sentence.

The two-phase learning algorithm (DT+ML) is compared with the original one-phase algorithm (ML). For an apples-to-apples comparison, a two-phase training routine is implemented with only ML in both phases (ML+ML), i.e., DT in the first phase of the algorithm is replaced by ML. In the following, experimental results for all three algorithms: ML, ML+ML, and DT+ML are reported. Together with the three baselines above, in total there are six methods for comparison.

Figure 3A:
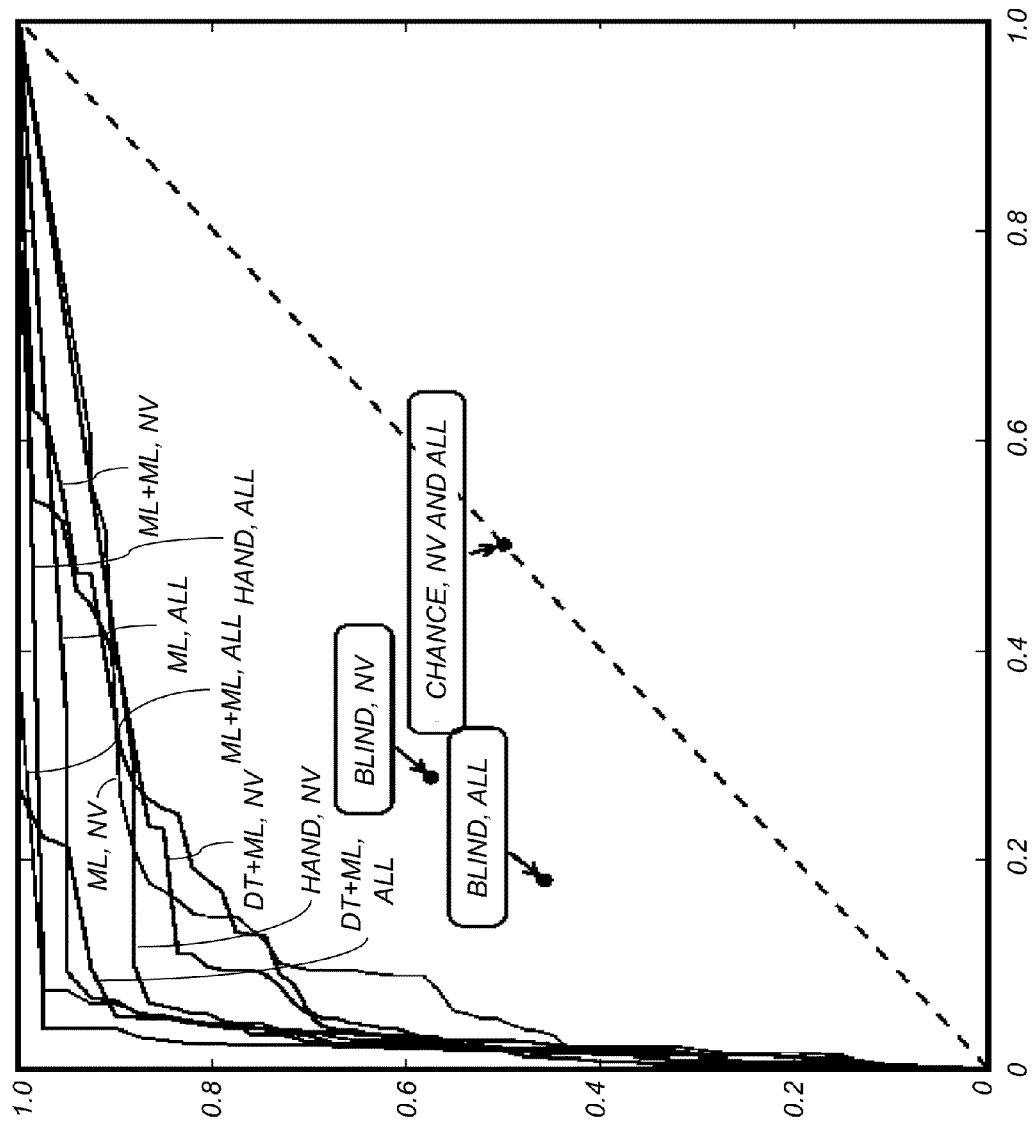
FIGS. 3A, 3B, and 3C show performance of various classification methods for or size ratios of 0.67, 0.33, and 0.17, respectively.
Figure 3B:
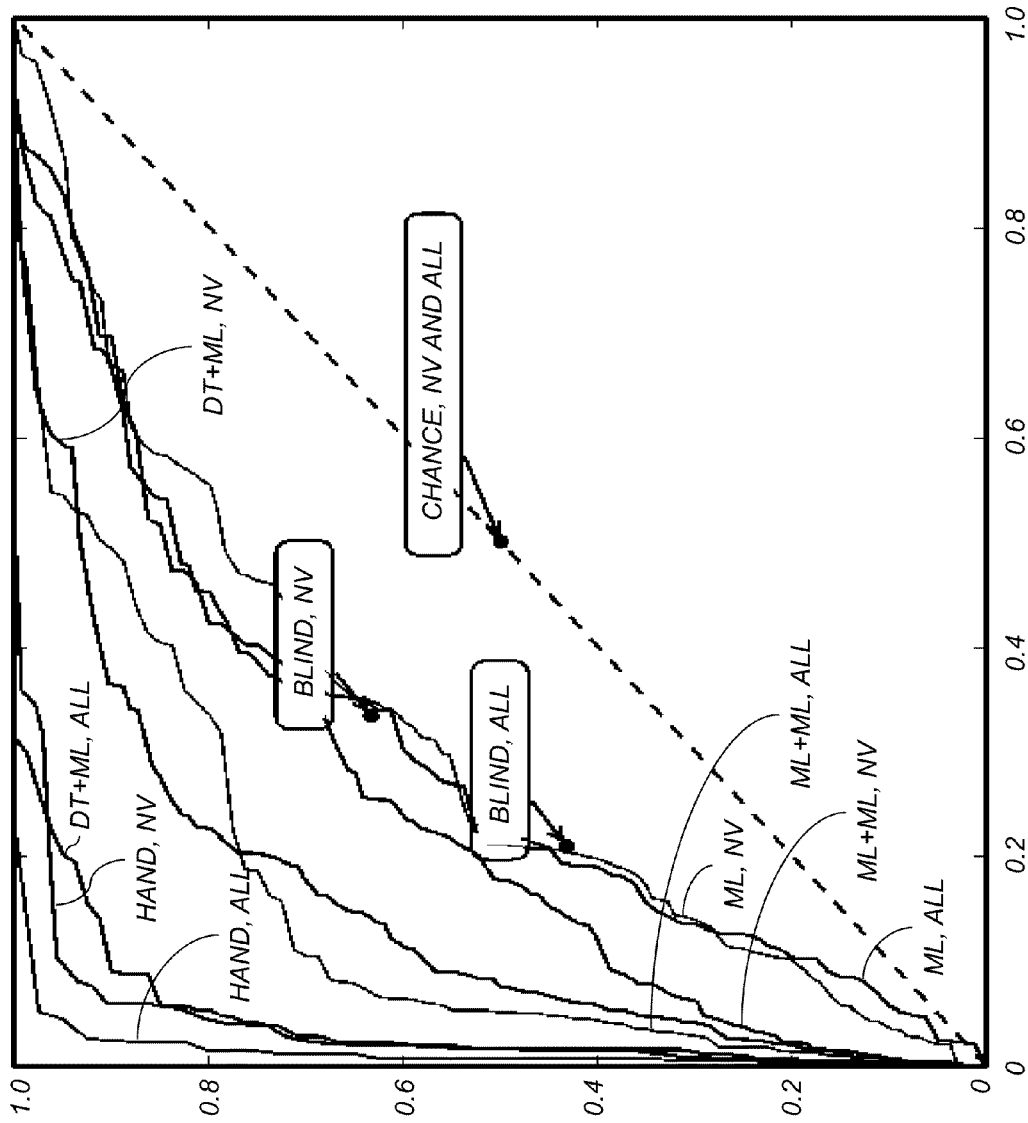
Figure 3C:
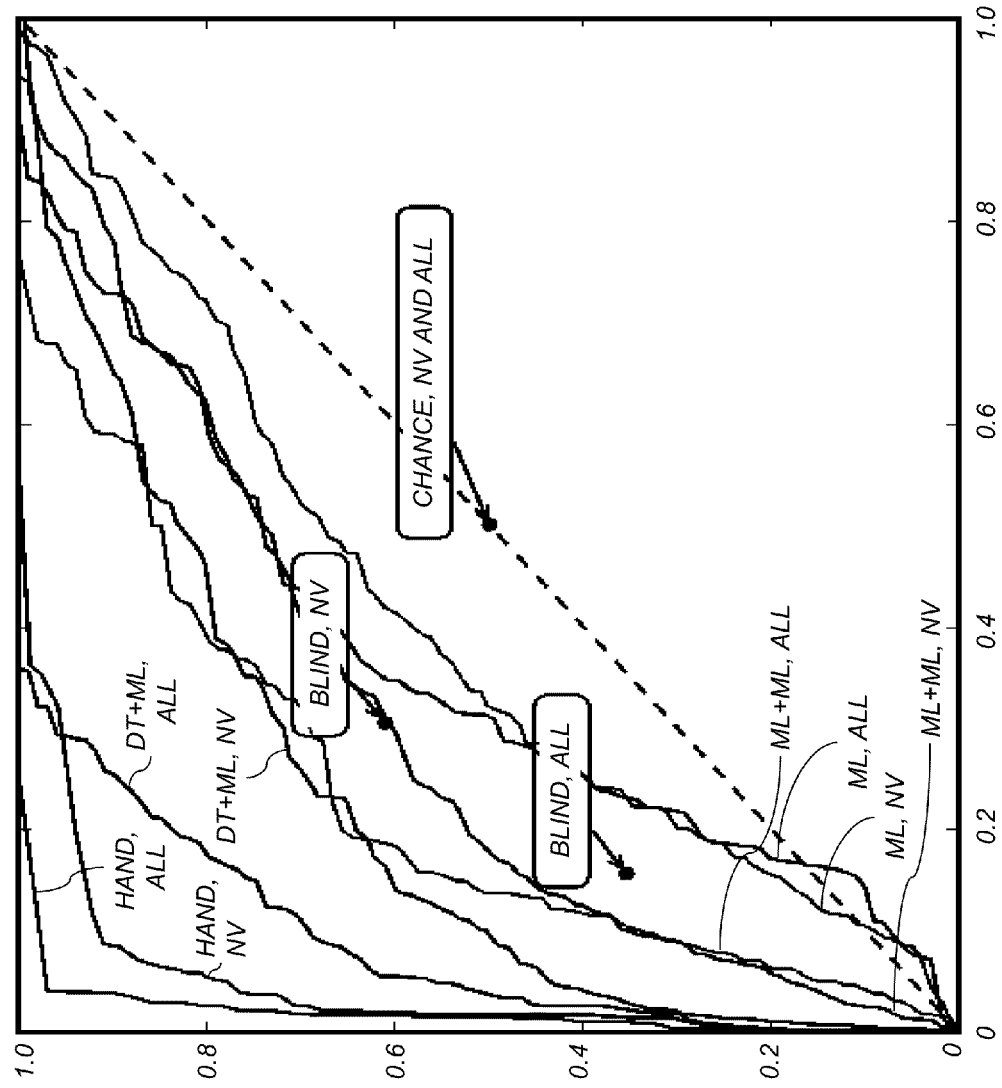

To show the advantage of DT over ML on small training sets, consider three distinct ratios of the size of the training set with respect to that of the whole dataset: 0.67, 0.33, and 0.17. This results in about 40, 20, or 10 training video clips, tested on the remaining 20, 40, or 50 video clips for the above size ratios respectively. The training and testing routines were unchanged across ratios. Perform a separate three-fold cross validation for each ratio and then pool the results to obtain ROC curves for that ratio. Since CHANCE and BLIND directly output a binary judgment instead of a score on each testing video-sentence pair, the ROC curves contain points for these baselines instead of curves. The performance of the six methods on different ratios is illustrated in FIGS. 3A, 3B, and 3C for size ratios of 0.67, 0.33, and 0.17, respectively.

Several observations can be made from the figure. First, the performance of both DT and ML gradually increases as the ratio increases. Their performance is far from that of HAND on the smallest training set with ratio 0.17 while it is very close on the largest training set with ratio 0.67. This implies that as the learning problem is better constrained given more training data, both training algorithms find improved local maxima. Second, the performance gap between DT and ML gradually decreases as the ratio increases. With ratio 0.17, although both DT and ML perform poorly, the gap between them is the largest. In this case, the learning problem is highly unconstrained, which makes ML suffer more severely from incorrect local optima than DT. However, with ratio 0.67, the problem is well constrained and there is almost no performance gap; sometimes ML can outperform DT. Third, the two-phase ML+ML generally has improved performance to the one-phase ML. Fourth, results on ALL are generally an improvement to those on NV. The reason is that longer sentences with varied parts of speech incorporate more information into the scoring function from Eq. 20.

A DT framework is described for learning word meaning representations from video clips paired with only sentential labels in a weakly supervised fashion. The present method is able to automatically determine the word-to-meaning mappings from the sentences to the video data. Unlike the ML framework, the framework exploits not only the information of positive sentential labels but also that of negative labels, which makes the learning problem better constrained given the same amount of video data. It is shown that in various aspects DT outperforms ML on small training datasets. Currently, the learning problem makes several assumptions about knowing: the grammar, the arity of each entry in the lexicon, and the participant number in each sentence, etc. In the future, gradual removal these assumptions is sought by also learning these knowledge from training data.

Various aspects relate to "saying what you're looking for," e.g., linguistic video search.

Presented is an approach to searching large video corpora for video clips which depict a natural-language query in the form of a sentence. This approach uses compositional semantics to encode subtle meaning that is lost in other systems, such as the difference between two sentences which have identical words but entirely different meaning: "The person rode the horse" vs. "The horse rode the person". Given a video-sentence pair and a natural-language parser, along with a grammar that describes the space of sentential queries, a score is produced that indicates how well the video depicts the sentence. Such a score is produced for each video clip in a corpus and a ranked list of clips is returned. Furthermore, this approach addresses two fundamental problems simultaneously: detecting and tracking objects, and recognizing whether those tracks depict the query. Because both tracking and object detection are unreliable, this uses knowledge about the intended sentential query to focus the tracker on the relevant participants and ensures that the resulting tracks are described by the sentential query. While various prior aspects were limited to single-word queries which correspond to either verbs or nouns, it is shown how to perform a search for complex queries which contain multiple phrases, such as prepositional phrases, and modifiers, such as adverbs. This approach is demonstrated by searching for 141 queries involving people and horses interacting with each other in 10 full-length Hollywood movies.

Video search engines lag behind text search engines in their wide use and performance. This is in part because the most attractive interface for finding videos remains a natural-language query in the form of a sentence but determining if a sentence describes a video remains a difficult task. This task is difficult for a number of different reasons: unreliable object detectors which are required to determine if nouns occur, unreliable event recognizers which are required to determine if verbs occur, the need to recognize other parts of speech such as adverbs or adjectives, and the need for a representation of the semantics of a sentence which can faithfully encode the desired natural-language query. An approach which simultaneously addresses all of these problems is described. Systems to date generally attempt to independently address the various aspects that make this task difficult. For example, an attempt is made to separately find videos that depict nouns and videos that depict verbs and essentially take the intersection of the two sets of videos. This general approach of solving these problems piecemeal cannot represent crucial distinctions between otherwise similar input queries. For example, if you search for "The person rode the horse" and for "The horse rode the person", existing systems would give the same result for both queries as they each contain the same words, but clearly the desired output for these two queries is very different. A holistic approach is developed which both combines tracking and word recognition to address the problems of unreliable object detectors and trackers and at the same time uses compositional semantics to construct the meaning of a sentence from the meaning of its words in order to make crucial but otherwise subtle distinctions between otherwise similar sentences. Given a grammar and an input sentence, that sentence is parsed and, for each video clip in a corpus, all objects that the sentence refers to are simultaneously tracked and enforce that all tracks can be described by the target sentence using an approach called the sentence tracker. Each video is scored by the quality of its tracks, which are guaranteed by construction to depict the target sentence, and the final score correlates with the confidence that the resulting tracks correspond to real objects in the video. A score is produced for every video-sentence pair and return multiple video hits ordered by their scores.

Various prior semantic video search approaches focus on detecting nouns, detecting verbs, or using language to search already-existing video annotation. Various aspects that detect objects do not employ object detectors, but instead relies on statistical features to cluster videos with similar objects.

It has been shown to extract local features from a positive example of an object to find various aspects of frames that contain the same object. It has also been shown how to track stable image patches to extract object tracks over the duration of a video and group similar tracks into object classes. Without employing an object detector, these methods cannot search a collection of videos for a particular object class but instead can search by example. Prior schemes relating to verb detection are not integrated with prior schemes for object detection. For example, it has been shown how to find one of four different highlights in basketball games using hidden Markov models and the structure of a basketball game. This scheme does not detect objects but instead classifies entire presegmented clips, is restricted to a small number of domain-specific actions, and supports only single-word queries.

It has been shown to track one object, a soccer ball, and detect actions being performed on that object during a match by the position and velocity of the object. This scheme supports a small number of domain-specific actions and is limited to a single object. In summary, the above approaches only allow for searching for a single word, a verb, and are domain-specific.

Prior aspects of more complex queries involving both nouns and verbs essentially encodes the meaning of a sentence as a conjunction of words, discarding the semantics of the sentence. Various combinations of text search, verb retrieval, and noun retrieval have been presented, and essentially allow for finding videos which are at the intersection of multiple search mechanisms. It has been shown to rely on annotating a video corpus with sentences that describe each video in that corpus. Various schemes employ text-based search methods which given a query, a conjunction of words, attempt to find videos of similar concepts as defined by the combination of an ontology and statistical features of the videos. A prior model for a sentence is a conjunction of words where higher-scoring videos more faithfully depict each individual word but the relationship between words is lost. None of these methods attempt to faithfully encode the semantics of a sentence and none of them can encode the distinction between "The person hit the ball" and "The ball hit the person".

In what follows, a system is described, which unlike previous approaches, allows for a natural-language query of video corpora which have no human-provided annotation, using an algorithm. Given a sentence and a video corpus, the algorithm retrieves a ranked list of videos which are described by that sentence. A method of constructing a lexicon with a small number of parameters is shown, which are reused among multiple words, permitting training those parameters readily and ensuring the system need not be shown positive examples of every word in the lexicon. A novel way is presented to combine the semantics of words into the semantics of sentences and to combine sentence recognition with object tracking in order to score a video-sentence pair. To show this approach, 141 natural-language queries of a corpus of 10 full-length Hollywood movies is run using a grammar which includes nouns, verbs, adverbs, and spatial-relation and motion prepositions. This approach can search for complex queries which include multiple phrases, such as prepositional phrases, and modifiers, such as adverbs, unlike various prior schemes.

An object detector is run on every frame of a video producing a set of axis-aligned rectangles along with scores which correspond to the strength of each detection. There are two reasons why a tracker is needed and cannot just take the top-scoring detection in every frame. First, there may be multiple instances of the same object in the field of view. Second, object detectors are extremely unreliable. Even on standard benchmarks, such as the PASCAL Visual Object Classes (VOC) Challenge, even the most accurate detectors for the easiest-to-detect object classes achieve average-precision scores of 40% to 50%. Both of these problems are overcome by integrating the intra-frame information available from the object detector with inter-frame information computed from optical flow.

The motion of correct tracks agrees with the motion of the objects in the video which can be computed separately and independently of any detections using optical flow. This quantity is called the motion coherence of a track. In other words, given a detection corresponding to an object in the video, the average optical flow inside that detection is computed and forward-project the detection along that vector, and find a strong detection in the next frame at that location. This intuition is formalized into an algorithm which finds an optimal track given a set of detections in each frame. Each detection j has an associated axis-aligned rectangle $b_j^t$ and score $f(b_j^t)$ and each pair of detections has an associated temporal coherence score $g(b_{j'}^{t-1}, b_j^t)$ where t is the index of the current frame in a video of length T.

The score of a track $j = \langle j^1, \ldots, j^T \rangle$ is formulated as $$\max_{j^1,\ldots,j^T} \sum_{t=1}^{T} f(b_{j^t}^t) + \sum_{t=2}^{T} g(b_{j^{t-1}}^{t-1}, b_{j^t}^t) \quad (26)$$

where g, the motion coherence, is taken to be a function of the squared Euclidean distance between the center of $b_{j'}^{t-1}$ and the center of $b_j^t$ projected one frame forward. While the number of possible tracks is exponential in the number of frames in the video, Eq. 26 can be maximized in time linear in the number of frames and quadratic in the number of detections per frame using dynamic programming, e.g., the Viterbi algorithm.

Various aspects generate multiple tracks per object class by non-maxima suppression. Some trackers use the raw detection scores from the detector. However, these scores can be difficult to interpret because the mean score and variance varies by object class making it difficult to decide whether a detection is strong. To get around this problem, in various aspects, all detections pass through a sigmoid $$\frac{1}{1 + \exp(-b(t-a))}$$

whose center, a, is the model threshold and whose scaling factor b, is 2. This normalizes the score to the range [0, 1] and makes scores more comparable across models. In addition, the motion coherence score is also passed through a similar sigmoid, with center 50 and scale −1/11.

Given tracks, it is desirable to determine whether a word describes one or more of those tracks. This is a generalization of event recognition, generalizing the notion of an event from verbs to other parts of speech. To recognize if a word describes a collection of tracks, features are extracted from those tracks and use those features to formulate the semantics of words. Word semantics are formulated in terms of finite state machines (FSMs) that accept one or more tracks. Table 7 provides an overview of various FSMs used herein, rendered as regular expressions along with their semantics. Hidden Markov models (HMMs) can be used to encode the semantics of words. The FSMs substantially correspond to unnormalized HMMs with binary transition matrices and binary output distributions.

Word meaning is constructed in two levels. First, 18 predicates are constructed, shown in Table 6, which accept one or more detections. Then word meanings for the lexicon of 15 words are constructed, shown in Table 7, as regular expressions which accept tracks and are composed out of these predicates. The reason for this two-level construction is to allow for sharing of low-level features and parameters. All words share the same predicates which are encoded relative to 9 parameters: far, close, stationary, $\Delta$closing, $\Delta$angle, $\Delta$pp, $\Delta$quickly, $\Delta$slowly, and overlap. These parameters are learned from a small number of positive and negative examples that cover only a small number of words in the lexicon.

To make predicates independent of the video resolution, detections are first rescaled relative to a standard resolution of 1280×720, otherwise parameters such as far would vary with the resolution.

Table 6 shows predicates that accept detections. In Table 6, detections are denoted by a and b. The function "project" projects a detection forward one frame using optical flow. The functions "flow-orientation" and "flow-magnitude" compute the angle and magnitude of the average optical-flow vector inside a detection. The function $a_{cx}$ accesses the x coordinate of the center of a detection. The function $a_{width}$ computes the width of a detection. Words are formed as regular expressions over these predicates.

Table 7 shows regular expressions which encode the meanings of each of the 15 words or lexicalized phrases in the lexicon as regular expressions composed of the predicates shown in Table 6. An extended regular expression syntax is used. An exponent of + allows a predicate to hold for one or more frames and exponent of {t,} allows a predicate to hold for t or more frames.

Given a regular expression for a word, a non-deterministic FSM can be constructed, with one accepting state, whose allowable transitions are encoded by a binary transition matrix h, giving score zero to allowed transitions and $-\infty$ to disallowed transitions, and whose states accept detections which agree with the predicate a, again with the same score of zero or $-\infty$. With this FSM, if a word describes a track $\langle \hat{j}^1, \ldots, \hat{j}^T \rangle$ it can be recognized, by finding $$\max_{k^1,\ldots,k^T} \sum_{t=1}^{T} h(k^t, b_{\hat{j}^t}^t) + \sum_{t=2}^{T} a(k^{t-1}, k^t) \quad (27)$$

where $k^1$ through $k^{T-1}$ range over the set of states of the FSM and $k^T$ is the singleton set containing the accepting state. If this word describes the track, the score will be zero. If it does not, the score will be $-\infty$. The above formulation can be extended to multiple tracks. Accepting paths are found through the lattice of states using dynamic programming, the Viterbi algorithm. Note that this method can be applied to encode not just the meaning of verbs but also of other parts of speech, for example the meaning of "left-of". The ability to encode the meaning of all parts of speech into a uniform representation in order to build up the semantics of sentences from the semantics of words is available.

TABLE 6

| | | |
|---|---|---|
| FAR(a, b) | ≜ | $\|a_{cx} - b_{cx}\| - \frac{a_{width}}{2} - \frac{b_{width}}{2} >$ far |
| REALLY-CLOSE(a, b) | ≜ | $\|a_{cx} - b_{cx}\| - \frac{a_{width}}{2} - \frac{b_{width}}{2} > \frac{close}{2}$ |
| CLOSE(a, b) | ≜ | $\|a_{cx} - b_{cx}\| - \frac{a_{width}}{2} - \frac{b_{width}}{2} > \frac{close}{2}$ |
| STATIONARY(b) | ≜ | flow-magnitude(t) ≤ stationary |
| CLOSING(a, b) | ≜ | $\|a_{cx} - b_{cx}\| > \|project(a)_{cx} - project(b)_{cx}\| + \Delta closing$ |
| DEPARTING(a, b) | ≜ | $\|a_{cx} - b_{cx}\| < \|project(a)_{cx} - project(b)_{cx}\| + \Delta closing$ |
| MOVING-DIRECTION(a, b, α) | ≜ | \|flow-orientation(a) − α°\| < $\Delta$angle ∧ flow-magnitude(a) > stationary |
| LEFT-OF(a, b) | ≜ | $a_{cx} < b_{cx} + \Delta pp$ |
| RIGHT-OF(a, b) | ≜ | $a_{cx} > b_{cx} + \Delta pp$ |
| LEFTWARD(a, b) | ≜ | MOVING-DIRECTION(a, b, 0) |
| LEFTWARD(a, b) | ≜ | MOVING-DIRECTION(a, b, π) |
| STATIONARY-BUT-FAR(a, b) | ≜ | FAR(a, b)) ∧ STATIONARY(a) ∧ STATIONARY(b) |
| STATIONARY-BUT-CLOSE(a, b) | ≜ | CLOSE(a, b)) ∧ STATIONARY(a) ∧ STATIONARY(b) |
| MOVING-TOGETHER(a, b) | ≜ | \|flow-orientation(a) − flow-orientation(b)\|° < $\Delta$angle ∧ flow-magnitude(a) > stationary ∧ flow-magnitude(b) > stationary |
| APPROACHING(a, b) | ≜ | CLOSING(a, b)) ∧ STATIONARY(b) |
| QUICKLY(a) | ≜ | flow-magnitude(a) > $\Delta$quickly |
| SLOWLY(a) | ≜ | stationary < flow-magnitude(a) < $\Delta$slowly |
| OVERLAPPING(a, b) | ≜ | $\frac{a \cap b}{a \cup b} \geq$ overlap |

TABLE 7

| | | |
|---|---|---|
| horse(a) | ≙ | $(a_{object\text{-}class} = \text{"horse"})^+$ |
| person(a) | ≙ | $(a_{object\text{-}class} = \text{"person"})^+$ |
| quickly(a) | ≙ | $\text{true}^+ \text{ QUICKLY}(a)^{\{3,\}} \text{true}^+$ |
| slowly(a) | ≙ | $\text{true}^+ \text{ SLOWLY}(a)^{\{3,\}} \text{true}^+$ |
| from the left(a, b) | ≙ | $\text{true}^+ \text{ LEFT-OF}(a, b)^{\{5,\}} \text{true}^+$ |
| from the right(a, b) | ≙ | $\text{true}^+ \text{ RIGHT-OF}(a, b)^{\{5,\}} \text{true}^+$ |
| leftward(a) | ≙ | $\text{true}^+ \text{ LEFTWARD}(a)^{\{5,\}} \text{true}^+$ |
| rightward(a) | ≙ | $\text{true}^+ \text{ RIGHTWARD}(a)^{\{5,\}} \text{true}^+$ |
| to the left of(a, b) | ≙ | $\text{true}^+ \text{ LEFT-OF}(a, b)^{\{3,\}} \text{true}^+$ |
| to the right of(a, b) | ≙ | $\text{true}^+ \text{ RIGHT-OF}(a, b)^{\{3,\}} \text{true}^+$ |
| towards(a, b) | ≙ | STATIONARY-BUT-FAR(a, b)$^+$ APPROACHING(a, b)$^{\{3,\}}$ STATIONARY-BUT-CLOSE(a, b)$^+$ |
| away from(a, b) | ≙ | STATIONARY-BUT-CLOSE(a, b)$^+$ DEPARTING(a, b)$^{\{3,\}}$ STATIONARY-BUT-FAR(a, b)$^+$ |
| ride(a, b) | ≙ | $\text{true}^+ \text{ (MOVING-TOGETHER}(a, b) \wedge \text{OVERLAPPING}(a, b))^{\{5,\}} \text{true}^+$ |
| lead(a, b) | ≙ | $\text{true}^+$ |
| | ≙ | $\begin{pmatrix} \neg \text{ REALLY-CLOSE}(a, b) \wedge \\ \text{MOVING-TOGETHER}(a, b) \wedge \\ \begin{pmatrix} (\text{LEFT-OF}(a, b) \wedge \text{LEFTWARD}(a)) \vee \\ (\text{RIGHT-OF}(a, b) \wedge \text{RIGHTWARD}(a)) \end{pmatrix} \end{pmatrix}^{\{5,\}} \text{true}^+$ |
| approach(a, b) | ≙ | $\text{true}^+ \text{APPROACHING}(a, b)^{\{5,\}} \text{true}^+$ |

It is desirable to search for videos given a natural-language query in the form of a sentence. The framework developed so far falls short of supporting this goal in two ways. First, as an attempt is made to recognize multiple words that constrain a single track, it becomes unlikely that the tracker will happen to produce an optimal track which satisfies all the desired predicates. For example, a person that is both "running" and doing so "leftward" is desired. Second, a sentence is not a conjunction of words, even though a word is represented here as a conjunction of features, so a new mechanism is required to faithfully encode the semantics of a sentence. Intuitively, a way to encode the mutual dependence is needed in the sentence "The tall person rode the horse" so that the person is tall, not the horse, and the person is riding the horse, not vice versa.

The first point is addressed by biasing the tracker to produce tracks which agree with the predicates that are being enforced. This may result in the tracker producing tracks which include lower-scoring detections, which decreases the probability that these tracks correspond to real objects in the video, This is not a concern as the users will be presented with results ranked by their tracker score. In essence, a penalty is paid for forcing a track to agree with the enforced predicates and the ultimate rank order is influenced by this penalty. The computational mechanism that enables this exists by virtue of the fact that the tracker and word recognizer have the same internal representation and algorithm, namely, each finds optimal paths through a lattice of detections and states, respectively, and each weights the links in that lattice by a score, the motion coherence and state-transition score, respectively. Simultaneously, the optimal, highest-scoring, track $j^1, \ldots, j^T$ and state sequence $k^1, \ldots, k^T$ is found $$\max_{j^1,\ldots,j^T} \max_{k^1,\ldots,k^T} \sum_{t=1}^{T} f(b_{j^t}^t) + \sum_{t=2}^{T} g(b_{j^{t-1}}^{t-1}, b_{j^t}^t) + \sum_{t=1}^{T} h(k^t, b_{j^t}^t) + \sum_{t=2}^{T} a(k^{t-1}, k^t) \quad (28)$$

which ensures that, unless the state sequence for the word FSM leads to an accepting state, the resulting score will be $-\infty$ and thereby constrains the tracks to depict the word. Intuitively, there are two lattices, a tracker lattice and a word-recognizer lattice, and the optimal path is found, again with the Viterbi algorithm, through a cross-product lattice.

The above handles only a single word, but given a sentential query, it is desirable to encode its semantics in terms of multiple words and multiple trackers. An input sentence is parsed with a grammar, e.g., that shown in Table 8, and extract the number of participants and the track-to-role mapping. The grammar shown in Table 8 was used for sentential queries in various experiments. Each sentence has a number of thematic roles that can be filled by participants in order for the sentence to be syntactically valid. For example, in the sentence "The person rode the horse quickly away from the other horse", there are three participants, one person and two horses, and each of the three participants plays a different role in the sentence, "agent", "patient", and "goal". Each word in this sentence refers to a subset of these three different participants, as shown in FIG. 5, and words that refer to multiple participants, such as "ride", can be assigned participants in the correct order to ensure that it is encoded "The person rode the horse" rather than "The horse rode the person". A custom natural-language parser is used which takes as input a grammar, along with the arity and thematic roles of each word, and computes a track-to-role mapping: which participants fill which roles in which words. The same mechanism is employed as described above for simultaneous word recognition and tracking, except that one tracker is substantiated for each participant and one word recognizer for each word. The thematic roles, $\theta_w^n$, map the nth role in a word w to a tracker. FIG. 5 displays an overview of this mapping for a sample sentence. Trackers are shown in red, word recognizers are shown in blue, and the track-to-role mapping is shown using the arrows. Given a sentential query that has W words, L participants, and track-to-role mapping $\theta_w^n$, a collection of optimal tracks is found $\langle j_1^1, \ldots, j_1^T \rangle \ldots \langle j_L^1, \ldots, j_L^T \rangle$, one for each participant, and accepting state sequences $\langle k_1^1, \ldots, k_1^T \rangle \ldots \langle k_W^1, \ldots, k_W^T \rangle$, one for each word, as $$\max_{\substack{j_1^1,\ldots,j_1^T, k_1^1,\ldots,k_1^T \\ j_L^1,\ldots,j_L^T, k_W^1,\ldots,k_W^T}} \sum_{l=1}^{L}\sum_{t=1}^{T} f(b_{j_l}^t) + \sum_{t=2}^{T} g(b_{j_l}^{t-1}, b_{j_l}^t) + \quad (29)$$

$$\sum_{w=1}^{W}\sum_{t=1}^{T} h_w\left(k_w^t, b_{j_{\theta_w^1}^t}^t, b_{j_{\theta_w^2}^t}^t\right) + \sum_{t=2}^{T} a_w(k_w^{t-1}, k_w^t)$$

where $a_w$ and $h_w$ are the transition matrices and predicates for word w, $$b_{j_l}^t$$

is a detection in the tth frame of the lth track, and $$b_{j_{\theta_w^n}^t}^t$$

connects a participant that fills the nth role in word w with the detections of its tracker. This equation maximizes the tracker score for each tracker corresponding to each participant, and ensures that each word has a sequence of accepting states, if such a sequence exists, otherwise the entire sentence-tracker score will be $-\infty$. In essence, cross products of tracker lattices and word lattices are taken while ensuring that the sequence of cross products agrees with the track-to-role mapping and finding the optimal path through the resulting lattice. This permits employing the same computational mechanism, the Viterbi algorithm, to find this optimal node sequence. The resulting tracks will satisfy the semantics of the input sentence, even if this means paying a penalty by having to choose lower-scoring detections.

Figure 4:
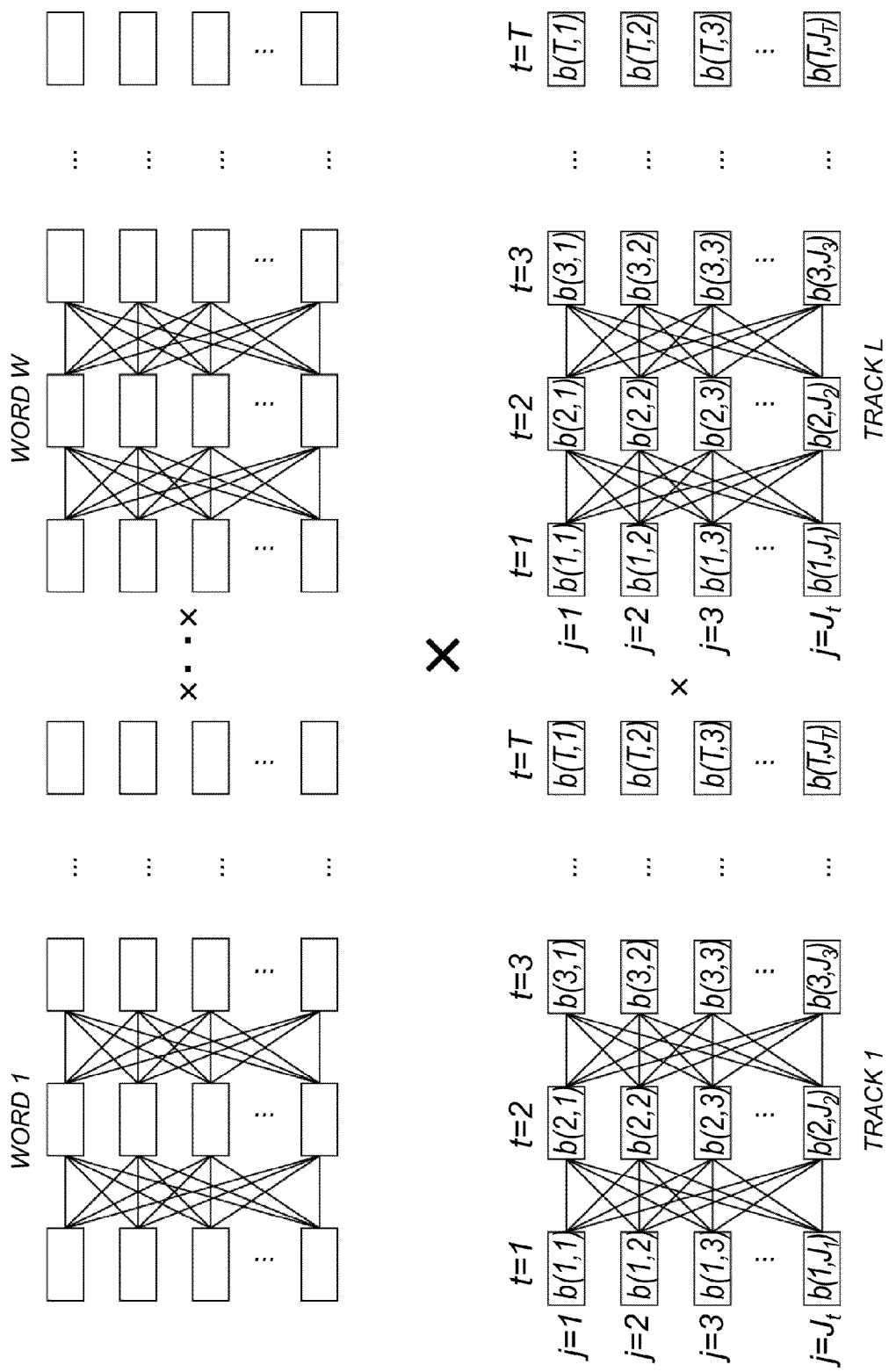
FIG. 4 shows exemplary lattices used to produce tracks for objects.

FIG. 4 shows exemplary tracker lattices used to produce tracks for each object. Word lattices constructed from word FSMs recognize one or more tracks. The cross product of multiple tracker lattices and word lattices is taken to simultaneously track objects and recognize words. By construction, this ensures that the resulting tracks are described by the desired words.

For clarity of the figures, in the nodes of the tracker lattices ("track 1" through "track L"), the notation b($\Xi$, $\Omega$) is used in the figures. This corresponds to the notation $b_\Omega^\Xi$ throughout this disclosure, for any $\Xi$, $\Omega$.

FIG. 5 shows an example of a sentence and trackers. The order of cross products required to encode the meaning of a sentence is not arbitrary and is shown here by the arrows connecting each word to each tracker, shown in red. The number of tracks is determined by parsing the sentence. The lattices for words or lexicalized phrases such as "away from" are cross producted with the tracks that those words refer to. The dashed line indicate that the order of the cross products is significant for words which have more than one role, in other words "rode" is not symmetric.

TABLE 8

| S → NP VP | NP → D N [PP] |
|---|---|
| D → "the" | N → "person" \| "horse" |
| PP → P NP | P → "to the left of" \| "to the right of" |

TABLE 8-continued

| VP → V NP [Adv] [PP$_M$] | V → "lead" \| "rode" \| "approached" |
|---|---|
| Adv → "quickly" \| "slowly" | PP$_M$ → P$_M$ NP \| "from the left" \| |
| P$_M$ → "towards" \| "away from" | "from the right" |

A system has been developed which scores a video-sentence pair telling how well a video depicts a sentence. Given a sentential query, the sentence tracker is run on every video in a corpus and all results ranked by their scores are returned. The improved score indicates a higher likelihood that the resulting tracks correspond to real objects in the video while the sentence tracker itself ensures that all tracks produced satisfy the sentential query. To save on redundant computation, the object-detector results are cached for each video as the detection scores are independent of the sentential query.

To show this approach to video search, sentential queries were run over a corpus of 10 Hollywood westerns: Black Beauty (Warner Brothers, 1994), The Black Stallion (MGM, 1979), Blazing Saddles (Warner Brothers, 1974), Easy Rider (Columbia Pictures, 1969), The Good the Bad and the Ugly (Columbia Pictures, 1966), Hidalgo (Touchstone Pictures, 2004), National Velvet (MGM, 1944), Once Upon a Time in Mexico (Columbia Pictures, 2003), Seabiscuit (Universal Pictures, 2003), and Unforgiven (Warner Brothers, 1992). In total, this video corpus has 1187 minutes of video, roughly 20 hours. All videos are temporally downsampled to 6 frames per second but keep their original spatial resolutions which varied from 336×256 pixels to 1280×544 pixels with a mean resolution of 659.2×332.8 pixels. These videos are split into 37187 clips, each clip being 18 frames (3 seconds) long, which overlaps the previous clip by 6 frames. This overlap ensures that actions that might otherwise occur on clip boundaries will also occur as part of a clip. While there is prior research on shot segmentation it is not employed herein for two reasons. First, it complicates the system and provides an avenue for additional failure modes. Second, the approach taken here is able to find an event inside a longer video with multiple events. The only reason why the videos are split up into clips is to return multiple such events.

The grammar from Table 8 is adopted which allows for sentences that describe people interacting with horses, hence the choice of genre for an experimental video corpus, namely westerns. A requirement for determining whether a video depicts a sentence and the degree to which it depicts that sentence is to detect the objects that might fill roles in that sentence. Various previous aspects have shown that people and horses are among the easiest-to-detect objects, although the performance of object detectors, even for these classes, remains extremely low. To ensure that testing is not done on the training data, previously-trained object models are employed that have not been trained on these videos but have instead been trained on the PASCAL VOC Challenge. Settings for the 9 parameters are also determined or selected, shown in Table 6, which are required to produce the predicates which encode the semantics of the words in this grammar. All 9 parameters are trained simultaneously on only 3 positive examples and 3 negative examples. Note that these training examples cover only a subset of the words in the grammar but are sufficient to define the semantics of all words because this word subset touches upon all the underlying parameters. Training proceeds by exhaustively searching a small uniform grid, with between 3 and 10 steps per dimension, of all nine parameter settings to find a combination which classifies all 6 training samples which are then removed from the test set.

A related alternative strategy is presented for training the parameters of a lexicon of words given a video corpus.

There are 204 sentences generated that conform to the grammar in Table 8 from the template in Table 9. In Table 9, X, Y, and Z are either "person" or "horse".

TABLE 9

X {approached Y {,quickly,slowly} {,from the left,from the right}, {lead,rode} Y {,quickly,slowly} {,leftward,rightward,{towards,away from} Z}}

The 63 queries that involve people riding people and horses riding people or other horses are eliminated, as the video corpus has no positive examples for these sentences. This leaves 141 queries which conform to the grammar. For each sentence, every video-sentence pair is scored and the top 10 most appropriate clips for that sentence are returned. Each of these top 10 clips was annotated by a human judge with a binary decision: is this sentence true of this clip? In FIG. 6A, the precision of the system is shown on the top 10 queries as a function of a threshold on the scores. As the threshold nears zero, the system may return fewer than 10 results per sentence because it eliminates query results which are unlikely to be true positives. As the threshold tends to −∞, the average precision across all top 10 clips for all sentences is 20.6%, and at its peak, the average precision is 40.0%. In FIG. 6B, the number of results returned per sentence is shown, eliminating those results which have a score of −∞ since that tells that no tracks could be found which agree with the semantics of the sentence, On average, there are 7.96 hits per sentence, with standard deviation 3.61, and with only 14 sentences having no hits. In FIG. 6C, the number of correct hits per sentence is shown. On average, there are 1.63 correct hits per sentence, with standard deviation 2.16, and with 74 sentences having at least one true positive.

An experiment was performed on two similar queries: "The person approaches the horse" and "The horse approached the person". For each sentence, 3 true positives and 3 false positives were located. With comparative systems, both queries would provide the same hits as they treat the sentences as conjunctions of words. Compared to prior techniques, various aspects described herein are not only more expressive but exhibit a greater performance increase.

A comparative system was constructed. This system takes as input a query, two objects and a verb, note that this is not a sentence as none of these approaches can truly encode the semantics of a sentence. The videos are ranked by the average object detector score corresponding to the participants. Various event recognition systems can be employed to filter out this ranking and keep videos which depict the query event. The result is a ranked list of videos, the better the object detector score the more confidence exists the videos really do contain the query objects and the event recognition system ensures the video depicts the query verb. The event recognition system is trained on the same 3 verbs, with 6 positive examples per verb. Note that the entire lexicon of 15 words was trained on 6 examples, 0.4 training samples per word, whereas the competing system is trained on 15 times as much training data.

Three queries were run, one for each verb, and each query was paired up with both "person" and "horse". The results are given in Table 10. Table 10 shows the number of true positives ("TP") in the top 10 hits for each approach. A sample was deemed a true positive if it was described by the query of the corresponding system. Note that the present system ("inv.") can outperform the comparative system ("comp."), which is an enhanced version of prior schemes.

TABLE 10

| the query | previous work query | inv. TP | comp. TP |
|---|---|---|---|
| The person rode the horse | "person" "horse" "ride" | 9 | 0 |
| The person lead the horse | "person" "horse" "lead" | 1 | 0 |
| The person approached the horse | "person" "horse" "approach" | 4 | 1 |

Figure 6A:
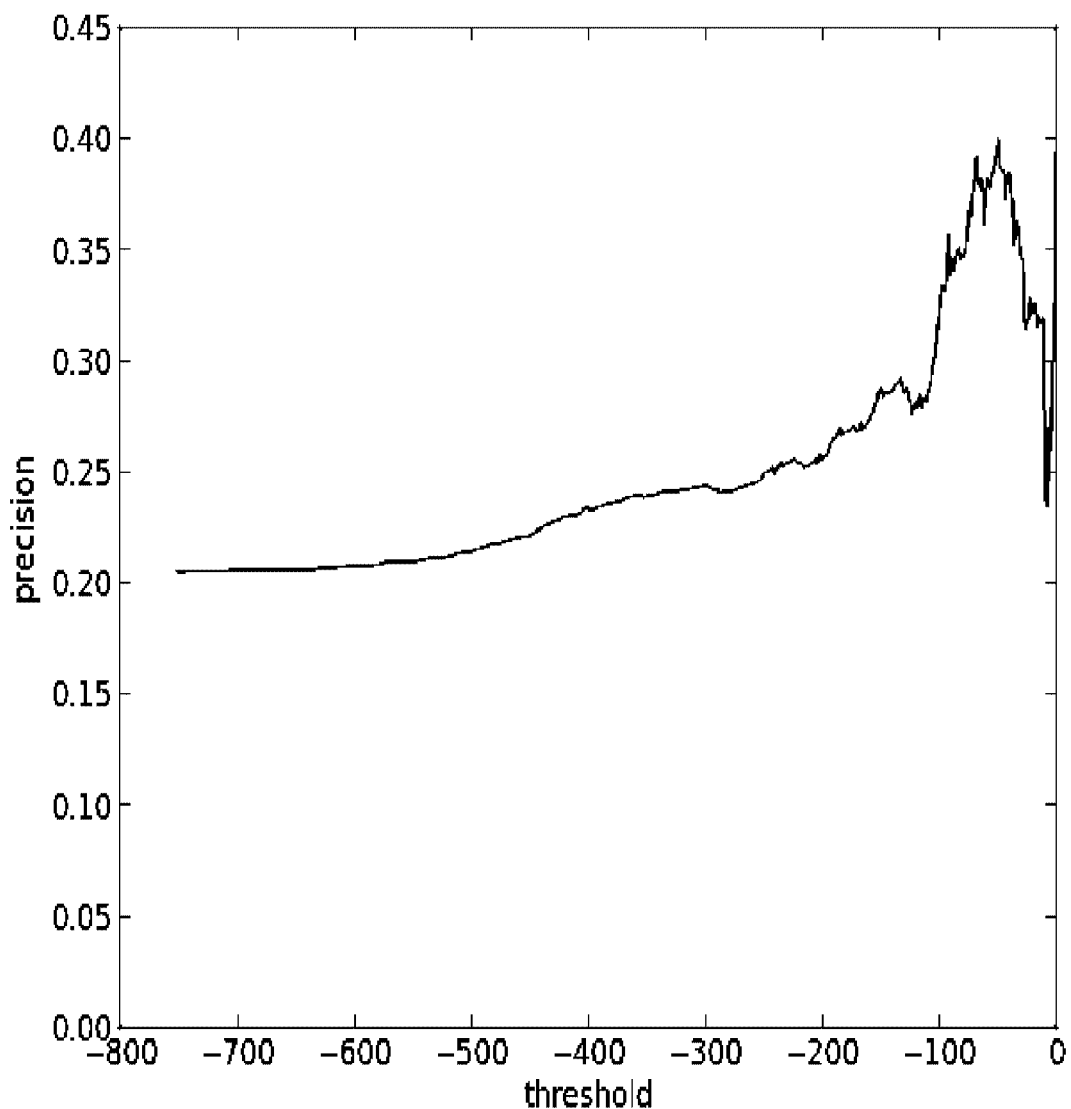
FIGS. 6A, 6B, and 6C show exemplary experimental results.
Figure 6B:
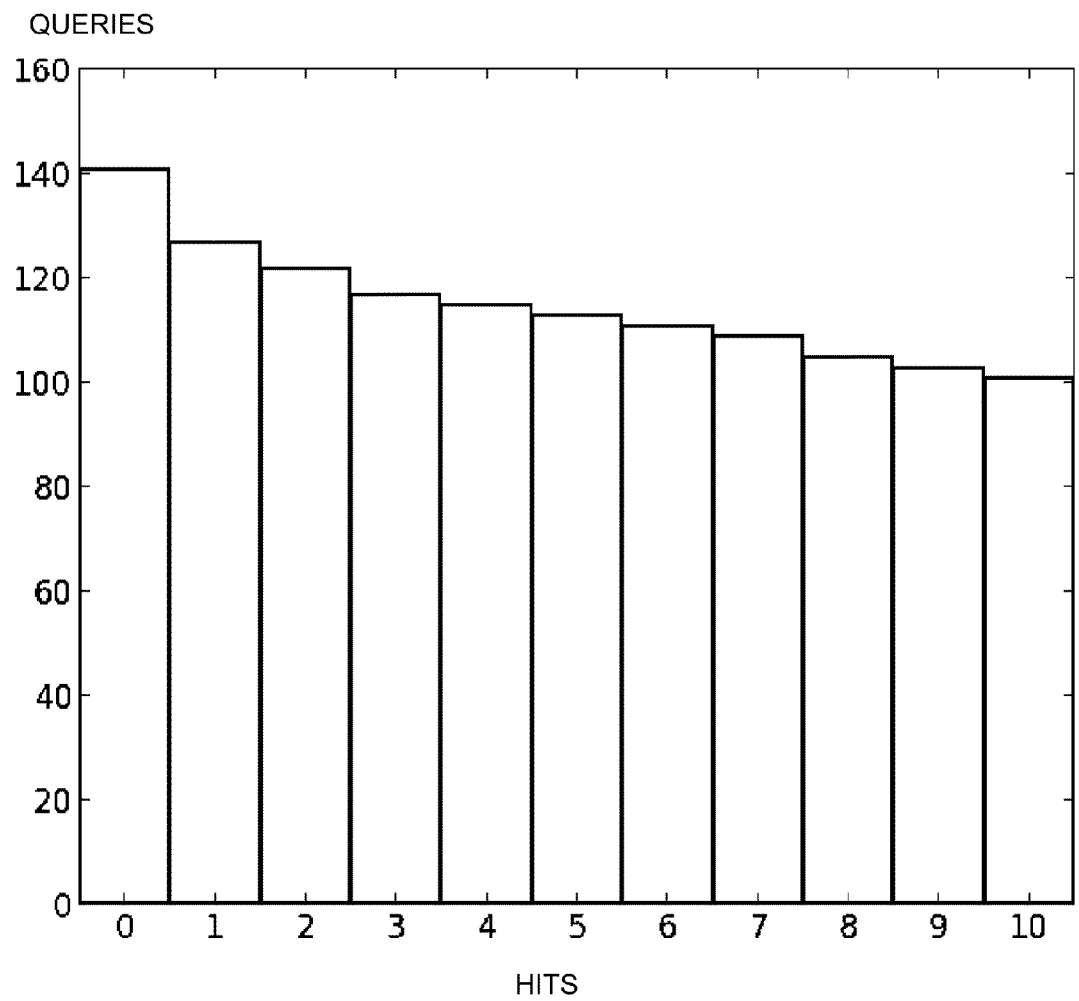
Figure 6C:
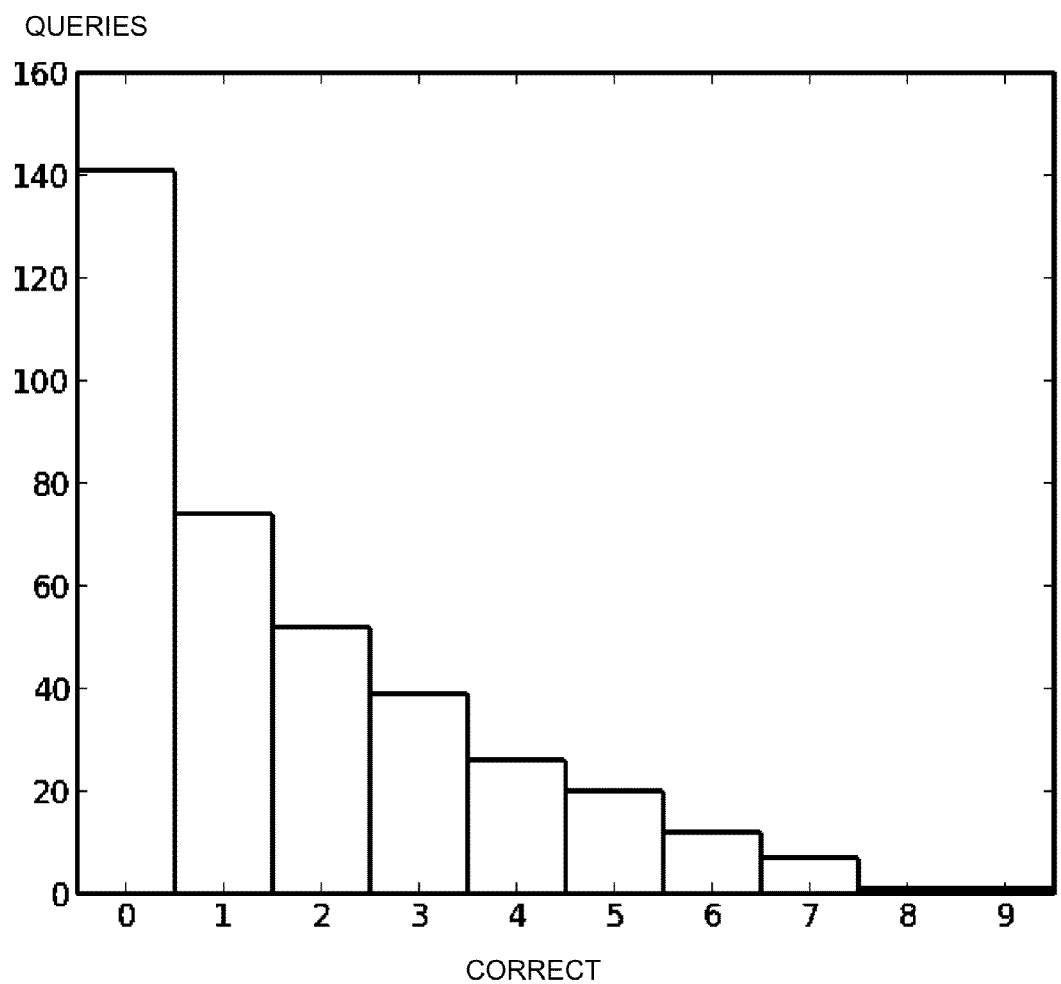

FIG. 6A shows average precision of the top 10 hits for the 141 sentences as a function of the threshold on the sentence-tracker score. FIG. 6B shows, without a threshold, the number of sentences with at most the given number of hits. FIG. 6C shows the number of sentences with at least the given number of correct hits.

Of the top 6 hits for the sentence "The horse approached the person", half of the hits are true positives. Of the top 6 hits for the sentence "The person approached the horse", half of the hits are true positives.

A framework for a novel kind of video search that takes, as input, natural-language queries in the form of sentences, along with a video corpus, and generates a list of ranked results has been developed. This approach provides two novel video-search capabilities. First, it can encode the semantics of sentences compositionally, allowing it to express subtle distinctions such as the difference between "The person rode the horse" and "The horse rode the person". Second, it can also encode structures more complex than just nouns and verbs, such as modifiers, e.g., adverbs, and entire phrases, e.g., prepositional phrases. No prior video annotation is required. The entire lexicon shares a small number of parameters and, unlike previous method, this approach does not need to be trained on every word or even every related word. This approach has been considered with respect to a large video corpus of 10 Hollywood movies, comprising roughly 20 hours of video, by running 141 sentential queries and annotating the top 10 results for each query.

Various aspects relate to "seeing what you're told," e.g., sentence-guided activity recognition in video.

A system is presented that shows how the compositional structure of events, in concert with the compositional structure of language, can interplay with the underlying focusing mechanisms in video action recognition, thereby providing a medium, not only for top-down and bottom-up integration, but also for multi-modal integration between vision and language. How the roles played by participants (nouns) is shown, their characteristics (adjectives), the actions performed (verbs), the manner of such actions (adverbs), and changing spatial relations between participants (prepositions) in the form of whole sentential descriptions mediated by a grammar, guides the activity-recognition process. Further, the utility and expressiveness of the framework is shown by performing three separate tasks in the domain of multi-activity videos: sentence-guided focus of attention, generation of sentential descriptions of video, and query-based video search, simply by leveraging the framework in different manners.

The ability to describe the observed world in natural language is a quintessential component of human intelligence. A particular feature of this ability is the use of rich sentences, involving the composition of multiple nouns, adjectives, verbs, adverbs, and prepositions, to describe not just static objects and scenes, but also events that unfold over time. Furthermore, this ability appears to be learned by virtually all children. The deep semantic information learned is multi-purpose: it supports comprehension, generation, and inference. The precise means and mechanisms that support such ability in the domain of activity recognition in multi-activity videos is investigated.

In order to recognize an occurrence of an event described by the sentence "The ball bounced", in a video it is necessary to detect the ball and its position in the field of view in each frame and determine that the sequence of such detections satisfied the requirements of the word "bounce". The sequence of such object detections and their corresponding positions over time constitutes a track for that object. In this view, the semantics of an intransitive verb like "bounce" would be formulated as a unary predicate over object tracks. Recognizing occurrences of events described by sentences containing transitive verbs, like "The person approached the ball", would require detecting and tracking two objects, the person and the ball, constrained by a binary predicate.

In an ideal world, event recognition would proceed in a purely feed-forward fashion: robust and unambiguous object detection and tracking followed by application of the semantic predicates on the recovered tracks. However, the current state-of-the-art in computer vision is far from this ideal. Object detection alone is unreliable. The current average-precision scores on PASCAL VOC hover around 40%-50%. As a result, object detectors suffer from both false positives and false negatives.

One way around this is to use detection-based tracking the detector is biased to overgenerate, alleviating the problem of false negatives, and uses a different mechanism to select among the overgenerated detections to alleviate the problem of false positives. One such mechanism selects detections that are temporally coherent, i.e., the track motion being consistent with optical flow.

An alternate mechanism has been described that selected detections for a track that satisfied a unary predicate such as would be constructed for an intransitive verb like "bounce". In various aspects, that approach is extended, selecting detections for multiple tracks that collectively satisfy a complex multi-argument predicate representing the semantics of an entire sentence. That predicate is constructed as a conjunction of predicates representing the semantics of the individual words in that sentence. For example, given the sentence "The person to the left of the chair approached the trash can", a logical form is constructed.

$$\text{PERSON}(P) \wedge \text{TOTHELEFTOF}(P,Q) \wedge \text{CHAIR}(Q) \wedge \text{APPROACH}(P,R) \wedge \text{TRASHCAN}(R) \quad (30)$$

The tracker is able to simultaneously construct three tracks P, Q, and R, selecting out detections for each, in an optimal fashion that simultaneously optimizes a joint measure of detection score and temporal coherence while also satisfying the above conjunction of predicates. The aforementioned detections are obtained by employing a state-of-the-art object detector, where a model is trained for each object (e.g., "person", "chair"), which when applied to an image, produces axis-aligned bounding boxes with associated scores indicating strength of detection.

The semantics of lexical items like "person", "to the left of", "chair", "approach", and "trash can" with predicates over tracks like PERSON(P), TOTHELEFTOF(P,Q), CHAIR(Q), APPROACH (P,R), and TRASHCAN(R) are represented. These predicates are in turn represented as regular expressions (i.e., finite state recognizers or FSMs) over features extracted from the sequence of detection positions, shapes, and sizes as well as their temporal derivatives. For example, the predicate TOTHELEFTOF(P,Q) might be a single state FSM where, on a frame-by-frame basis, the centers of the detections for P are constrained to have a lower x-coordinate than the centers of the detections for Q. The actual formulation of the predicates (Table 14) is far more complex to deal with noise and variance in real-world video. What is central is that the semantics of all parts of speech, namely nouns, adjectives, verbs, adverbs, and prepositions (both those that describe spatial-relations and those that describe motion), is uniformly represented by the same mechanism: predicates over tracks formulated as finite state recognizers over features extracted from the detections in those tracks.

This capacity is referred to as the Sentence Tracker, which is a function $S:(D, \Phi) \mapsto (\tau, Z)$, that takes as input an overgenerated set D of detections along with a complex sentential predicate $\Phi$ and produces a score $\tau$ together with a set Z of tracks that satisfy $\Phi$ while optimizing a linear combination of detection scores and temporal coherence. This can be used for three distinct purposes, described below.

Focus of attention: The sentence tracker can be applied to the same video D, that depicts multiple simultaneous events taking place in the field of view with different participants, with two different sentences $\Phi_1$ and $\Phi_2$. In other words, it can be computed $(\tau_1, Z_1)=S(D, \Phi_1)$ and $(\tau_2, Z_2)=S(D, \Phi_2)$ to yield two different sets of tracks $Z_1$ and $Z_2$ corresponding to the different sets of participants in the different events described by $\Phi_1$ and $\Phi_2$.

Generation: A video D can be taken as input and the space of all possible $\Phi$ that correspond to sentences that can be generated by a context-free grammar systematically searched to find that sentence that corresponds to the $\Phi^*$ for which $(\tau^*, Z^*)=S(D, \Phi^*)$ yields the maximal $\tau^*$. This can be used to generate a sentence that describes an input video D.

Retrieval: A collection $D=\{D_1, \ldots, D_n\}$ of videos (or a single long video temporally segmented into short clips) can be taken along with a sentential query $\Phi$, compute $(\tau_i, Z_i)=S(D_i, \Phi)$ for each $D_i$, and find the clip $D_i$ with maximal score $\tau_i$. This can be used to perform sentence-based video search.

These are discussed below in more detail. However, first presented are two algorithmic contributions. Below are presented the details of the sentence tracker, a mechanism for efficiently constraining several parallel detection-based trackers, one for each participant, with a conjunction of finite state recognizers. Below, lexical semantics are presented for a small vocabulary of 17 lexical items (5 nouns, 2 adjectives, 4 verbs, 2 adverbs, 2 spatial-relation prepositions, and 2 motion prepositions) all formulated as finite state recognizers over features extracted from detections produced by an object detector, together with compositional semantics that maps a sentence to a semantic formula $\Phi$ constructed from these finite state recognizers where the object tracks are assigned to arguments of these recognizers.

The issue of selecting detections for a track that simultaneously satisfies a temporal-coherence measure and a single predicate corresponding to an intransitive verb such as "bounce" has been addressed. Doing so constitutes the integration of top-down high-level information, in the form of an event model, with bottom-up low-level information in the form of object detectors. A short review of the relevant material are provided to introduce notation and provide the basis for the exposition of the sentence tracker.

The first component is a detection-based tracker. For a given video with T frames, let j be the index of a detection and $b_j^t$ be a particular detection in frame t with score $f(b_j^t)$. A sequence $\langle j^1, \ldots, j^T \rangle$ of detection indices, one for each frame t, denotes a track comprising detections $b_j^t$. A track that maximizes a linear combination of aggregate detection score is sought, summing $f(b_j^t)$ over all frames, and a measure of temporal coherence, as formulated in Eq. 31:

$$\max_{j^1,\ldots,j^T} \sum_{t=1}^{T} f(b_{j^t}^t) + \sum_{t=2}^{T} g(b_{j^{t-1}}^{t-1}, b_{j^t}^t) \quad (31)$$

The temporal coherence measure aggregates a local measure g computed between pairs of adjacent frames, taken to be the negative Euclidean distance between the center of $b_j^t$ and the forward-projected center of $b_{j'}^{t-1}$ computed with optical flow. Eq. 31 can be computed in polynomial time using dynamic-programming with the Viterbi algorithm. It does so by formulating a lattice, whose rows are indexed by j and whose columns are indexed by t, where the node at row j and column t is the detection $b_j^t$. Finding a track thus reduces to finding a path through this lattice.

The second component recognizes events with hidden Markov models (HMMs), by finding a maximum a posteriori probability (MAP) estimate of an event model given a track. This is computed as shown in Eq. 32:

$$\max_{k^1,\ldots,k^T} \sum_{t=1}^{T} h(k^t, b_{\hat{j}^t}^T) + \sum_{t=2}^{T} a(k^{t-1}, k^t) \quad (32)$$

where $k^t$ denotes the state for frame t, h(k,b) denotes the log probability of generating a detection b conditioned on being in state k, a(k', k) denotes the log probability of transitioning from state k' to k, and $\hat{j}^t$ denotes the index of the detection produced by the tracker in frame t. This can also be computed in polynomial time using the Viterbi algorithm. Doing so induces a lattice, whose rows are indexed by k and whose columns are indexed by t.

The two components, detection-based tracking and event recognition, can be combined. The cost functions from Eq. 31 and Eq. 32 can be combined to yield a unified cost function $$\max_{\substack{j^1,\ldots,j^T \\ k^1,\ldots,k^T}} \sum_{t=1}^{T} f(b_{j^t}^t) + \sum_{t=2}^{T} g(b_{j^{t-1}}^{t-1}, b_{j^t}^t) + \sum_{t=1}^{T} h(k^t, b_{j^t}^t) + \sum_{t=2}^{T} a(k^{t-1}, k^t) \quad (33)$$

that computes the joint MAP estimate of a preferred possible track and a preferred (or the mathematically-best-possible) state sequence. This is done by replacing the $\hat{j}^t$ in Eq. 32 with $j^t$, allowing the joint maximization over detection and state sequences. This too can be computed in polynomial time with the Viterbi algorithm, finding the optimal path through a cross-product lattice where each node represents a detection paired with an event-model state. Examples of uses of such a unified cost function are discussed above with reference to FIG. 24.

This exemplary formulation combines a single tracker lattice with a single event model, constraining the detection-based tracker to find a track that is not only temporally coherent but also satisfies the event model. This can be used to select that "ball" track from a video that contains multiple balls that exhibits the motion characteristics of an intransitive verb such as "bounce".

Figure 7A:
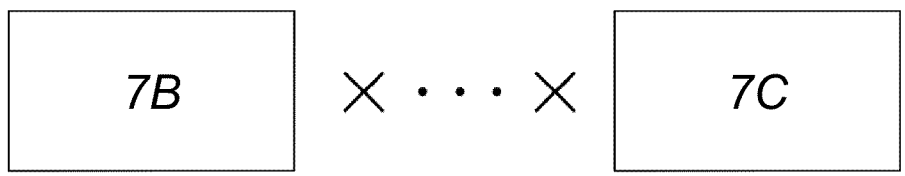
FIGS. 7A, 7B, 7C, 7D, and 7E show construction of a cross-product lattice according to various aspects.
Figure 7A:
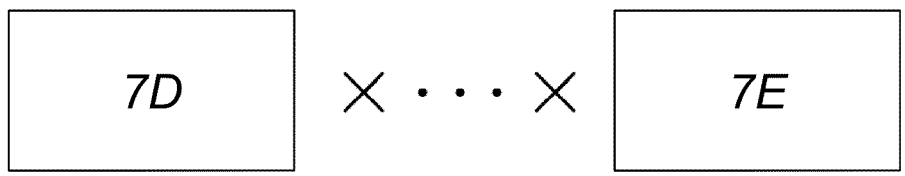
Figure 7B:
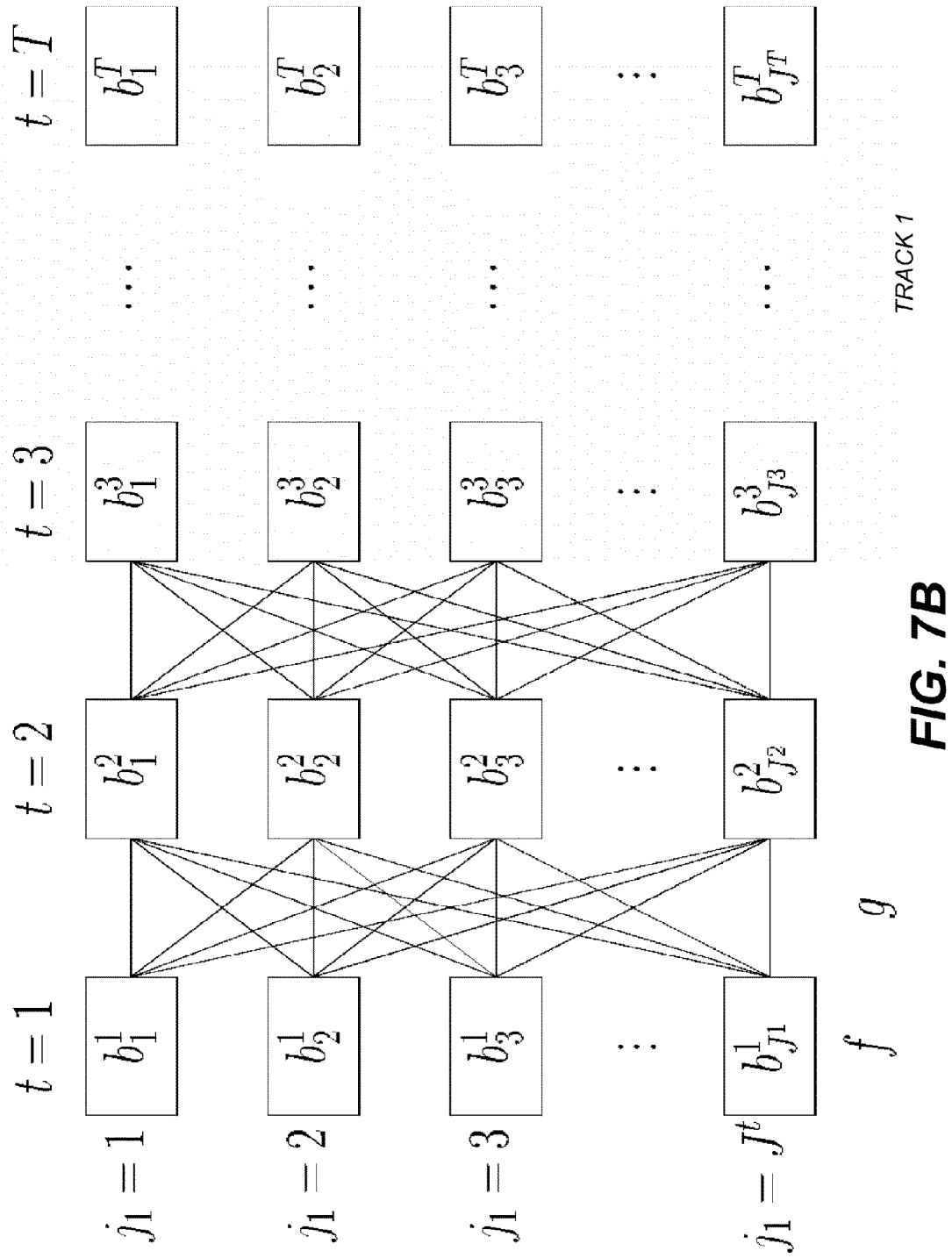
Figure 7C:
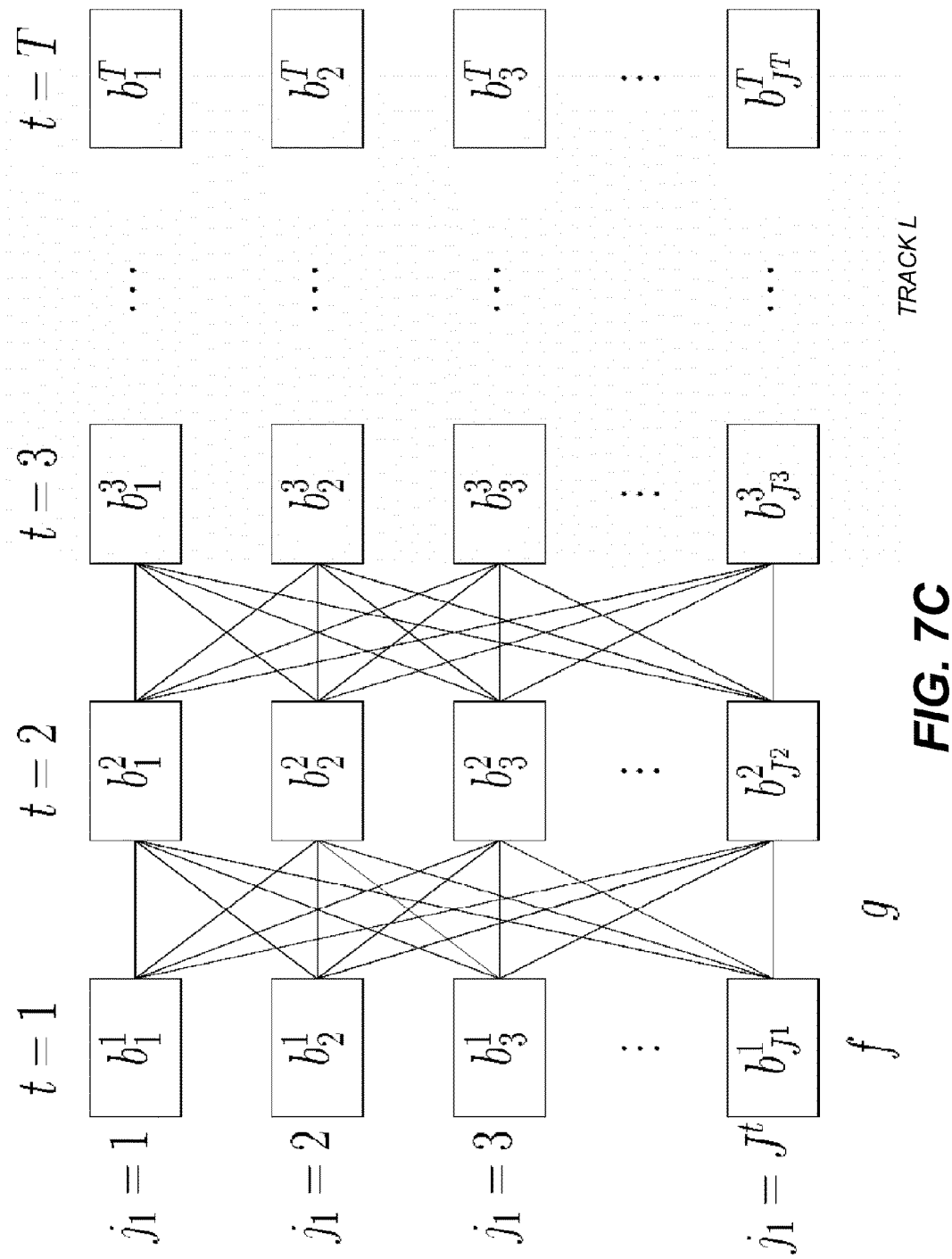
Figure 7D:
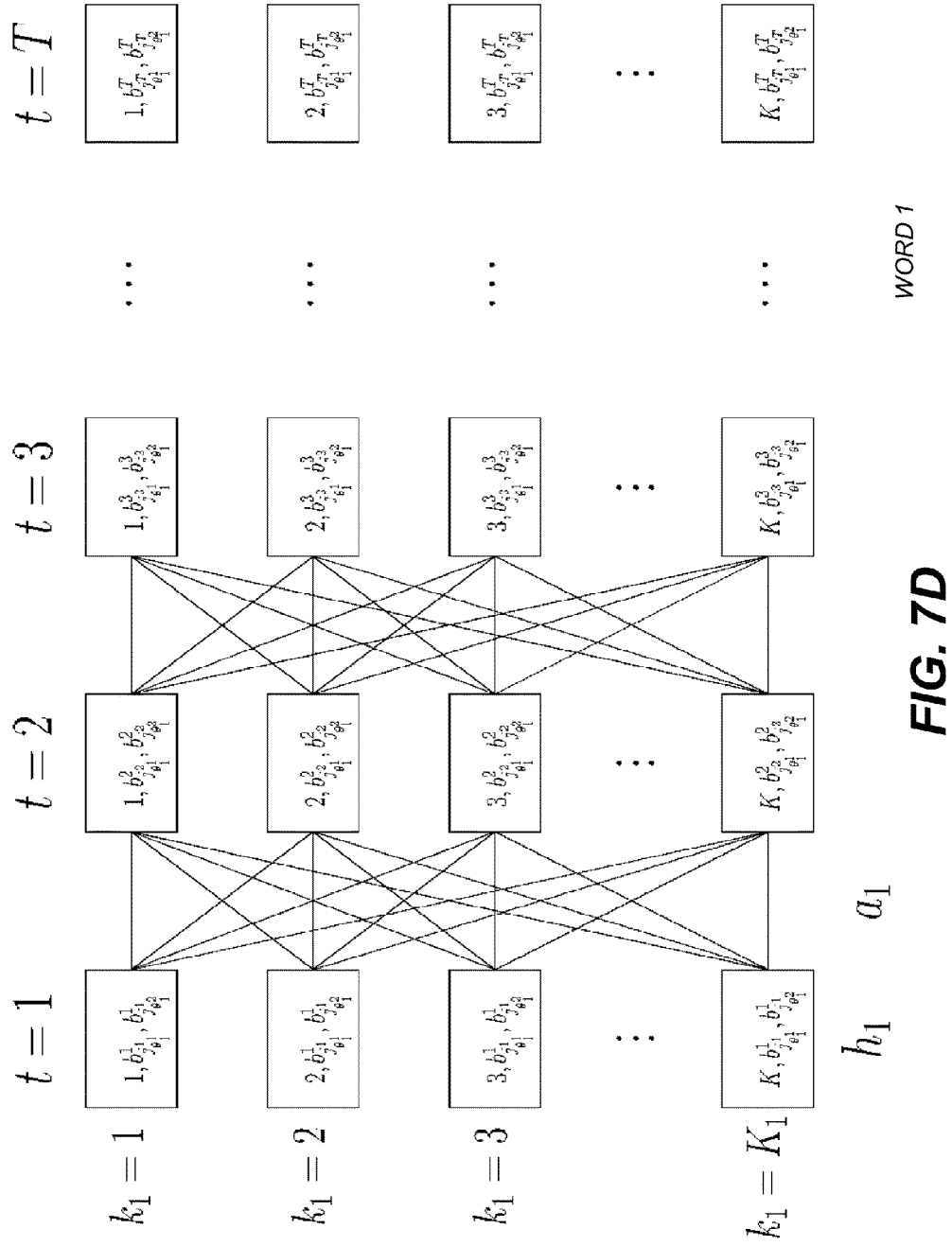
Figure 7E:
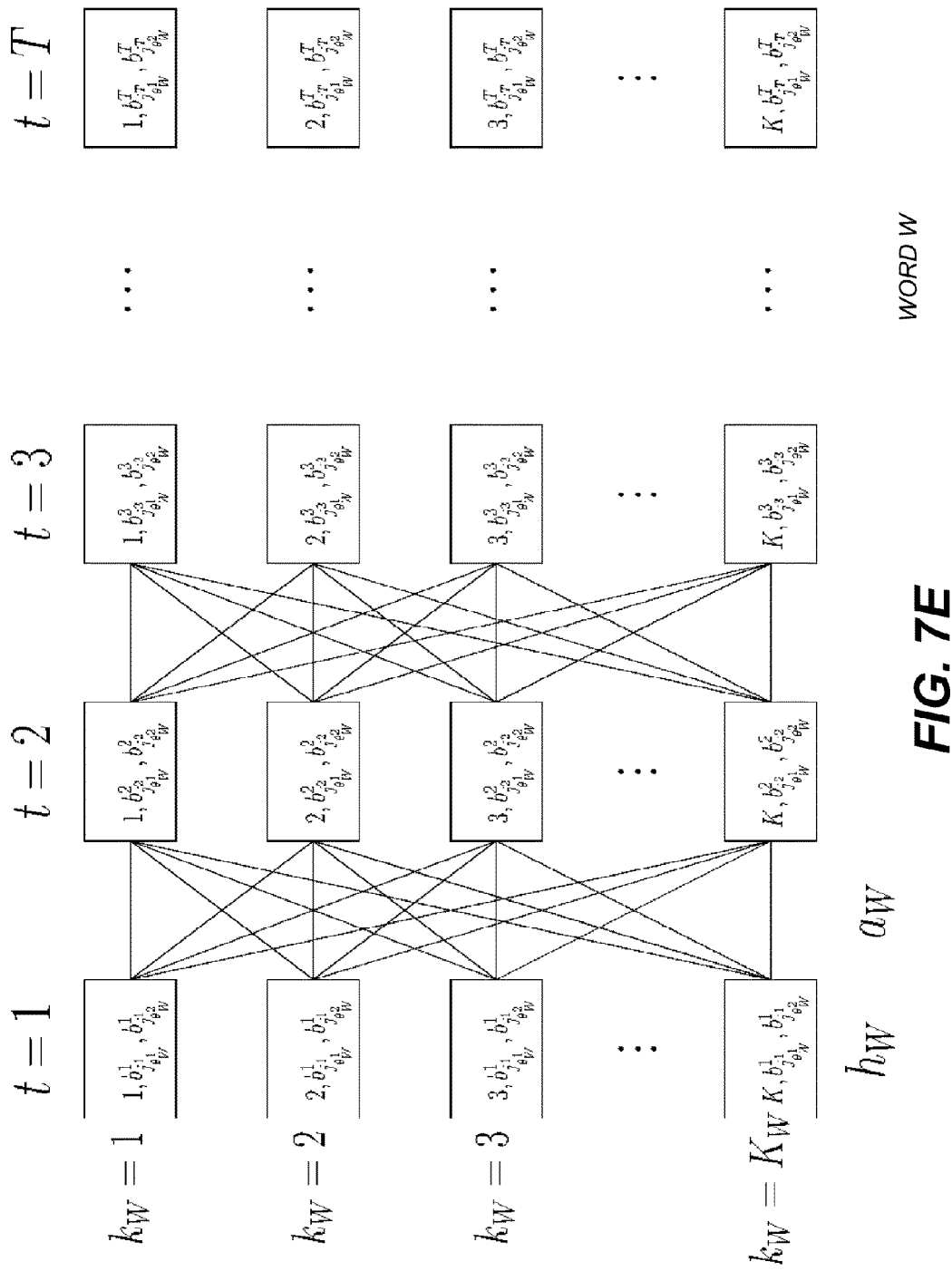

FIG. 7A shows an exemplary cross-product lattice used by the sentence tracker, including L tracking lattices and W event-model lattices. Exemplary tracking lattices are shown in FIGS. 7B and 7C. Exemplary event-model lattices are shown in FIGS. 7D and 7E.

It can be that encoding the semantics of a complex sentence such as "The person to the right of the chair quickly carried the red object towards the trash can", which involves nouns, adjectives, verbs, adverbs, and spatial-relation and motion prepositions, would provide substantially more mutual constraint on the collection of tracks for the participants than a single intransitive verb would constrain a single track. Thus, the approach described above is extended by incorporating a complex multi-argument predicate that represents the semantics of an entire sentence instead of one that only represents the semantics of a single intransitive verb. This involves formulating the semantics of other parts of speech, in addition to intransitive verbs, also as HMMs. A large cross-product lattice is then constructed, illustrated in FIG. 7A, to support L tracks and W words. Each node in this cross-product lattice represents L detections and the states for W words. To support L tracks, each detection index j as $j_l$ is subindexed for track l. Similarly, to support W words, each state index k as $k_w$ is subindexed for word w and the HMM parameters h and a for word w as $h_w$ and $a_w$. The argument-to-track mappings $\theta_w^1$ and $\theta_w^2$ specify the tracks that fill arguments 1 and 2 (where necessary) of word w respectively. A path through this cross-product lattice is sought that optimizes $$\max_{\substack{j_1^1,\ldots,j_1^T \\ j_L^1,\ldots,j_L^T \\ k_1^1,\ldots,k_1^T \\ k_W^1,\ldots,k_W^T}} \sum_{l=1}^{L} \sum_{t=1}^{T} f(b_{j_l^t}^t) + \sum_{t=2}^{T} g(b_{j_l^{t-1}}^{t-1}, b_{j_l^t}^t) + \sum_{w=1}^{W} \sum_{t=1}^{T} h_w(k_w^t, b_{j_{\theta_w^1}^t}^t, b_{j_{\theta_w^2}^t}^t) + \sum_{t=2}^{T} a_w(k_w^{t-1}, k_w^t) \quad (34)$$

This can also be computed in polynomial time using the Viterbi algorithm. This describes a method by which the function $S(D, \Phi) \mapsto (\tau, Z)$, discussed earlier, can be computed, where D is the collection of detections $b_j^t$ and Z is the collection of tracks $j_l^t$.

The sentence tracker uniformly represents the semantics of words in all parts of speech, namely nouns, adjectives, verbs, adverbs, and prepositions (both those that describe spatial relations and those that describe motion), as HMMs. Finite state recognizers (FSMs) are a special case of HMMs where the transition matrices a and the output models h are 0/1. Here, the semantics of a small fragment of English including 17 lexical items is formulated (5 nouns, 2 adjectives, 4 verbs, 2 adverbs, 2 spatial-relation prepositions, and 2 motion prepositions), by hand, as FSMs. The focus is not on what can be done with this approach, namely take sentences as input and focus the attention of a tracker, take video as input and produce sentential descriptions as output, and perform content-based video retrieval given a sentential input query, as discussed herein. It is particularly enlightening that the FSMs used are perspicuous and clearly encode pretheoretic human intuitions about the semantics of these words. But nothing turns on the use of hand-coded FSMs. The framework, as described above, supports HMMs. A companion submission describes a method by which a person can automatically learn such HMMs for the lexicon, grammar, and corpus discussed.

Table 11 shows, in part (a), an exemplary grammar for a lexicon of 19 lexical entries (2 determiners, 2 adjectives, 5 nouns, 2 spatial relations, 4 verbs, 2 adverbs, and 2 motion prepositions). Note that the grammar allows for infinite recursion in the noun phrase. In part (b), the table shows the corresponding theta grid, specifying the number of arguments and roles such arguments refer to, for the lexicon. Table 12 shows a selection of sentences drawn from the grammar based on which (multiple instances of) videos were collected for an experimental corpus.

TABLE 11

(a)
S → NP VP
NP → D [A] N [PP]
D → "an" | "the"
A → "blue" | "red"
N → "person" | "backpack" | "trash can" | "chair" | "object"
PP → P NP
P → "to the left of" | "to the right of"
VP → V NP [ADV] [PPM]
V → "picked up" | "put down" | "carried" | "approached"
ADV → "quickly" | "slowly"
PPM → PM NP
PM → "towards" | "away from"

(b)
"to the left of" = (agent patient) (referent)
"to the right of" = (agent patient) (referent)
"picked up" = (agent) (patient)
"put down" = (agent) (patient)
"carried" = (agent) (patient)
"approached" = (agent) (goal)
"towards" = (agent patient) (goal)
"away from" = (agent patient) (source)
other = (agent patient referent goal source)

TABLE 12

1a. "The backpack approached the trash can."
b. "The chair approached the trash can."
2a. "The red object approached the chair."
b. "The blue object approached the chair."
3a. "The person to the left of the trash can put down an object."
b. "The person to the right of the trash can put down an object."
4a. "The person put down the trash can."
b. "The person put down the backpack."
5a. "The person carried the red object."
b. "The person carried the blue object."
6a. "The person picked up an object to the left of the trash can."
b. "The person picked up an object to the right of the trash can."
7a. "The person picked up an object."
b. "The person put down an object."
8a. "The person picked up an object quickly."
b. "The person picked up an object slowly."
9a. "The person carried an object towards the trash can."
b. "The person carried an object away from the trash can."
10. "The backpack approached the chair."
11. "The red object approached the trash can."
12. "The person put down the chair."

Nouns (e.g., "person") may be represented by constructing static FSMs over discrete features, such as detector class. Adjectives (e.g., "red", "tall", and "big") may be represented as static FSMs that describe select properties of the detections for a single participant, such as color, shape, or size, independent of other features of the overall event. Intransitive verbs (e.g., "bounce") may be represented as FSMs that describe the changing motion characteristics of a single participant, such as "moving downward" followed by "moving upward". Transitive verbs (e.g., "approach") may be represented as FSMs that describe the changing relative motion characteristics of two participants, such as "moving closer". Adverbs (e.g., "slowly" and "quickly") may be represented by FSMs that describe the velocity of a single participant, independent of the direction of motion. Spatial-relation prepositions (e.g., "to the left of") may be represented as static FSMs that describe the relative position of two participants. Motion prepositions (e.g., "towards" and "away from") may be represented as FSMs that describe the changing relative position of two participants. As is often the case, even simple static properties, such as detector class, object color, shape, and size, spatial relations, and direction of motion, might hold only for a portion of an event. Such temporal uncertainty is handled by incorporating garbage states into the FSMs that always accept and do not affect the scores computed. This also allows for alignment between multiple words in a temporal interval during a longer aggregate event. Tables 13, 14, 15, and 16 provide, in the form of predicates and regular expressions describing the FSMs, the complete specification of lexical semantics for the grammar and lexicon presented in Table 11(a).

In tables 13, 14, 15, and 16, there are shown finite-state recognizers corresponding to the lexicon in Table 11(a), for constants, simple predicates, complex predicates, and regular expressions, respectively. A track (sequence of detections) is denoted as $P = \langle p^1, \ldots, p^t \rangle$, t being the most recent detection. Features for a detection are computed using the functions c, x, and model that compute its center, x-coordinate of the center, and the associated object-model name respectively. v denotes a unit vector used to indicate direction. AVGFLOW and FWDPROJ are computed based on the aggregate optical flow within a detection's bounding area in an image. The former returns a vector (magnitude and orientation) and the latter displaces a given detection by this vector. Finally, a new regular expression quantifier † is defined as $R^\dagger = (R \text{ TRUE}^? R)^+$ to support handling noisy data.

TABLE 13 xBoundary ≜ 300px
nextTo ≜ 50px
Δstatic ≜ 6px
Δjump ≜ 30px
Δquick ≜ 80px
Δslow ≜ 30px
Δclosing ≜ 10px
Δdirection ≜ 30°
Δhue ≜ 30°

TABLE 14 xDistance(P, Q) ≜ |χ(p$^t$) − χ(q$^t$)|
noJitter(P, v) ≜ |c(p$^t$) · v − c(p$^{t-1}$) · v| ≤ Δjump
alike(P, Q) ≜ model(p$^t$) = model(q$^t$)
far(P, Q) ≜ xDistance(P, Q) ≥ xBoundary
close(P, Q) ≜ xDistance(P, Q) < xBoundary
left(P, Q) ≜ 0 < χ(q$^t$) − χ(p$^t$) ≤ nextTo
right(P, Q) ≜ 0 < χ(p$^t$) − χ(q$^t$) ≤ nextTo
hasColour(P, hue) ≜ angleSep(hue(p$^t$), hue) ≤ Δhue
quick(P) ≜ |p$^t$ − p$^{t-1}$| ≥ Δquick
slow(P) ≜ |p$^t$ − p$^{t-1}$| ≤ Δslow
stationary(P) ≜ ||avgFlow(p$^t$)|| ≤ Δstatic

TABLE 15 stationaryClose(P, Q) ≜ stationary(P) ∧ stationary(Q) ∧
    ¬alike(P, Q) ∧ close(P, Q)
stationaryFar(P, Q) ≜ stationary(P) ∧ stationary(Q) ∧
    ¬alike(P, Q) ∧ far(P, Q)
closer(P, Q) ≜ xDistance(P, Q) >
    xDistance(fwdProj(P), Q) +
    Δclosing
farther(P, Q) ≜ xDistance(P, Q) <
    xDistance(fwdProj(P), Q) +
    Δclosing TABLE 15-continued $$\text{moveCloser}(P, Q) \triangleq \text{noJitter}(P, (0, 1)) \wedge$$
$$\text{noJitter}(Q, (0, 1)) \wedge \text{closer}(P, Q)$$
$$\text{moveFarther}(P, Q) \triangleq \text{noJitter}(P, (0, 1)) \wedge$$
$$\text{noJitter}(Q, (0, 1)) \wedge \text{farther}(P, Q)$$
$$\text{alongDir}(P, \upsilon) \triangleq \text{angleSep}(\angle \text{avgFlow}(p^t), \angle \upsilon) <$$
$$\Delta \text{direction} \wedge \neg \text{stationary}(P)$$
$$\text{movingDir}(P, \upsilon) \triangleq \text{alongDir}(P, \upsilon) \wedge$$
$$\text{noJitter}(P, \text{normal}(\upsilon))$$
$$\text{approaching}(P, Q) \triangleq \neg \text{alike}(P, Q) \wedge \text{stationary}(q) \wedge$$
$$\text{moveCloser}(P, Q)$$
$$\text{departing}(P, Q) \triangleq \neg \text{alike}(P, Q) \wedge \text{stationary}(Q) \wedge$$
$$\text{moveFarther}(P, Q)$$
$$\text{pickingUp}(P, Q) \triangleq \neg \text{alike}(P, Q) \wedge \text{stationary}(P) \wedge$$
$$\text{movingDir}(P, (0, 1))$$
$$\text{puttingDown}(P, Q) \triangleq \neg \text{alike}(P, Q) \wedge \text{stationary}(P) \wedge$$
$$\text{movingDir}(P, (0, -1))$$
$$\text{carry}(P, Q, \upsilon) \triangleq \text{movingDir}(P, \upsilon) \wedge \text{movingDir}(Q, \upsilon)$$
$$\text{carrying}(P, Q) \triangleq \text{carry}(P, Q, (0, 1)) \vee \text{carry}(P, Q, (0, -1))$$

TABLE 16

$$\text{person}(P) \triangleq (\text{model}(p^t) = \text{person})^+$$
$$\text{trashCan}(P) \triangleq (\text{model}(p^t) = \text{trashCan})^+$$
$$\text{blue}(P) \triangleq \text{hasColour}(P, 225°)^+$$
$$\text{quickly}(P) \triangleq \text{true}^+ \text{quick}(P)^\dagger \text{true}^+$$
$$\text{toTheLeftOf}(P, Q) \triangleq \text{left}(P, Q)^+$$
$$\text{backpack}(P) \triangleq (\text{model}(p^t) = \text{backpack})^+$$
$$\text{chair}(P) \triangleq (\text{model}(p^t) = \text{chair})^+$$
$$\text{red}(P) \triangleq \text{hasColour}(P, 0°)^+$$
$$\text{slowly}(P) \triangleq \text{true}^+ \text{slow}(P)^\dagger \text{true}^+$$
$$\text{toTheRightOf}(P, Q) \triangleq \text{right}(P, Q)^+$$
$$\text{pickedUp}(P, Q) \triangleq \text{stationaryClose}(P, Q)^+ \text{pickingUp}(P, Q)^\dagger$$
$$\text{stationaryClose}(P, Q)^+$$
$$\text{putDown}(P, Q) \triangleq \text{stationaryClose}(P, Q)^+ \text{puttingDown}(P, Q)^\dagger$$
$$\text{stationaryClose}(P, Q)^+$$
$$\text{carried}(P, Q) \triangleq \text{stationaryClose}(P, Q)^+ \text{carrying}(P, Q)^\dagger$$
$$\text{stationaryClose}(P, Q)^+$$
$$\text{approached}(P, Q) \triangleq \text{stationaryFar}(P, Q)^+ \text{approaching}(P, Q)^\dagger$$
$$\text{stationaryClose}(P, Q)^+$$
$$\text{towards}(P, Q) \triangleq \text{stationaryFar}(P, Q)^+ \text{approaching}(P, Q)^\dagger$$
$$\text{stationaryClose}(P, Q)^+$$
$$\text{awayFrom}(P, Q) \triangleq \text{stationaryClose}(P, Q)^+ \text{departing}(P, Q)^\dagger$$
$$\text{stationaryFar}(P, Q)^+$$
$$\text{object}(P) \triangleq (\text{model}(p^t) = \text{backpack} \vee \text{model}(p^t) = \text{trashcan} \vee$$
$$\text{model}(p^t) = \text{chair})^+$$

A sentence may describe an activity involving multiple tracks, where different (collections of) tracks fill the arguments of different words. This gives rise to the requirement of compositional semantics: dealing with the mappings from arguments to tracks. Given a sentence $\Lambda$, the argument-to-track assignment is a function $\tau(\Lambda, \Gamma, \Psi) \mapsto (\Phi)$, that takes, as input, a sentence $\Lambda$ and a grammar $\Gamma$, along with a specification of the argument arity and role types $\Psi$ for the words in the lexicon and produces a formula $\Phi$ that specifies which tracks fill which arguments of which predicate instances for the words in the sentence. In an example, Lambda is "The person to the right of the chair picked up the backpack". The argument-to-track assignment, applied to the example sentence with the grammar $\Gamma$ as specified in Table 11(a) and theta grid $\Psi$, as specified in Table 11(b), would produce the following formula.

$$\text{PERSON}(P) \wedge \text{TOTHERIGHTOF}(P, Q) \wedge \text{CHAIR}(Q) \wedge \text{PICKEDUP}(P, R) \wedge \text{BACKPACK}(R) \quad (35)$$

Figure 8:
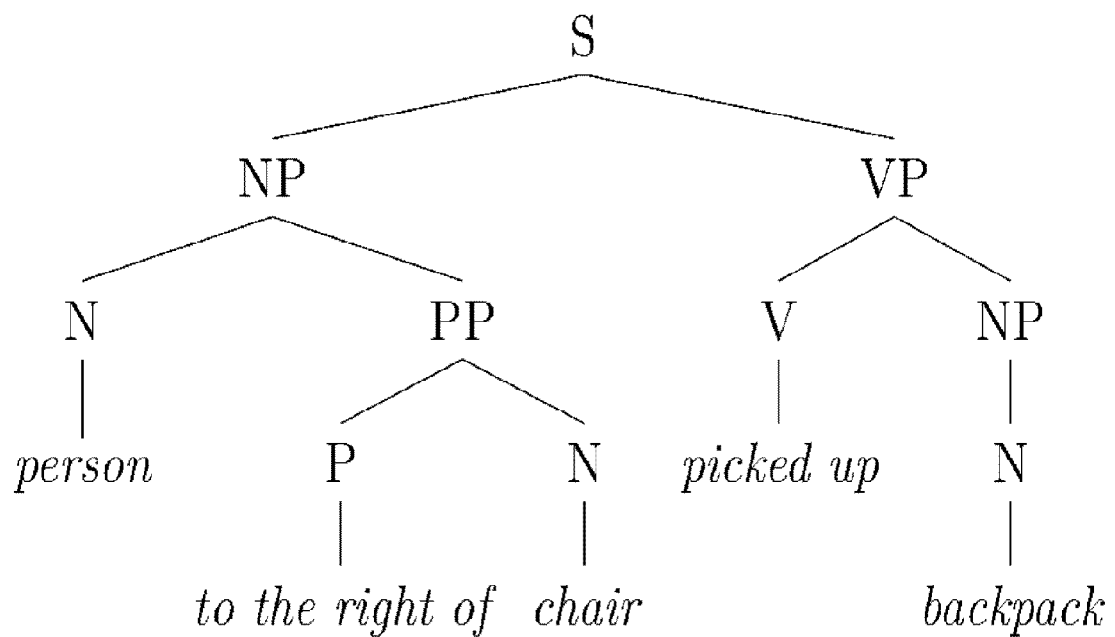
FIG. 8 shows an exemplary parse tree for an exemplary sentence.

FIG. 8 shows an exemplary parse tree for an exemplary sentence. In various aspects, to process a sentence $\Lambda$, a parse tree of $\Lambda$ is first constructed given the grammar $\Gamma$, using a recursive-descent parser, producing the parse tree shown in FIG. 8. Such a parse tree encodes in its structure, the dependency relationships between different parts of speech as specified by the grammar. For each word, it is then determine from the parse tree, which words in the sentence are determined to be its dependents in the sense of government, and how many such dependents exist, from the theta grid specified in Table 11(b). For example, the dependents of "to the right of" are determined to be "person" and "chair", filling its first and second arguments respectively. Furthermore, a consistent assignment of roles is determined, one of agent, patient, source, goal, and referent, for each participant track that fills the word arguments, from the allowed roles specified for that word and argument in the theta grid. Here, P, Q, and R are participants that play the agent, referent, and patient roles respectively.

The sentence tracker supports three distinct capabilities. It can take sentences as input and focus the attention of a tracker, it can take video as input and produce sentential descriptions as output, and it can perform content-based video retrieval given a sentential input query. These can be seen by viewing, a corpus of 94 short videos was filmed, of varying length, in 3 different outdoor environments. The camera was moved for each video so that the varying background precluded unanticipated confounds. These videos, filmed with a variety of actors, each depicted one or more of the 21 sentences from Table 12. The depiction, from video to video, varied in scene layout and the actor(s) performing the event. The corpus was carefully constructed in a number of ways. First, many videos depict more than one sentence. In particular, many videos depict simultaneous distinct events. Second, each sentence is depicted by multiple videos. Third the corpus was constructed with minimal pairs: pairs of videos whose depicted sentences differ in exactly one word. These minimal pairs are indicated as the 'a' and 'b' variants of sentences 1-9 in Table 12. That varying word was carefully chosen to span all parts of speech and all sentential positions: sentence 1 varies subject noun, sentence 2 varies subject adjective, sentence 3 varies subject preposition, sentence 4 varies object noun, sentence 5 varies object adjective, sentence 6 varies object preposition, sentence 7 varies verb, sentence 8 varies adverb, and sentence 9 varies motion preposition. A unique corpus was filmed as an existing corpora that exhibits the above properties was unknown. Each of the 94 clips was annotated with a ground truth judgment for each of the 21 sentences, indicating whether the given clip depicted the given sentence. This set of 1974 judgments was used for the following analyses.

Various aspects relate to Focus of Attention. Tracking is traditionally performed using cues from motion, object detection, or manual initialization on an object of interest. However, in the case of a cluttered scene involving multiple activities occurring simultaneously, there can be many moving objects, many instances of the same object class, and perhaps even multiple simultaneously occurring instances of the same event class. In various aspects, this presents an obstacle to the efficacy of existing methods in such scenarios. To alleviate this problem, one can decide which objects to track based on which ones participate in a target event.

Figure 9A:
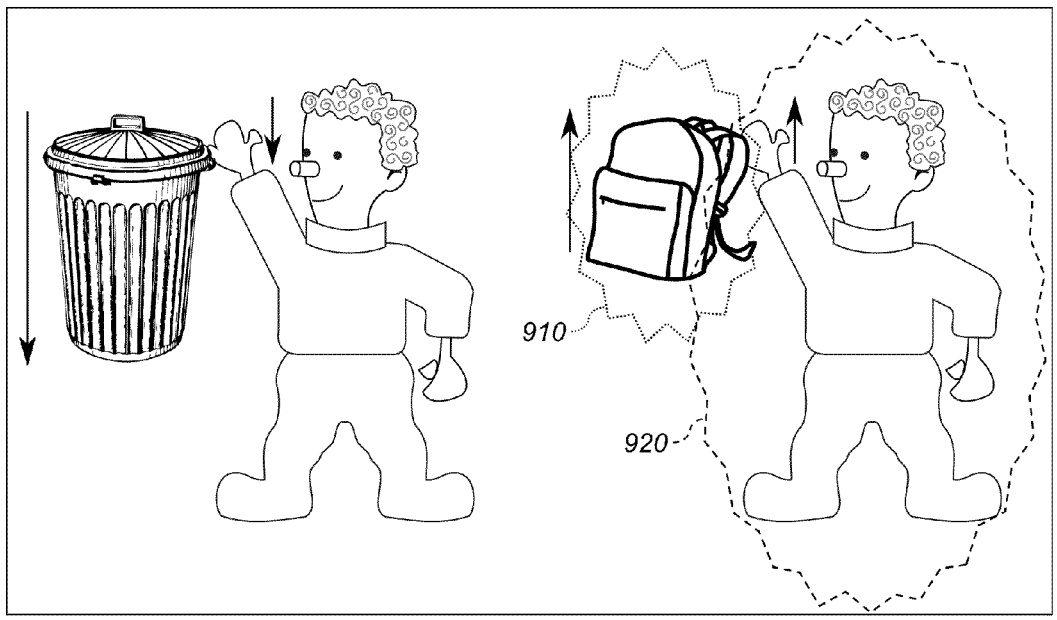
FIGS. 9A and 9B show examples of sentence-guided focus of attention.
Figure 9B:
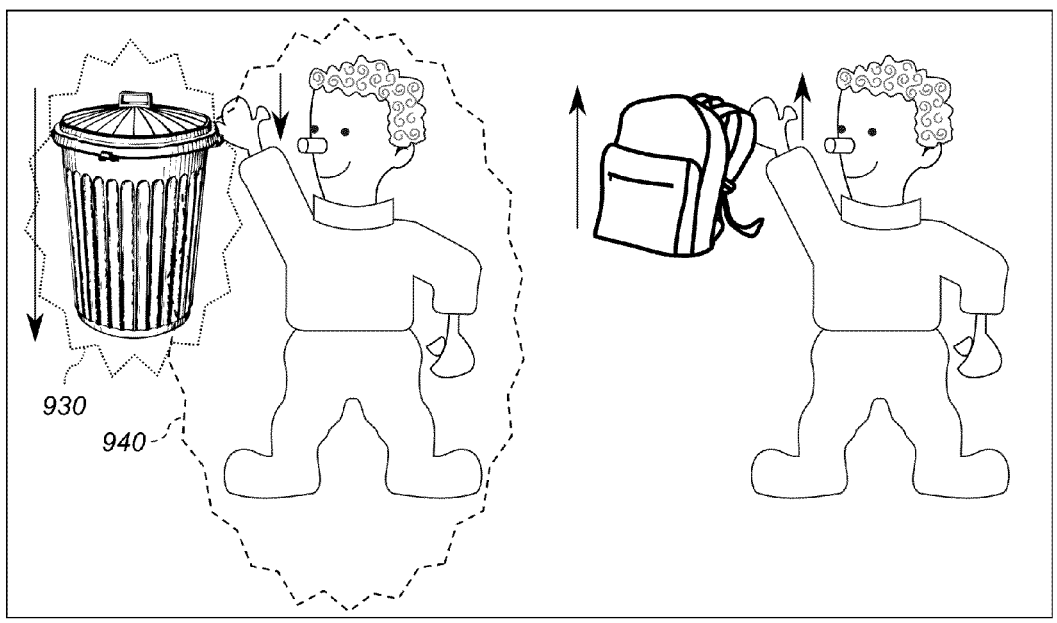

The sentence tracker can focus its attention on just those objects that participate in an event specified by a sentential description. Such a description can differentiate between different simultaneous events taking place between many moving objects in the scene using descriptions constructed out of a variety of parts of speech: nouns to specify object class, adjectives to specify object properties, verbs to specify events, adverbs to specify motion properties, and prepositions to specify (changing) spatial relations between objects. Furthermore, such a sentential description can even differentiate which objects to track based on the role that they play in an event: agent, patient, source, goal, or referent. FIGS. 9A and 9B show this ability: different tracks are produced for the same video that depicts multiple simultaneous events when focused with different sentences.

FIGS. 9A and 9B show examples of sentence-guided focus of attention: two different sets of tracks for the same video produced under guidance of two different sentences.

FIG. 9A shows focus-of-attention on an exemplary frame of video for the sentence "a person picked up an object." Highlight 910 (the shape and size of which are not limiting; highlights can be any color, shape, size, or line weight, can can include inverse video or other presentations of information) indicates the detected "object," and highlight 920 indicates the detected "person."

FIG. 9B shows the same frame of video as in FIG. 9A, but for the sentence "a person put down an object." Highlight 930 indicates the detected "object," and highlight 940 indicates the detected "person."

This ability was further seen with respect to all 9 minimal pairs collectively applied to all 24 suitable videos in the corpus. For 21 out of the 24, both sentences in the minimal pair yielded tracks deemed to be correct depictions. Example videos for all 9 minimal pairs is included in the supplementary material.

Various prior aspects on generating sentences to describe images video uses special-purpose natural-language-generation methods. The ability of the sentence tracker can be used to score a sentence paired with a video as a general-purpose natural-language generator by searching for the highest-scoring sentence for a given video. However, this has a problem. Since h and a are log probabilities, g is a negative Euclidean distance, and f is constrained to be negative, scores decrease with longer word strings and greater numbers of tracks that result from longer word strings. The highest-scoring sentence is not actually searched for, which would bias the process towards short sentences. Instead, complex sentences are sought that are true of the video as they are more informative.

Nominally, this search process would be intractable since the space of possible sentences can be huge and even infinite. However, beam search can be used to get an approximate answer. This is possible because the sentence tracker can score any collection of words, not just complete phrases or sentences. The k top-scoring single-word strings can be selected and then repeatedly extend the k top-scoring n-word strings, by one word, to select the k top-scoring n+1-word strings, subject to the constraint that these n+1-word strings can be extended to grammatical sentences by insertion of additional words. Thus, the search process is terminated when the contraction threshold, the ratio between the score of an expanded string and the score of the string it expanded from, exceeds a specified value and the string being expanded is a complete sentence. This contraction threshold controls complexity of the generated sentence.

When restricted to FSMs, h and a will be 0/1 which become $-\infty/0$ in log space. Thus increase in the number of words can only decrease a score to $-\infty$, meaning that a string of words is no-longer true of a video. Since true sentences are sought, the above beam search process is terminated before the score goes to $-\infty$. In this case, there is no approximation: a beam search maintaining all n-word strings with finite score yields the highest-scoring sentence before the contraction threshold is met.

Generation of sentential descriptions: constructing the highest-scoring sentence for each video that is generated by the grammar in Table 11(a), by means of a beam search, was tested.

With respect to this approach, the space of sentences were searched in the grammar in Table 11(a) to find the true sentence for each of the 94 videos in the corpus. Note that the grammar generates an infinite number of sentences due to recursion in NP. Even restricting the grammar to eliminate NP recursion yields a space of 816,419,347,200 sentences. Despite not restricting the grammar in this fashion, good descriptions of the videos can be effectively found. The accuracy of the sentence tracker in generating descriptions for all 94 videos in the corpus was computed for multiple contraction thresholds. Accuracy was computed as the percentage of the 94 videos for which the sentence tracker produced descriptions that were deemed to be true. Contraction thresholds of 0.95, 0.90, and 0.85 yielded accuracies of 63.82%, 69.14%, and 64.89% respectively.

The availability of vast video corpora, such as on YouTube, has created a rapidly growing demand for content-based video search and retrieval. The existing systems, however, only provide a means to search via human-provided captions. The inefficacy of such an approach is evident. Attempting to search for even simple queries such as "pick up" or "put down" yields surprisingly poor results, let alone searching for more complex queries such as "person approached horse". Various prior aspects on content-based video-retrieval systems search only for objects or search only for events. Even combining such to support conjunctive queries for videos with specified collections of objects jointly with a specified event, would not effectively rule out videos where the specified objects did not play a role in the event or played different roles in the event. For example, it could not rule out a video depicting a person jumping next to a stationary ball for a query "ball bounce" or distinguish between the queries "person approached horse" and "horse approached person". The sentence tracker exhibits the ability to serve as the basis of a much improved video search and retrieval tool, one that performs content-based search with complex sentential queries to find precise semantically relevant clips.

Sentential-query-based video search (returning the best-scoring video, in a corpus of 94 videos, for a given sentence) was tested. With respect to this approach, every video in the corpus was scored against every sentence in Table 12, rank ordering the videos for each sentence. Results over the 1974 scores are shown in Table 17.

TABLE 17

| | |
|---|---|
| % chance that a video selected at random is deemed to be true of a given sentence | 13.12% |
| % videos for which the top-scoring video is deemed to be true | 85.71% |
| % videos for which at least 1 of the top 3 scoring videos is deemed to be true | 100.00% |

The judgment of whether a video was deemed true of a sentence was made using the annotation. An additional evaluation was conducted with this annotation. A person can threshold the sentence-tracker score to yield a binary predicate on video-sentence pairs. Four-fold cross validation on the corpus was performed, selecting the threshold for each fold that maximized accuracy of this predicate, relative to the annotation, on 75% of the videos and evaluating the accuracy with this selected threshold on the remaining 25%. This yielded an average accuracy of 91.74%.

A novel framework is presented that utilizes the compositional structure of events and the compositional structure of language to drive a semantically meaningful and targeted approach towards activity recognition. This multimodal framework integrates low-level visual components, such as object detectors, with high-level semantic information in the form of sentential descriptions in natural language. Such integration is facilitated by the shared structure of detection-based tracking, which incorporates the low-level object-detector components, and of finite-state recognizers, which incorporate the semantics of the words in a lexicon.

The utility and expressiveness of the framework was shown by performing three separate tasks on the video corpus, requiring no training or annotation, simply by leveraging the framework in different manners. The first, sentence-guided focus of attention, showcases the ability to focus the attention of a tracker on the activity described in a sentence, indicating the capability to correctly identify such subtle distinctions as between "The person picked up the chair to the left of the trash can" and "The person picked up the chair to the right of the trash can". The second, generation of sentential description of video, showcases the ability to produce a complex description of a video, involving multiple parts of speech, by performing an efficient search for the description though the space of all possible descriptions. The final task, query-based video search, showcases the ability to perform content-based video search and retrieval, allowing for such subtle distinctions as between "The person approached the trash can" and "The trash can approached the person".

Throughout the remainder of this disclosure, the terms "you," "your," "yours," "we," "our," "ours," and other pronouns do not refer to any particular person or group. References to "this paper" in the text between this paragraph and the sentence beginning "It is precisely this dependence" refer to the portion of this disclosure after this paragraph up to, and including, that sentence. No statement regarding "this paper," or what any aspect is "fundamentally" or "basically" doing or intended to do, is intended to limit, or shall be construed to limit, the scope of any claim presented in the application as filed or of any claim subsequently presented, amended, or issued in this or any descendent patent application.

Various aspects relate to a compositional framework for grounding language inference, generation, and acquisition in video.

We present an approach to simultaneously reasoning about a video clip and an entire natural-language sentence. The compositional nature of language is exploited to construct models which represent the meanings of entire sentences composed out of the meanings of the words in those sentences mediated by a grammar that encodes the predicate-argument relations. We demonstrate that these models faithfully represent the meanings of sentences and are sensitive to how the roles played by participants (nouns), their characteristics (adjectives), the actions performed (verbs), the manner of such actions (adverbs), and changing spatial relations between participants (prepositions) affect the meaning of a sentence and how it is grounded in video. We exploit this methodology in three ways. In the first, a video clip along with a sentence are taken as input and the participants in the event described by the sentence are highlighted, even when the clip depicts multiple similar simultaneous events. In the second, a video clip is taken as input without a sentence and a sentence is generated that describes an event in that clip. In the third, a corpus of video clips is paired with sentences which describe some of the events in those clips and the meanings of the words in those sentences are learned. We learn these meanings without needing to specify which attribute of the video clips each word in a given sentence refers to. The learned meaning representations are shown to be intelligible to humans.

People use their knowledge of language to make sense of the world around them, not just to describe their observations or communicate to others. In this work, we present an approach which is able to describe video clips in natural language while simultaneously using that capacity to reason about the content of those clips. While earlier approaches can detect individual features in video, such as objects or events, we show how knowledge of language can integrate information from these different feature detectors in order to both improve their performance and support novel functionality. To do this, we exploit the compositional nature of language to construct models for entire sentences from individual word models, and use such models to determine if an entire sentence describes a video clip. We call the mechanism for determining how well a video clip depicts a sentence, and alternatively how well a sentence describes a video clip, the sentence tracker, because it simultaneously performs multi-object tracking and recognition of events described by sentences. This ability to score video-sentence pairs also permits performing a task that humans naturally engage in: learning word meanings. We show how the sentence tracker can perform this task using the same kind of information that is available to children, namely, video paired with entire sentences which describe some of the events depicted. This general-purpose inference mechanism for combining bottom-up information from low-level video-feature detectors and top-down information from natural-language semantics permits performing three tasks: tracking objects which are engaged in a specific event as described by a sentence, generating a sentence to describe a video clip, and learning word meaning from video clips paired with entire sentences.

Fundamentally, our approach relies on solving two separate problems simultaneously: tracking the participants of an event and recognizing the occurrence of that event. We formulate this as the combination of two measures: a measure of how well a video clip depicts a track collection and how well that track collection depicts an event. Note that what we mean by 'event' is a complex state of affairs described by an entire sentence, not the common definition used in the computer-vision community, which refers to a single verb label attached to a video clip. In order to solve both problems simultaneously, we show how the similarity between tracking and event recognition facilitates a common inference algorithm. We perform single-object tracking by combining the output of an unreliable detection source, an object detector, with an estimate of the motion present in the video, optical flow. The tracks produced include strong detections and their motion agrees with the motion present in the video. We perform single-word recognition by representing the meaning of a word in terms of the gross motion of object tracks. Finally, we show how single-object tracking and single-word recognition combine to perform multi-object tracking and whole-sentence recognition by exploiting the compositionality of language to combine word models into sentence models and by formulating both tasks in a way that is amenable to dynamic programming.

This ability to perform both tasks simultaneously—in other words, to score a video-sentence pair with how well the video clip depicts the sentence—is useful for attaining good performance. By integrating top-down and bottom-up information, it corrects errors in object-detector output. This is important because object detectors are highly unreliable, achieving at most 40%-50% average precision on the PASCAL Visual Object Classes (VOC) challenge Everingham et al. (2010). Barbu et al. (2012) showed how the reliability of object tracking and single-word recognition (typically for a verb) can be improved by performing both simultaneously.

We build on this earlier work and extend it to track multiple objects and recognize whole sentences. We further extend that work with a novel approach to sentence generation and learning word meanings.

Following Yamoto et al. (1992), Siskind and Morris (1996), and Starner et al. (1998), we represent word meanings in a fashion that can be grounded in video as multi-state time-series classifiers, either hidden Markov models (HMMs) or finite-state machines (FSMs), over features extracted from object tracks in such video. For example, a model for approach might use three states to encode an event where the distance between two tracked objects is initially high, over time decreases, and finally ends by being small. Those earlier approaches confined themselves to representing the meaning of verbs, but we employ the same representation for all words in the lexicon regardless of their part of speech. This permits combining word models together into sentence models, in essence, creating large factorial models. Unlike earlier work, we exploit linguistics, namely the concept of linking, to construct the particular factorial model which encodes the predicate-argument structure of a specific sentence, not all sentences which happen to share the same words. For example the sentence. The person picked up the backpack has very different meaning from the sentence The backpack picked up the person, despite sharing all words, and our method encodes such distinctions.

An overview of the operation of the sentence tracker is now described. Information is extracted from video using object detectors and optical flow. Independently, a sentence is parsed and the number of participants is determined, together with a linking function. Each word in the sentence has an associated model. The information extracted from the sentence combines with the per-word models to form a model for an entire sentence. That model takes, as input, the data extracted from a video clip and computes how well the clip depicts the given sentence, the video-sentence score shown in Equation 53.

In order to more formally articulate this approach and its applications, we represent the measure of how well a video clip depicts a sentence as a function $S:(B, s, \Lambda) \mapsto (\tau, J)$, where B represents the information extracted from a video clip, s represents the sentence, $\Lambda$ represents word meanings, r is the video-sentence score, and J is a collection of tracks, one for each participant in the event described by the sentence, corresponding to the optimal video-sentence score. We use $S_\tau$ and $S_J$ to refer to the two components produced by S. This function internally makes use of the number L of event participants and $\theta$, a linking function. The linking function maps arguments of words in the sentence to event participants. We make use of a linking process, a function $\ominus: s \mapsto (L, \theta)$, described below, to derive the number L of participants and the linking function $\theta$. We now elaborate on three applications of this approach that we will demonstrate: language inference, language generation, and language acquisition.

In language inference, one can apply the sentence tracker to the same video clip B, that depicts multiple simultaneous events taking place in the field of view, with two different sentences $s_1$ and $s_2$. In other words, one can compute $J_1 = S_J(B, s_1, \Lambda)$ and $J_2 = S_J(B, s_2, \Lambda)$ to yield two different track collections $J_1$ and $J_2$ corresponding to the different sets of participants in the different events described by $s_1$ and $s_2$. Specifically, we show how language inference, unlike many other approaches to event recognition, not only deals with video that depicts multiple simultaneous events, but is also sensitive to subtle changes in sentence meaning. We present an experiment where we construct minimal pairs of sentences, given a grammar, which differ in only a single lexical constituent, where that varying lexical constituent can itself vary among all parts of speech and sentential positions. For example the two sentences The person to <<Red>> the left of the trash can put down an object.

The person to <<Green>> the right of the trash can put down an object.

are minimal pairs which differ in the preposition attached to the subject noun phrase. We construct a video corpus where both sentences in such minimal pairs occur simultaneously in the same video clip and demonstrate how language inference is sensitive to changes in sentential meaning by producing two distinct and semantically appropriate sets of tracks given each of the two sentences as input. To conduct a thorough evaluation, we employ a vocabulary of 17 lexical items (5 nouns, 2 adjectives, 4 verbs, 2 adverbs, 2 spatial-relation prepositions, and 2 motion prepositions) and a video corpus of 94 clips.

In language generation, we take a video clip B as input and systematically search the space of all possible sentences s, that can be generated by a context-free grammar, and find the sentence with maximal video-sentence score:

$$\operatorname*{argmax}_{s} S_\tau(B, s, \Lambda) \tag{36}$$

This generates a sentence that best describes an input video clip B. Unlike previous approaches to sentence generation from video which are largely ad hoc, herein is presented an approach which can be mathematically optimal, in the sense that the generated sentence is that which will produce the highest video-sentence score, in various aspects. Our evaluation for language generation uses the same video corpus, grammar, and lexicon as used for language inference.

In language acquisition, simultaneous reasoning both about the presence and motion of participants in a video clip and about the meaning of a sentence describing that clip can be performed to compute models for word meaning from a training set of video clips paired with sentences. In other words, given a training set $\{(B_1, s_1), \ldots, (B_M, s_M)\}$ of video-sentence pairs where the word meanings $\Lambda$ are unknown, compute $$\operatorname*{argmax}_{\Lambda} \sum_{m=1}^{M} S_\tau(B_m, s_m, \Lambda) \tag{37}$$

which finds the word meanings $\Lambda$ that maximize the aggregate score for all video-sentence pairs in the training set. Word meanings are learned without needing to annotate which word refers to which attribute of the video and without annotating the tracks for the objects which participate in the event described in the training sentences. To conduct a thorough evaluation, a vocabulary of 16 lexical items (6 nouns, 4 verbs, 2 adverbs, 2 spatial-relation prepositions, and 2 motion prepositions) is used, as well as a video corpus of 94 clips out of which a total of 276 video-sentence pairs are constructed.

Word meanings, and ultimately sentence meanings, are represented as constraints over the time-varying spatial relations between event participants: their relative and/or absolute positions, velocities, and/or accelerations. This requires tracking the positions of event participants over the course of a video clip. Object detectors may not accurately determine which object classes were present in any video frame and for those that are, may not precisely determine the positions of all instances of those classes in the field of view. Object detectors only achieve between 3.8% and 65% average precision on the PASCAL VOC benchmark Everingham et al. (2010). This means that, in practice, they suffer from both false positives and false negatives. While it is desirable to produce a single detection for each of the person and backpack, spurious detections (false positives) are sometimes observed, and failures to obtain the desired detection (false negatives) are also sometimes observed.

State-of-the-art object detectors are imperfect. A single detection is desirable for the person and backpack, in practice spurious detections (false positives), or failures to obtain the desired detection (false negatives), can occur. Reducing the acceptance threshold biases the detector to trade off a higher false-positive rate for a lower false-negative rate.

The general approach to resolving this problem is to overgenerate. The acceptance threshold is lowered for the detector, trading off a higher false-positive rate for a lower false-negative rate. We attempt to lower the threshold sufficiently to completely eliminate false negatives, biasing it to have a preponderance of false positives. The tracking problem then reduces to the problem of selecting detections from the frames of a video clip to assemble coherent tracks.

It is desirable to track a single instance of a specified object class known to be present in the field of view throughout a video clip. We track that object by selecting a single detection in each frame from the pool of detections for that object class. The sequence of the top-scoring detection in each frame might not be temporally coherent. Likewise, the most temporally-coherent sequence of detections might include low-scoring misdetections. Thus our approach is to balance these two extremes by incorporating both the detection score and a temporal-coherence score into the selection criterion. This often can yield the desired track.

Assembling a track can be done from a single detection per frame selected from a pool of overgenerated detections. Selecting the top-scoring detection in each frame of a video clip can yield an incoherent track. Selecting tracks to maximize temporal coherence can lead to tracks incorporating solely low-scoring misdetections. Selecting tracks to maximize an appropriate combination of detection score and temporal-coherence score can lead to the desired track.

We adopt an objective function that linearly combines both the sum of the detection scores in all video frames and the sum of a temporal-coherence score applied to all pairs of adjacent video frames. More formally, in a video clip B of T frames, with $J^t$ detections $b_1^t, \ldots, b_{J^t}^t$ in frame t, we seek a track j, namely a sequence $j^1, \ldots, j^T$ of detection indices, that maximizes the sum of the detection scores $f(b_{j^t}^t)$ and the temporal-coherence scores $g(b_{j^{t-1}}^{t-1}, b_{j^t}^t)$:

$$\max_j \left( \sum_{t=1}^T f(b_{j^t}^t) \right) + \left( \sum_{t=2}^T g(b_{j^{t-1}}^{t-1}, b_{j^t}^t) \right) \quad (38)$$

The objective function in Equation 38 constitutes a measure of how well a video clip B depicts a track j. We employ this particular objective function because it can be optimized efficiently with dynamic programming Bellman (1957), namely the Viterbi (1967a) algorithm. This leads to a lattice, as shown in FIG. 7B. The columns of the lattice correspond to video frames, the detections in each frame constitute the columns, and a track constitutes a path through the lattice.

Referring back to FIG. 7B, there is shown the lattice constructed by the Viterbi (1967a) algorithm for detection-based tracking. The columns correspond to video frames $t=1, \ldots, T$. Each column contains the overgenerated collection $b_1^t, \ldots, b_{J^t}^t$ of detections for that frame. The rows correspond to detection indices j. A track j, namely a sequence $j^1, \ldots, j^T$ of detection indices, corresponds to a path through the lattice. The Viterbi (1967a) algorithm finds the path that optimizes Equation 38, among the exponentially many potential tracks, in time $O(T J^2)$, where J is the maximum of $J^1, \ldots, J^T$.

The general approach to tracking by overgenerating detections and selecting among those to yield a track is known as detection-based tracking. Our approach to using the Viterbi (1967a) algorithm for this purpose was first explored by Viterbi (1971) to track radar detections. It relies on an analogy: detections correspond to HMM states, the detection score corresponds to the HMM output probability, the temporal-coherence score corresponds to the HMM state-transition probability, and finding the optimal track corresponds to finding the maximum a posteriori probability (MAP) estimate of the HMM state sequence (where the computation of the MAP estimate is performed in log space).

We use this analogy for the entire remainder of this paper. Note that by this analogy we do not claim that Equation 38 has a probabilistic interpretation, nor do we claim that it computes a MAP estimate. The only analogy is that it optimizes a linear combination of two score components: the sum of state-based scores and the sum of transition-based scores. Such allows analogous optimization algorithms to apply to analogous formulas, even though they do not share analogous probabilistic interpretations. In particular, the Viterbi (1967a) algorithm can be applied to Equation 38, without any constraint on permissible values for the scores f(b) and g(b', b).

This detection-based tracking framework is very general. It can use any detection source(s), any method f(b) for scoring such detections b, and any method g(b', b) for scoring temporal coherence between detections b' and b in adjacent frames. In the work reported here, we use the deformable part model (DPM) detector of Felzenszwalb et al. (2010a) and Felzenszwalb et al. (2010b) as the detection source, which yields detections represented as axis-aligned rectangles and use the scores provided by DPM as the basis of f(b). The raw DPM score ranges from $-\infty$ to $\infty$. Nominally, Equation 38 and the Viterbi (1967a) algorithm can support such scores. However, these raw DPM scores, unfortunately, are incomparable across object classes. For reasons to be discussed herein, joint tracking of multiple objects requires that the detection scores be comparable across their object classes. Moreover, for reasons to be discussed herein, language acquisition requires moderately accurate indication of which object classes are present in the field of view, which could be ascertained if the detection scores were comparable across object classes. To address the above, we normalize the detection scores f(b) within each object class using a sigmoid $$\frac{1}{1 + \exp(-\chi(f(b) - \rho))} \quad (39)$$

where the parameters $\chi$ and $\rho$ are empirically determined per object class so that detection score correlates with the probability of a detection being a true positive. Further, for reasons to be discussed herein, we convert this value to log space. Choosing the parameters $\chi$ and $\rho$ in this fashion on a per-class basis allows the resulting detection scores to be comparable across classes. Note that while the resulting values of f(b) are in the range (−∞, 0], we do not take these to represent log probabilities.

We use optical flow to compute the adjacent-frame temporal-coherence score. We employ the FLOWLIB optical-flow library Werlberger et al. (2010) as it is one of the highest-performing methods on optical-flow benchmarks Baker et al. (2011). More specifically, to compute $g(b_{j'}^{t-1}, b_j^t)$, we compute the optical flow for frame t−1, compute the average flow vector v inside the axis-aligned rectangle for detection $b_{j'}^{t-1}$, forward project this detection one frame by translating that rectangle along v, and compute the square of the Euclidean distance between the center of that translated rectangle and the center of the corresponding rectangle for $b_j^t$. This yields a value that measures how well the local detection displacement matches a local estimate of its velocity and ranges from 0 to ∞ in a fashion that is inversely related to temporal coherence. We wish this value to be comparable to the detection score f(b) so that temporal coherence neither overpowers not is overpowered by detection score. Thus we normalize temporal coherence with a sigmoid as well, using a negative χ to invert the polarity, and convert to log space. Unlike for detection score, a single set of sigmoid parameters can be used across all object classes, because the temporal-coherence score only depends on detection centers. Note that again, while the resulting values of g(b', b) are in the range (−∞, 0], we do not take these to represent log probabilities. Moreover, even though the values of f(b) and g(b', b) are in the range (−∞, 0], and the values produced by Equation 38 also lie in that range, they do not represent log probabilities.

Given a particular track collection, one can determine whether those tracks depict a given event by measuring time-varying properties of those tracks. Such properties could be the relative and/or absolute object positions, velocities, and/or accelerations. The time-varying properties can be represented abstractly as a time-series of feature vectors computed from the tracks. In this view, event recognition can be formulated as time-series classification. Such classification can be performed by hidden Markov models (HMMs), either by computing a likelihood or a MAP estimate. Consider events with a single participant. In this case, we can abstractly take such an HMM to include K states, a state-transition function a(k', k) in log space, and an output model h(k,b) which denotes the log probability of generating a detection b in state k. The collection of K, a, and h is an event model λ. In log space, the MAP estimate for a particular track j is $$\max_k \left( \sum_{t=1}^{T} h(k^t, b_j^t) \right) + \left( \sum_{t=2}^{T} a(k^{t-1}, k^t) \right) \quad (40)$$

where k is a sequence $k^1, \ldots, k^T$ of states. Let $B_j$ denote the detection sequence $b_j^1, \ldots, b_j^T$ selected from the video clip B by the track j. Equation 40 constitutes a measure of how well the detection sequence $B_j$ selected from a video clip B by a track j depicts an event model λ. Higher MAP estimates result from tracks that better depict the event model. MAP estimates can be computed efficiently using the Viterbi (1967a) algorithm in time $O(TK^2)$. Note the similarity between Equations 40 and 38. This is due to the aforementioned analogy. Momentarily, we will avail ourselves of the fact that both can be computed with the Viterbi (1967a) algorithm. But we first need to address several subtleties in our formulation.

We use HMMs to encode probability distributions over time-series of feature vectors extracted from object tracks. These in turn serve to represent the meanings of verbs that describe the motion of such participant objects. For example, the meaning of the word bounce might be represented with an HMM, like that in FIG. 10, that places high probability on a track that exhibits alternating downward and upward motion. While such representations are tolerant of noisy input and can be learned using Baum-Welch Baum et al. (1970); Baum (1972), HMMs with many states, many features, and non-sparsely populated state-transition functions and output models are difficult for humans to understand and create. To facilitate perspicuity in human-generated meaning representations, we adopt a regular-expression notation, such as the following representation of the meaning of the word bounce:

$$\lambda_{bounce} \triangleq (\text{MOVINGDOWN}^+ \text{MOVINGUP}^+)^+ \quad (41)$$

In the above, MOVINGDOWN(b) and MOVINGUP(b) are predicates over detections b that are used to construct the output model h(k,b) and the regular expression is used to determine the number K of states, the state-transition function a(k', k), and which predicate to employ as the output model for a given state. These can be straightforwardly converted to finite-state machines (FSMs) which can, in turn, be viewed as a special case of HMMs with 0/1 state-transition functions and output models (−∞/0 in log space).

Figure 10:
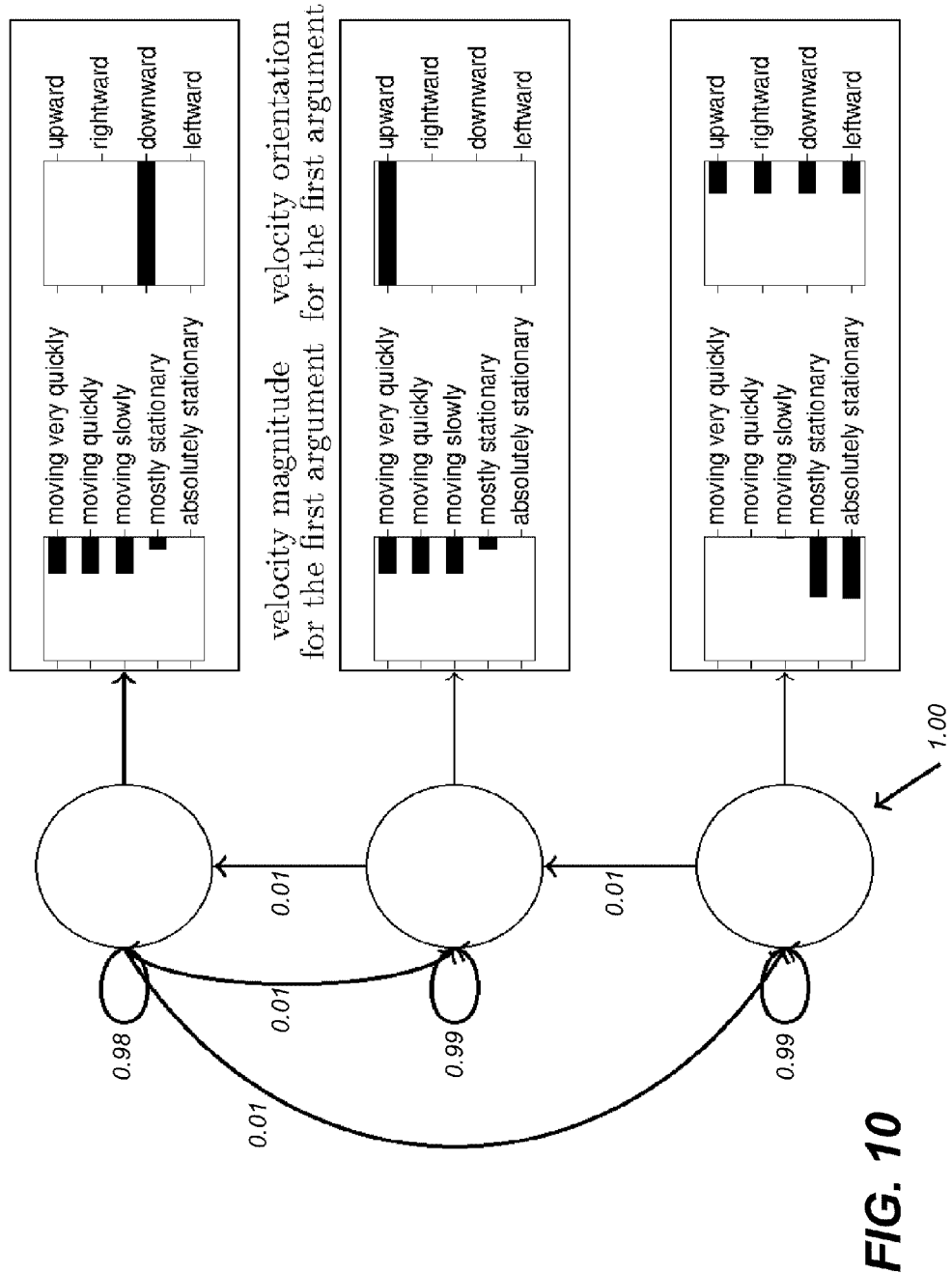
FIG. 10 shows an exemplary Hidden Markov Model (HMM) that represents the meaning of the word "bounce"

FIG. 10 shows an exemplary HMM that represents the meaning of the word bounce as a track that exhibits alternating downward and upward motion.

Equation 40 is formulated abstractly around a single state-transition function a(k', k). We also can include distributions over initial and final states. Traditional HMM formulations only incorporate initial-state distributions but not final-state distributions. Such HMMs might recognize a prefix of an event specification and not be constrained to match the entire event specification. (Without an initial-state distribution, it might recognize any subinterval of an event specification.) Our actual formulations include such initial- and final-state distributions but we omit them from our presentation for the sake of expository clarity.

Formulating the output model h(k,b) so as to depend on the detections in a single track allows an HMM to encode time-varying constraints on that single track. This can be used to represent the meaning of an intransitive verb that describes the motion of a single participant. We wish, however, to also be able to represent the meanings of transitive verbs that describe the motion of pairs of participants. We accomplish this by extending the output model $h(k, b_1, b_2)$ to depend on pairs of detections, one from each track. If we have two distinct tracks $j_1 = (j_1^1, \ldots, j_1^T)$ and $j_2 = (j_2^1, \ldots, j_2^T)$ for two distinct participants, we can think of them as deriving from the same detection pool. This allows extending Equation 40 as $$\max_k \left( \sum_{t=1}^{T} h(k^t, b_{j_1}^t, b_{j_2}^t) \right) + \left( \sum_{t=2}^{T} a(k^{t-1}, k^t) \right) \quad (42)$$

to support this.

HMMs can be susceptible to short-term noise in the input signal. If one were to have an event model, such as that in FIG. 11A that is intended to match a time series where there is an interval where the velocity is zero, followed by an interval where there is upward motion, followed by an interval where the velocity is again zero, it may unintentionally match a time series where the interval of upward motion is but a single frame that is spurious and the result of noisy tracking and feature extraction. The same thing might happen with an FSM representation such as $$\text{REST}(b_1,b_2) \triangleq \text{STATIONARY}(b_1) \wedge \text{STATIONARY}(b_2) \wedge \text{CLOSE}(b_1,$$
$$b_2) \text{ACTION}(b_1,b_2) \triangleq \text{STATIONARY}(b_1) \wedge \text{MOVING}$$
$$\text{UP}(b_2) \wedge \text{CLOSE}(b_1,b_2) \lambda_{pick\ up} \triangleq \text{REST}^+ \text{ACTION}^+ \text{REST}^+ \quad (43)$$

that is intended to model the meaning of pick up as a period of time where the agent is stationary and close to the patient that is subdivided into three sequential intervals where the patient is at first stationary, then moves up, and then is stationary again. This can unintentionally match a time series where the patient is continually stationary except for a single frame that is spurious and the result of noisy tracking and feature extraction. We can address this issue by requiring the central interval to have a minimum duration. We indicate such with the regular-expression operator $$R^{\{n,\}} \triangleq \underbrace{R \ldots R}_{n} R^*$$

to indicate that the R can be repeated at least n times. A definition such as $$\lambda_{pick\ up} \triangleq \text{REST}^+ \text{ACTION}^{\{3,\}} \text{REST}^+ \quad (44)$$

can be reduced to an FSM within our framework. Similarly, one can add a minimum state-duration requirement to an HMM, such as that in FIG. 11A, by recoding it as in FIG. 11B.

Figure 11A:
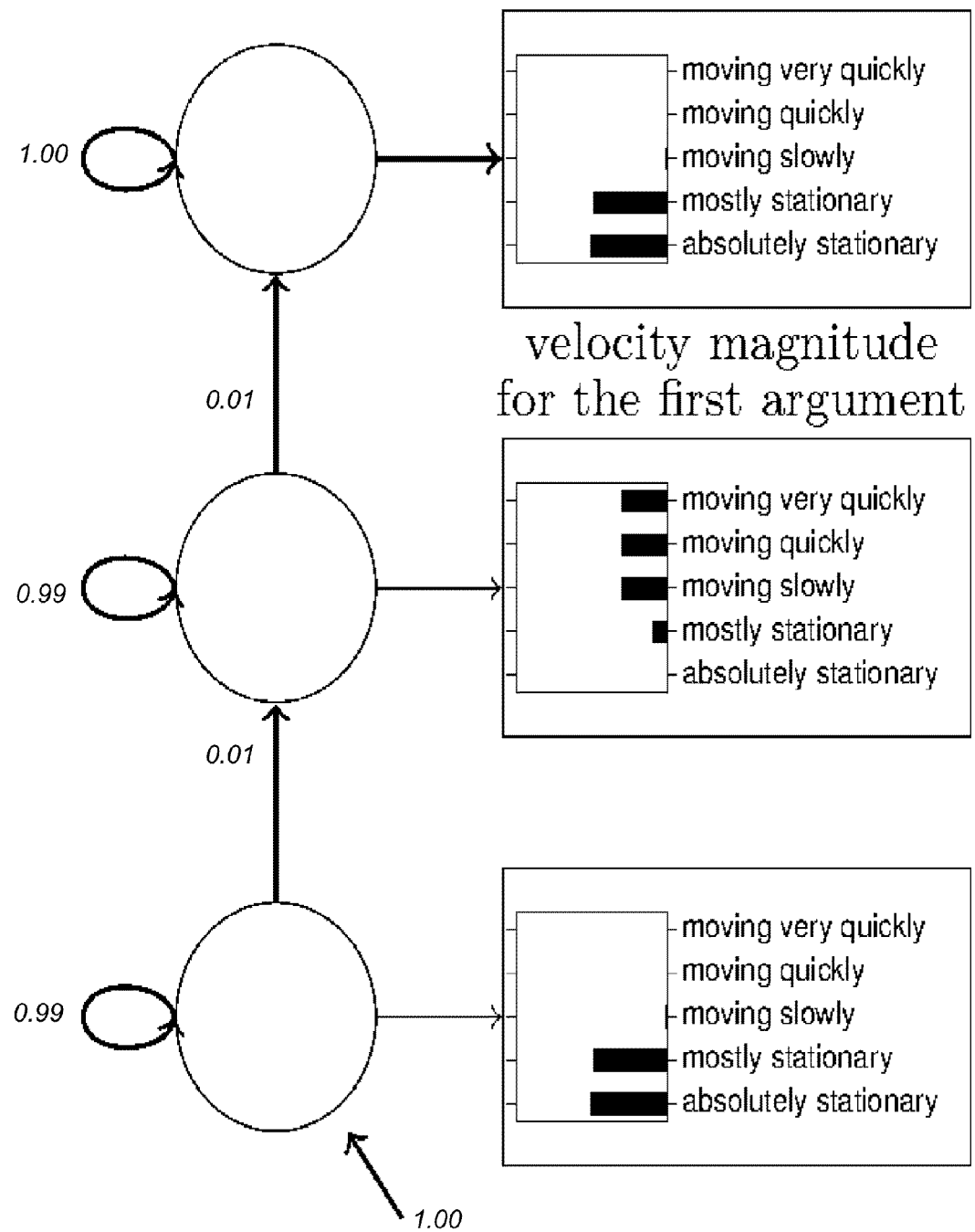
FIGS. 11A and 11B show further examples of HMMs.
Figure 11B:
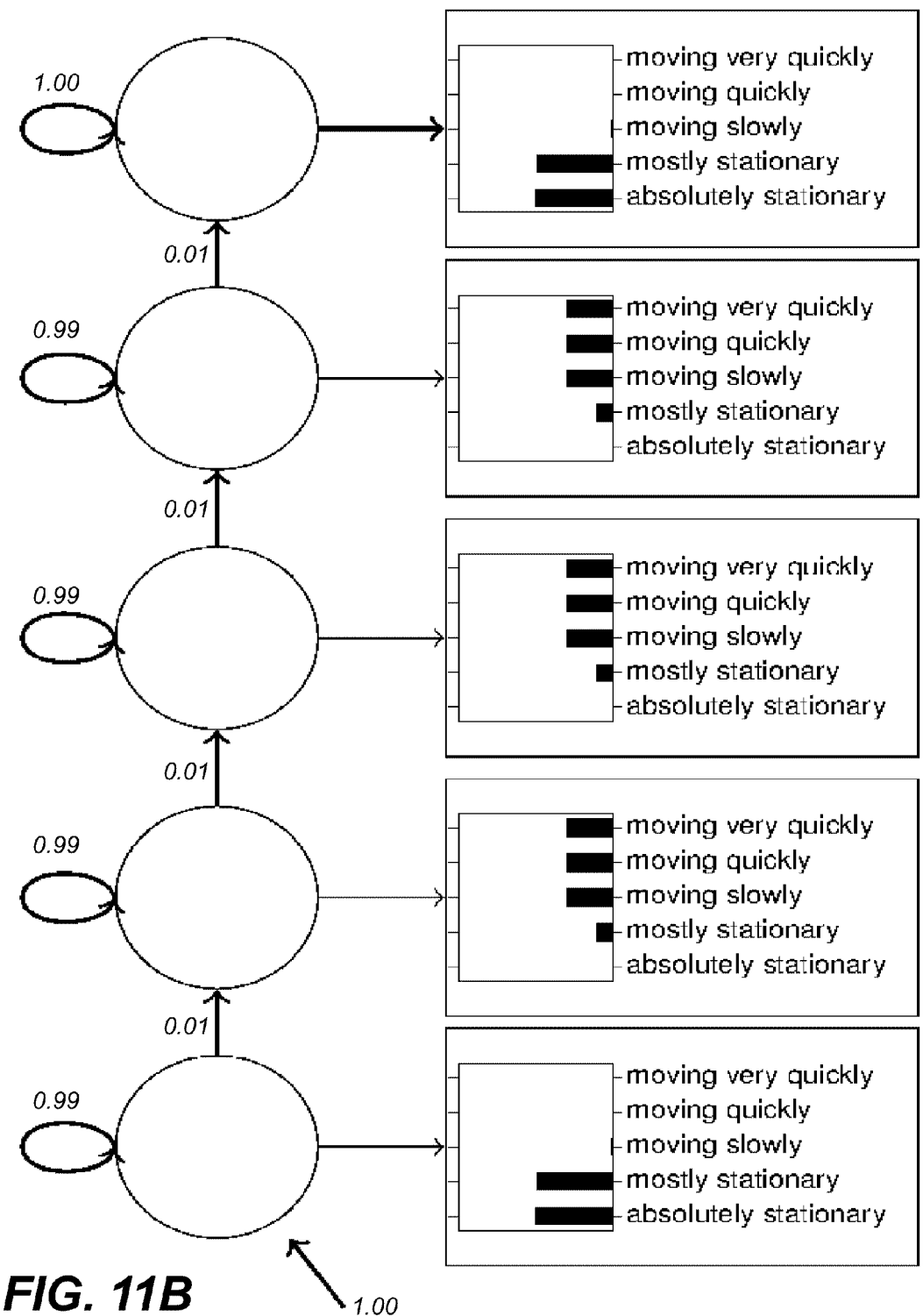

FIG. 11A shows an exemplary HMM that can be susceptible to short-term noise in the input signal. The central state might admit a noisy impulse lasting a single frame. FIG. 11B shows a variant of FIG. 11A that constrains the central interval to hold for at least 3 frames.

The above handles short-term false positives, namely the presence of a short-term spuriously true signal. We also need to handle short-term false negatives, namely an intended longer interval where a signal can meet a specified condition but fails to do so due to a short-term failure to meet that condition. We use a new regular-expression operator $R^{[n,]} \triangleq (R\ [\text{TRUE}])^{\{n,\}}$ to indicate that R can be repeated at least n times but can optionally have a single frame of noise between each repetition. One can extend HMMs in a similar fashion though we have not found the need to do so because the output models already can tolerate some noise.

Nominally, our detections $b_j^t$ are axis-aligned rectangles represented as image coordinates. This allows the output models h(k,b) to depend on quantities that can be computed from such, e.g., position of the detection center, the size of the detection, and the aspect ratio of the detection, which can indicate notions like big, small, tall, or wide. It also allows two-track output models h(k, $b_1$, $b_2$) to depend on quantities like the distance between detection centers or the orientation of a line between those centers, which can indicate notions like close, far, above, or below. Without further information, it is not possible for the output models to depend on relative or absolute velocity, which would be needed to encode notions like fast, slow, stationary, moving, upwards, downwards, towards, or away from. One way to achieve such would be to extend the output models to depend on detections from adjacent frames, as in h(k, b', b) or h(k, $b_1$', $b_1$, $b_2$', $b_2$). We can accomplish such with a variant of Equation 40 that sums over pairs of adjacent detections.

$$\max_k \left( \sum_{t=2}^T h(k^t, b_{j^t-1}^{t-1}, b_{j^t}^t) + a(k^{t-1}, k^t) \right) \quad (45)$$

However, extending this approach to acceleration would severely increase the runtime because it would require a variant that sums over three adjacent frames. Moreover, two-point velocity estimates and three-point acceleration estimates suffer from noise due to inaccurate tracking. Extending this approach even further to longer-term velocity and acceleration estimates would be exponential in the window-length of such estimates. And even such extensions would not support other desired features that could be extracted from the image, such as color. Thus we instead extend the notion of detection to include any information that might be extracted from the image at the location of the detection, such as average hue or optical flow inside the detection, and retain the initial formulation of output models h(k,b) and h(k, $b_1$, $b_2$) that depends on detections in a single frame.

The aforementioned method operates as a feed-forward pipeline. Equation 38 produces tracks for event participants, a time series of feature vectors is extracted from such tracks, and those time series are classified with HMMs to detect verb/event occurrences. This approach, however, can be very brittle. Failure earlier in the pipeline necessarily leads to failure later in the pipeline. This is particularly of concern, since the pipeline starts with object detections and, as we mentioned before, state-of-the-art object detection is unreliable.

Figure 12:
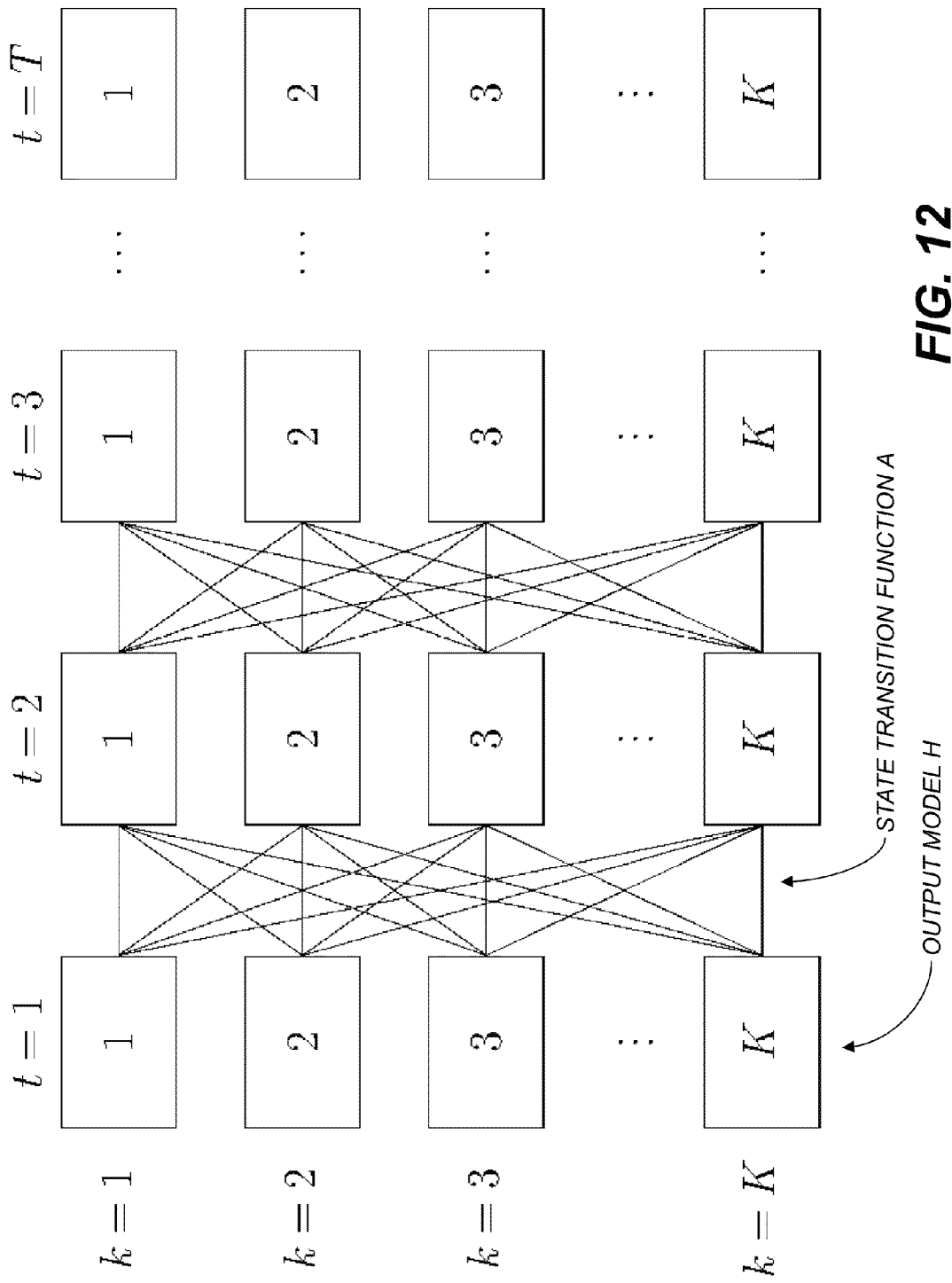
FIG. 12 shows an exemplary event tracker lattice.
Figure 13A:
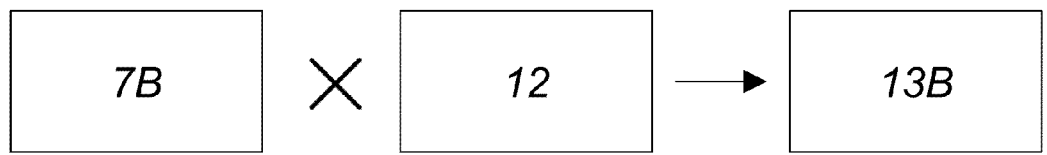
FIG. 13A shows an exemplary calculation pipeline.
Figure 13B:
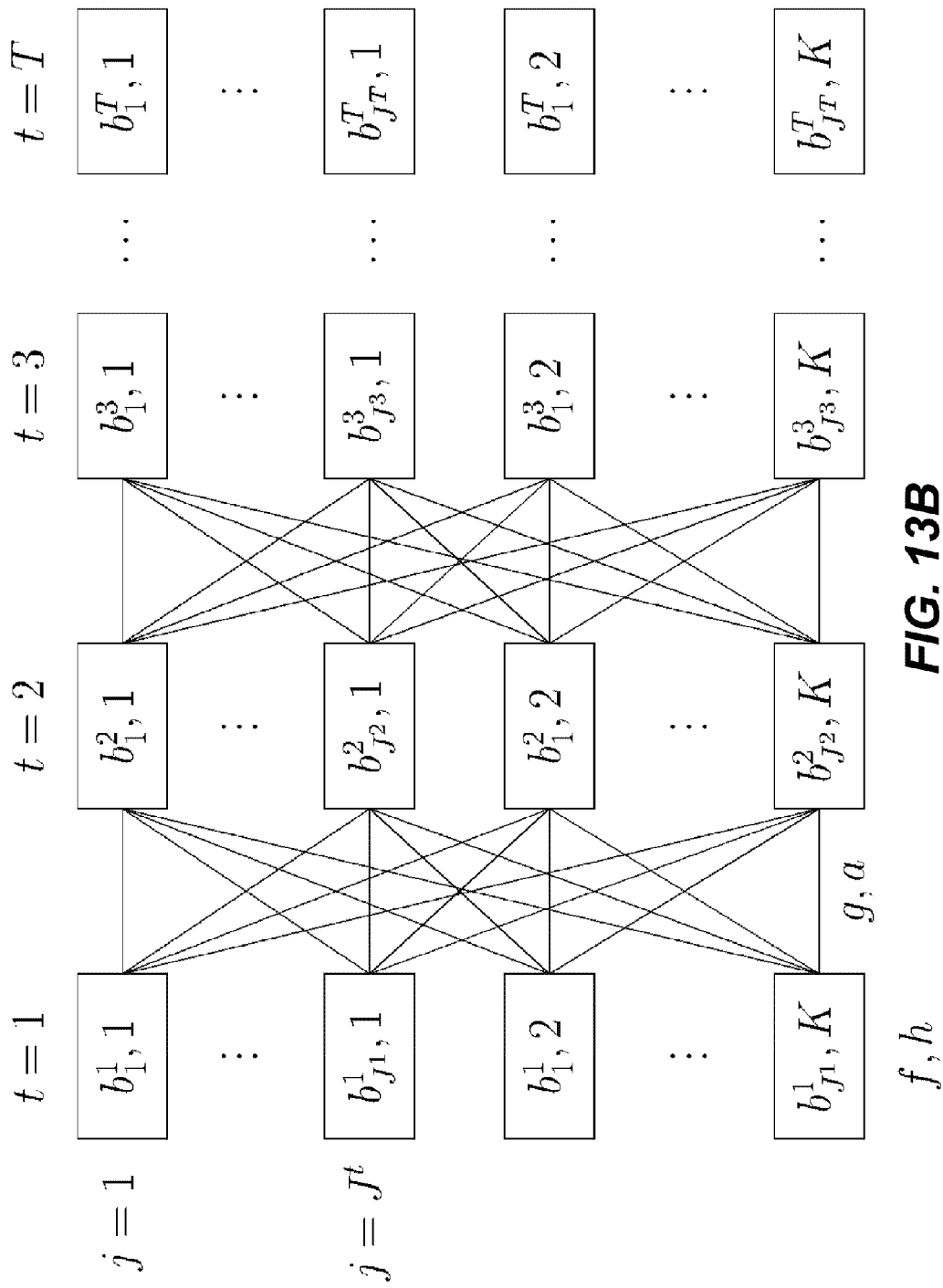
FIG. 13B shows an exemplary cross-product lattice corresponding to the pipeline of FIG. 13A.

Barbu et al. (2012) presented a novel approach for addressing this brittleness called the event tracker. This approach originates from the observation that Equations 38 and 40 share the same structure due to the aforementioned analogy, and thus share an analogous algorithmic framework for performing the optimization through analogous lattices. The feed-forward pipeline essentially cascades these algorithms and lattices, as shown in FIGS. 12, 13A, and 13B. This independently optimizes Equation 38, as a measure of how well a video clip B depicts a track j, and Equation 40, as a measure of how well the detection sequence $B_j$ selected from a video clip B by the track j depicts an event model λ, performing the former before the latter, and constructing the latter optimization problem around the track j produced by the former. Doing so takes Equation 40 as the sole measure of how well a video clip B depicts an event model λ. More precisely, it performs the following optimization:

$$\max_k \left( \sum_{t=1}^T h(k^t, b_{\hat{j}^t}^t) \right) + \left( \sum_{t=2}^T a(k^{t-1}, k^t) \right) \quad (46)$$

where $$\hat{j} = \underset{j}{\text{argmax}} \left( \sum_{t=1}^T f(b_{j^t}^t) \right) + \left( \sum_{t=2}^T g(b_{j^{t-1}}^{t-1}, b_{j^t}^t) \right)$$

While this does measure how well the detection sequence $B_j$ selected from the video clip B by the track j depicts an event model λ, it might not measure how well the video clip B depicts the event model λ because it fails to incorporate into that measure how well the video clip B depicts the track j. Thus, we might instead take the sum of Equations 38 and 40 as the measure of how well a video clip B depicts an event model λ. More precisely, we could adopt the following measure which involves the same optimization as Equation 46:

$$\left[\max_{j}\left(\sum_{t=1}^{T}f(b_{j^t}^t)\right)+\left(\sum_{t=2}^{T}g(b_{j^{t-1}}^{t-1},b_{j^t}^t)\right)\right]+\left[\quad(47)\right.$$

$$\left.\max_{k}\left(\sum_{t=1}^{T}h(k^t,b_{j^t}^t)\right)+\left(\sum_{t=2}^{T}a(k^{t-1},k^t)\right)\right]$$

where $$\hat{j}=\operatorname*{argmax}_{j}\left(\sum_{t=1}^{T}f(b_{j^t}^t)\right)+\left(\sum_{t=2}^{T}g(b_{j^{t-1}}^{t-1},b_{j^t}^t)\right). \quad (48)$$

This still independently optimizes the track j with Equation 38 and the state sequence k with Equation 40. We could, however, attempt to jointly optimize the track j and the state sequence k. This could be done by lifting both the maximizations over the track j and the state sequence k outside the summation of the measures of how well the video clip B depicts the track j and how well the detection sequence $B_j$ selected from the video clip B by the track j depicts the event model λ. This leads to the following optimization problem:

$$\max_{j,k}\left(\sum_{t=1}^{T}f(b_{j^t}^t)\right)+\left(\sum_{t=2}^{T}g(b_{j^{t-1}}^{t-1},b_{j^t}^t)\right)+ \quad (49)$$

$$\left(\sum_{t=1}^{T}h(k^t,b_{j^t}^t)\right)+\left(\sum_{t=2}^{T}a(k^{t-1},k^t)\right)$$

The observation of Barbu et al. (2012) is that Equation 49 has the same structure as both Equations 38 and 40 and can be optimized using the same Viterbi (1967a) algorithm by forming a cross-product of the tracker and HMM lattices, as shown in FIG. 13A, where each node in the resulting lattice combines a detection and an HMM state, as shown in FIG. 13B. Since the width of the cross-product lattice is O(JK), applying the Viterbi (1967a) algorithm to this cross-product lattice finds the path that optimizes Equation 49, among the exponentially many potential paths, in time $O(T(JK)^2)$.

A pipeline can be formed including a cascade of a tracker lattice (FIG. 7B) followed by an HMM lattice (FIG. 12) used for verb/event recognition. In various examples, finding the track j that optimizes the measure of how well a video clip B depicts that track, Equation 38, happens independently of and prior to finding the state sequence k that optimizes the measure of how well the detection sequence $B_j$ selected from a video clip B by the track j depicts the event model λ, Equation 40, the latter depending on the track j produced by the former. Since only the portion from Equation 40 is used as the measure of how well video clip B depicts event model λ, this corresponds to optimizing the scoring function in Equation 46. Taking the measure of how well a video clip B depicts an event model λ as a combination of measures of how well the video clip B depicts the track j and how well the detection sequence $B_j$ selected from the video clip B by the track j depicts an event model λ can be viewed as optimizing the scoring function in Equation 47, the sum of the two measures. FIGS. 12, 13A, and 13B show an example of a pipeline including a cascade of a tracker lattice (FIG. 7B) followed by an HMM lattice used for verb/event recognition (FIG. 12) that jointly optimizes the two measures corresponding to the optimization in Equation 49 that migrates the optimization outside the sum. FIG. 13B shows a cross-product lattice for performing the joint optimization in FIG. 13A.

While Equation 40 has a probabilistic interpretation as a MAP estimate, in log space, Equation 38 does not. Thus Equation 49 also does not, despite the fact that its value can lie in (−∞, 0]. The only claim is that it serves as a good scoring function, supporting joint optimization of the track j and the state sequence k. This results from the fact that all four of its components, namely the detection score f(b), the temporal-coherence score g(b', b), the output model h(k,b), and the state-transition function a(k', k) are all values in log space in the range (−∞, 0].

The event tracker ameliorates the brittleness of the feed-forward pipeline by allowing top-down information about the event to influence tracking. Using HMMs as event recognizers is accomplished by selecting that event model which best fits the event. This involves running each event model independently on the data. In the context of running a particular event model on the data, that event model could influence tracking in a top-down fashion. For example, in the context of evaluating how well an event model for walk fits the data, the tracker would be biased to produce tracks which move at a normal walking pace. Stationary tracks, or those that move too quickly, would not depict the target event and would be filtered out by Equation 49 but not by Equations 38, 46, or 47, when such tracks comprised high-scoring detections and were temporally coherent.

Equation 49 jointly optimizes a single tracker and a single event model. As such, it can only recognize events that have a single participant, such as those described by intransitive verbs. Events with two participants, such as those described by transitive verbs, can be encoded using the methods herein, by using Equation 42 instead of Equation 40 and forming the cross product of this with two trackers instead of one.

$$\max_{j_1,j_2,k}\left(\sum_{t=1}^{T}f(b_{j_1^t}^t)\right)+\left(\sum_{t=2}^{T}g(b_{j_1^{t-1}}^{t-1},b_{j_1^t}^t)\right)+\left(\sum_{t=1}^{T}f(b_{j_2^t}^t)\right)+ \quad (50)$$

$$\left(\sum_{t=2}^{T}g(b_{j_2^{t-1}}^{t-1},b_{j_2^t}^t)\right)+\left(\sum_{t=1}^{T}h(k^t,b_{j_1^t}^t,b_{j_2^t}^t)\right)+\left(\sum_{t=2}^{T}a(k^{t-1},k^t)\right)$$

This can be further generalized from two participants to L participants.

$$\max_{J,k}\left[\sum_{l=1}^{L}\left(\sum_{t=1}^{T}f(b_{j_l^t}^t)\right)+\left(\sum_{t=2}^{T}g(b_{j_l^{t-1}}^{t-1},b_{j_l^t}^t)\right)\right]+ \quad (51)$$

$$\left(\sum_{t=1}^{T}h(k^t,b_{j_1^t}^t,\ldots,b_{j_L^t}^t)\right)+\left(\sum_{t=2}^{T}a(k^{t-1},k^t)\right)$$

In the above, J denotes a track collection $j_1, \ldots, j_L$ which, in turn, comprises detection indices $j_l^t$. Equations 50 and 51 can also be optimized with the Viterbi (1967a) algorithm by forming a cross-product lattice. Since the width of this cross-product lattice is $O(J^L K)$, applying the Viterbi (1967a) algorithm to this cross-product lattice finds the path that optimizes Equation 51, among the exponentially many potential paths, in time $O(T(J^L K)^2)$. Note that this is exponential in the number L of participants. In practice, however, the arity of the semantic predicate underlying most events is limited, such as to three in the case of ditransitive verbs.

Let $B_J$ denote the detection-sequence collection $b_{j_1}^1, \ldots, b_{j_1}^T, \ldots, b_{j_L}^1, \ldots, b_{j_L}^T$ selected from the video clip B by the track collection J. Equation 51 jointly optimizes a measure of how well the video clip B depicts the event model λ as a combination of measures of how well the video clip B depicts the track collection J and how well the detection-sequence collection $B_J$ selected from the video clip B by the track collection J depicts an event model λ.

An experiment is now described. The objective of an experimental tracker is to track the person in a scene including a person, chair, backpack, and trash can in the foreground, and benches, chairs, lamps, trees, and bushes in the background. Due to the poor performance of the comparative person detector, it produces strong false-positive detections on the bench in the background. Even when overgenerating detections, and selecting a track that optimizes Equation 38, this tracks the bench in the background for a portion of the video clip, instead of a person. This happens because the track is largely temporally coherent within segments, and in combination with the strong false-positive detections in the background, overpowers the adverse effect of a single large jump, thus yielding a high score for Equation 38. However, top-down information in the form of an event model for the transitive verb carry, linked to two trackers, one for an agent and one for a patient, selects a track for the agent, comprising true-positive person detections, that accurately reflects the role played by the person in the event, e.g., where a backpack, as patient, is carried by the person and not by the bench in the background.

Keyframes from a video clip were selected to demonstrate the advantages of the event tracker. The process began with overgenerated person detections. Detections were selected by detection-based tracking in Equation 38. Note that it selects a strong false-positive detection on a bench in the background and is not able to rule out such detections as with the exception of a single large jump, the rest of the track happens to be temporally coherent. Detections were selected by the event tracker from top-down information, in the form of a model for the transitive verb carry, constraining such detections to fill the role of agent in the event, in the context where a backpack, as patient, is carried by the person but not by the bench.

The event tracker from the previous section, and more generally HMM-based event recognizers, can model events with varying numbers of participants (one, two, and L participants for the event trackers in Equations 49, 50, 51 and one or two participants for the HMM-based event recognizers in Equations 40 and 42). Nominally, we can think of such events as being described by verbs: one-participant events as intransitive verbs, two-participant events as transitive verbs, and three-participant events as ditransitive verbs. However, other events or types of verbs can be used. The meanings of words in other parts of speech can often also be represented as HMMs. For example, the meaning of a noun that describes an object class can be represented as a single-state one-participant HMM whose output model serves as a classifier for that object class. Similarly, the meaning of an adjective that describes object characteristics can be represented as a single-state one-participant HMM whose output model serves to select detections that exhibit the desired characteristics reflected by that adjective. For example, the meanings of adjectives like big or tall could be represented with output models over the areas or aspect ratios of participant detections. Likewise, the meaning of a preposition that describes a spatial relation between two objects can be represented as a single-state two-participant HMM whose output model serves to select the collection of features that encode that relation. For example, the meaning of the preposition to the left of could be represented with an output model over the relative x-coordinates of the detections for the participants. More generally, any static property of either a single participant, or a collection of participants, can be encoded as a single-state HMM.

Multiple-state HMMs can encode the dynamic properties of either a single participant or a collection of participants. Such can reflect the meanings of adverbs and prepositions in addition to verbs. For example, the meaning of an adverb such as quickly that describes the changing characteristics of the motion of a single participant could be represented as a three-state HMM describing the transition from no motion, to motion with high velocity, back to no motion. Similarly, the meaning of a preposition such as towards that describes the changing relative motion between a pair of participants could be represented as a three-state HMM describing the transition from the agent being distant from the goal, to a period where the distance between the agent and the goal decreases while the goal is stationary, ending with the agent being close to the goal.

We thus see that the distinction between different parts of speech is primarily syntactic, not semantic, i.e., how word use is reflected in the grammar, not its potential meaning. While there may be some coarse-grained trends, such as the canonical structure realizations (CSRs) proposed by Grimshaw (1979, 1981) and Pinker (1984), where nouns typically describe object class, adjectives typically describe object properties, verbs typically describe event class, adverbs typically describe event properties, and prepositions typically describe spatial relations, this is not universally the case. Some intransitive verbs like sleep describe a more static object property, some transitive verbs like hold describe a more static spatial relation between pairs of objects, and some nouns like wedding describe an event. While it might seem like overkill to represent static classifiers as single-state HMMs, there are several advantages to adopting a single uniform meaning representation in the form of HMMs. First, the capacity for multiple states affords the ability to encode a resilience to temporal noise. Thus in practice, even static properties might be more robustly encoded with multiple states. Second, adopting a single uniform representation simplifies the overall framework and associated algorithms.

The event tracker from the previous section could influence detection-based tracking with top-down information from an event model. This event model could represent the meaning of an individual word. It could constrain a single track for single-participant words like intransitive verbs (Equation 49), a pair of tracks for two-participant words like transitive verbs (Equation 50), or even a collection of L tracks for L-participant words (Equation 51). Just as it was possible to take cross products of multiple trackers with a single event model, one can further extend the framework to take cross products of multiple trackers with multiple event models, thereby constraining the track collection to jointly satisfy a collection of event models for the words $s_1, \ldots, s_W$ in a sentence s.

$$\max_{J,K} \left[ \sum_{l=1}^{L} \left( \sum_{t=1}^{T} f(b_{j_l}^t) \right) + \left( \sum_{t=2}^{T} g(b_{j_l}^{t-1}, b_{j_l}^t) \right) \right] + \left[ \sum_{w=1}^{W} \left( \sum_{t=1}^{T} h_{s_w}(k_w^t, b_{j_1}^t, \ldots, b_{j_L}^t) \right) + \left( \sum_{t=2}^{T} a_{s_w}(k_w^{t-1}, k_w^t) \right) \right] \quad (52)$$

In the above, K denotes a state-sequence collection $k_1, \ldots, k_W$ which, in turn, comprises state indices $k_w^t$. This has L distinct trackers with distinct detection indices $j_l^t$ that select the optimal detection for participant l in frame t.

We distinguish between words in the lexicon and occurrences of those in sentences. We refer to the former as lexical entries e and the latter as words w. A given lexical entry may appear as more than one word in a sentence. A lexicon $\Lambda$ contains E event models $\lambda_1, \ldots, \lambda_E$, one event model $\lambda_e$ for each lexical entry e. A sentence s is formulated as a sequence $s_1, \ldots, s_W$ of W lexical entries $s_w$, one for each word w. Equation 52 has W distinct event models $\lambda_{s_w}$, one for each word w in the sentence s, each taken as the event model for the lexical entry $s_w$ for that word w. Each event model $\lambda_{s_w}$ has distinct numbers $K_{s_w}$ of states, state-transition functions $a_{s_w}$, and output models $h_{s_w}$. Note that while the state-transition functions $a_{s_w}$ and output models $h_{s_w}$ vary by word w, the detection score f and the temporal-coherence score g do not vary by participant l.

As formulated in Equation 52, the output model $$h_{s_w}(k_w^t, b_{j_1^t}^t, \ldots, b_{j_L^t}^t)$$

for each word w depends on the detections for frame t selected by the tracks $j_1, \ldots, j_L$ for all L participants. In practice, the meaning of each individual word only applies to a subset of the participants, as illustrated in FIG. 14. Here, the sentence The person to the left of the stool carried the traffic cone towards the trash can describes an event that has four participants: an agent, a referent, a patient, and a goal. The nouns person, stool, traffic cone and trash can refer to the agent, referent, patient, and goal respectively. The verb carried describes a semantic relation only between the agent and the patient. The preposition to the left of describes a semantic relation only between the agent and the referent. The preposition towards describes a semantic relation only between the agent and the goal. We employ a linking function $\theta_w^i$ to indicate which participant fills argument i for the event model for word w. Let $B\langle s, t, w, J\rangle$ denote $$b_{j_{\theta_w^1}^t}^t, \ldots, b_{j_{\theta_w^{I_{s_w}}}^t}^t,$$

the collection of detections selected in frame t by the track collection J as assigned to the $I_{s_w}$ arguments of the event model for word w by the linking function $\theta$. We incorporate the arity I in an event model $\lambda$, along with the number K of states, the state-transition function a, and the output model h. This allows reformulating Equation 52 as $$\max_{J,K} \left[ \sum_{l=1}^{L} \left( \sum_{t=1}^{T} f(b_{j_l^t}^t) \right) + \left( \sum_{t=2}^{T} g(b_{j_l^{t-1}}^{t-1}, b_{j_l^t}^t) \right) \right] + \left[ \sum_{w=1}^{W} \left( \sum_{t=1}^{T} h_{s_w}(k_w^t, B\langle s, t, w, J\rangle) \right) + \left( \sum_{t=2}^{T} a_{s_w}(k_w^{t-1}, k_w^t) \right) \right]$$ (53)

We refer to Equation 53 as the sentence tracker. For the remainder of this paper, $I_{s_w} \leq 2$.

Figure 15:
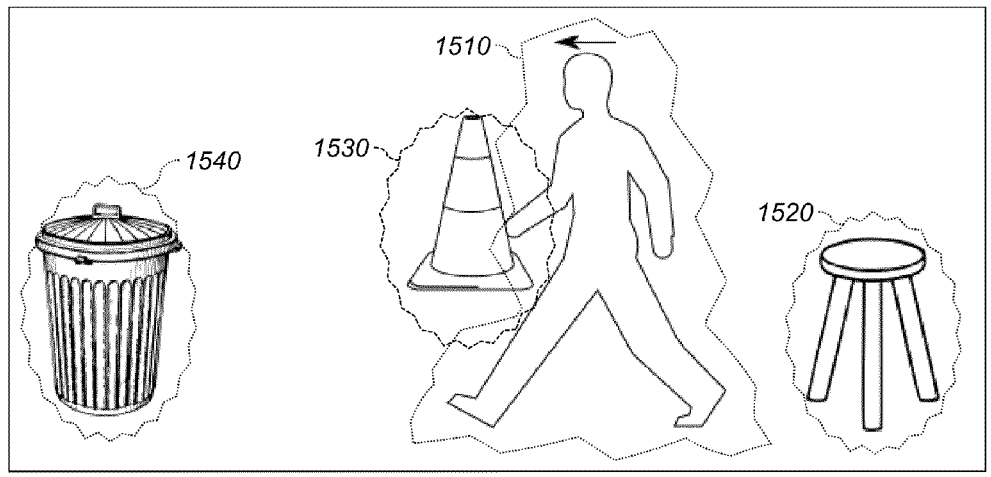
FIG. 15 is a graphical representation of a frame of video having detected objects corresponding to the detections in FIG. 14.

FIG. 14 shows an illustration of an exemplary linking function $\theta$ used by the sentence tracker. FIG. 15 is a graphical representation of a frame of video having detected objects corresponding to the detections in FIG. 14. In this example, highlight 1510 is shown around the person (detection 2), highlight 1520 is shown around the stool (detection 3), highlight 1530 is shown around the traffic cone (detection 1), and highlight 1540 is shown around the trash can (detection 0). Each word in the sentence has one or more arguments. (When words have two arguments, the first argument is indicated by a solid line and the second by a dashed line.) Each argument of each word is filled by a participant in the event described by the sentence. A given participant can fill arguments for one or more words. Each participant is tracked by a tracker which selects detections from a pool of detections produced by multiple object detectors. The upper mapping $\theta_w^i$ from arguments i of words w to participants is determined by parsing the sentence. The lower mapping $j_l^t$ from participants l in frames t to detections is determined automatically by Equation 53. This figure shows a possible (but erroneous) interpretation of the sentence where the lower mapping, indicated by the darker lines, is: agent↦ detection 3, referent↦ detection 0, patient↦ detection 1, and goal↦ detection 2.

Equation 53 can also be optimized with the Viterbi (1967a) algorithm by forming a cross-product lattice. Since the width of this cross-product lattice is $O(J^L K^W)$, where K is the maximum of $K_{s_1}, \ldots, K_{s_W}$, applying the Viterbi (1967a) algorithm to this cross-product lattice finds the path that optimizes Equation 53, among the exponentially many potential paths, in time $O(T(J^L K^W)^2)$. Note that this is exponential both in the number L of participants and the sentence length W. In practice, however, natural-language sentences have bounded length and are typically short. Moreover, the quadratic time complexity is mitigated somewhat by the fact that $K^W$ is an approximation to $$\prod_{w=1}^{W} K_{s_w}.$$

In practice, nouns, adjectives, and spatial-relation prepositions describe static properties of tracks and thus have word models where $K_{s_w} = 1$. Even longer sentences will be comprised predominantly of such word models and will contain relatively few verbs, adverbs, and motion prepositions.

Figure 16:
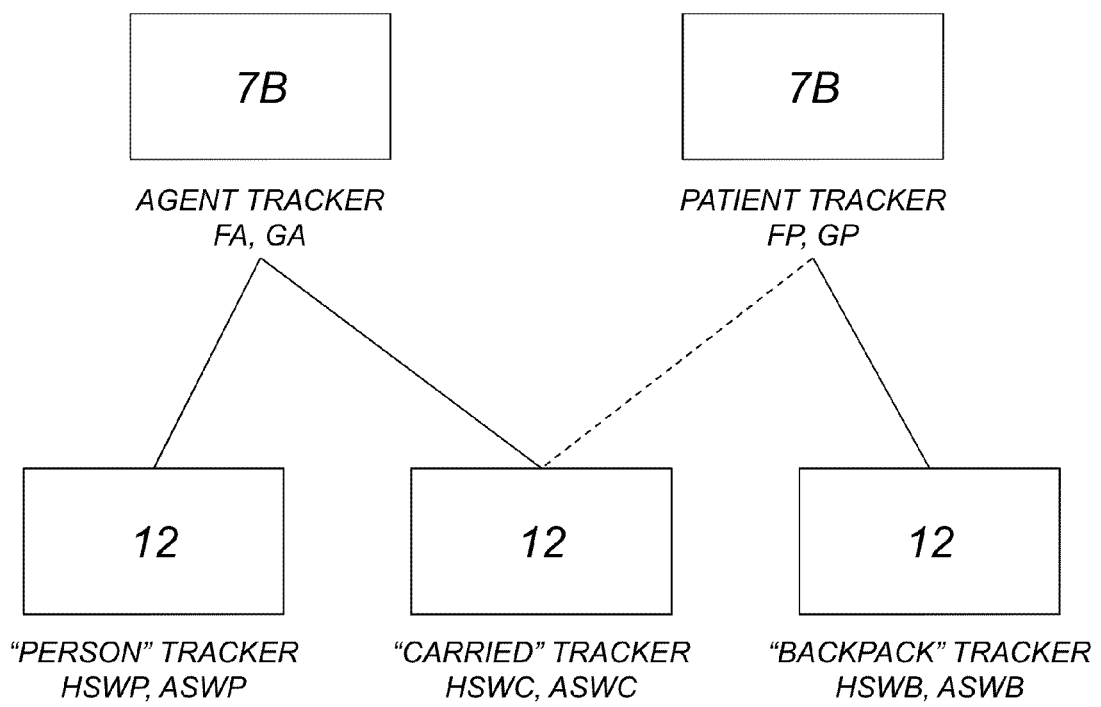
FIG. 16 shows an example of forming the cross product of various tracker lattices.
Figure 17:
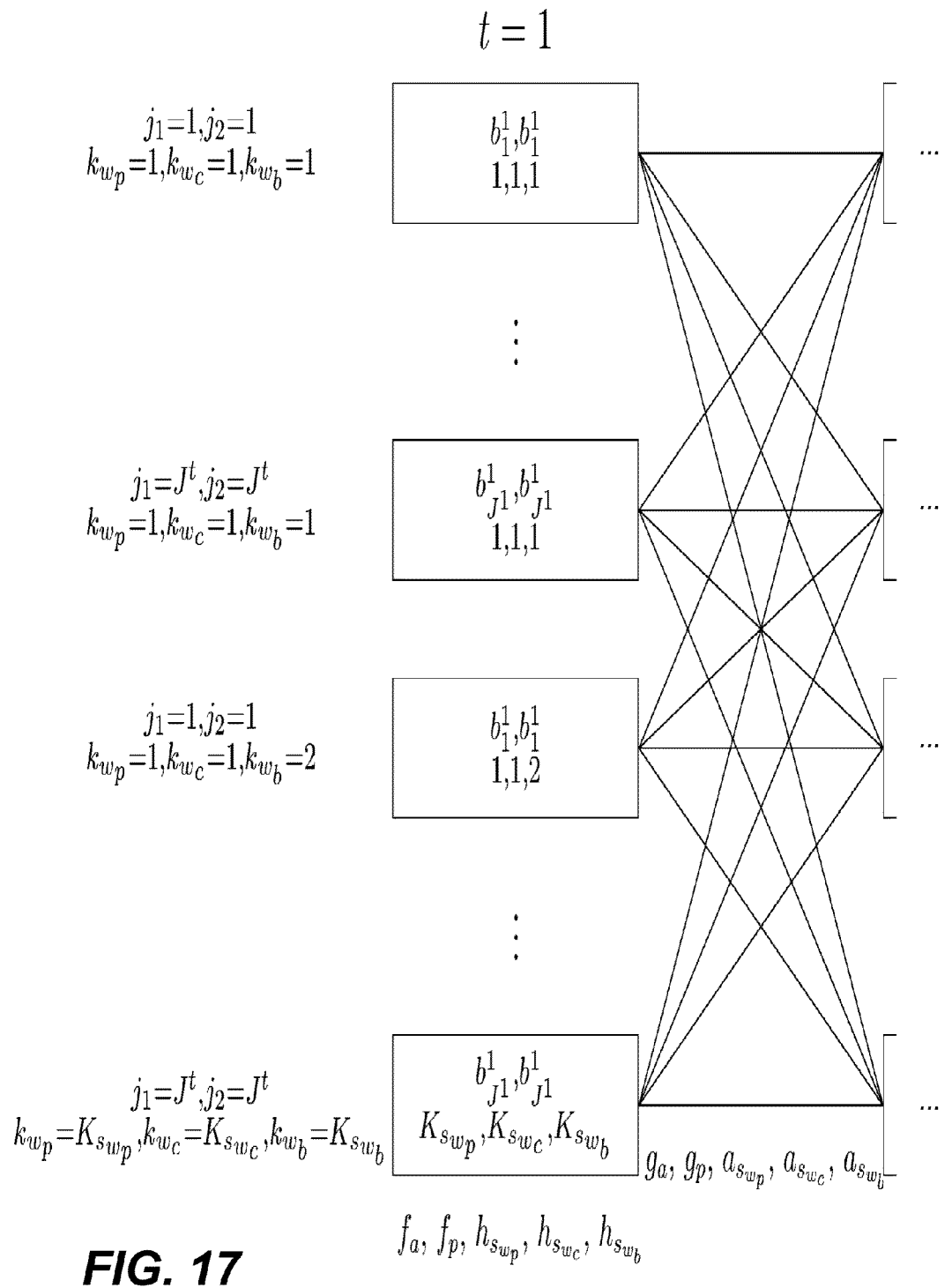
FIG. 17 shows the first column of the resulting cross-product matrix for the example in FIG. 16.

Modeling the meaning of a sentence through a collection of words whose meanings are modeled by HMMs defines a factorial HMM for that sentence, where the overall Markov process for that sentence is factored into independent component processes Brand et al. (1997); Zhong and Ghosh (2001) for the individual words. In this view, K denotes the state sequence for the combined factorial HMM and $k_w$ denotes the factor of that state sequence for word w. FIG. 16 illustrates the formation of the cross product of two tracker lattices (Equation 38) and three word lattices (Equation 40), linked together by an appropriate linking function $\theta$ to implement the sentence tracker (Equation 53) for the sentence The person carried the backpack. FIG. 17 illustrates the resulting cross-product lattice where each node in the lattice includes the combination of two detections, one for each tracker lattice, and three HMM states, one for each word lattice. The state thus represented by each node in this cross-product lattice can be factored into a collection of states written inside the node separated by commas.

FIG. 16 shows an example of forming the cross product of two tracker lattices (Equation 38; FIG. 7B; parameters $f_a$ and $g_a$) and three word lattices (Equation 40, FIG. 12; parameters $h_{s_{w_p}}, a_{s_{w_p}}$ and so forth) to implement the sentence tracker (Equation 53) for the sentence The person carried the backpack. The connections between the tracker lattices and the word lattices denote the linking function θ. FIG. 17 shows the first column of the resulting cross-product matrix for the example in FIG. 16. The other columns are similar, but for t=2, ..., T. Note that each node in the lattice includes the combination of two detections, one for each tracker lattice, and three HMM states, one for each word lattice.

Equation 53 constitutes S:(B, s, Λ) ↦ (τ, J). It scores a video-sentence pair with a measure of how well a given video clip B depicts a given sentence s, as interpreted by a given lexicon Λ. Alternatively, that score measures how well a given sentence s, as interpreted by a given lexicon Λ, describes a given video clip B. T and $J^1, \ldots, J^T$ are determined from B, W is determined from s, the arities $I_{s_w}$, the numbers $K_{s_w}$ of states, the state-transition functions $a_{s_w}$ and the output models $h_{s_w}$ are taken from the words models $\lambda_{s_w}$, and the number L of participants and the linking function θ are computed from the sentence s by the linking process ⊖:s ↦ (L, θ) described herein. The result of Equation 53 constitutes the video-sentence score τ. The track collection that yields that score constitutes J.

The sentence tracker requires specification of the number L of participants and the linking function $\theta_w^i$ that indicates which participant fills argument i of word w for each argument of each word in the sentence. Often, the same participant (i.e., tracker) can fill multiple arguments of multiple words.

A sentence like

The person to the right of the chair picked up the backpack  (54)
$\quad\quad\;\;1\quad\quad\quad\quad 2\quad\quad\quad 3\quad\quad\; 4\quad\quad\quad\; 5$ has 3 participants and requires a linking function like $\theta_1^1=1\;\;\theta_2^1=1\;\;\theta_2^2=2\;\;\theta_3^1=2\;\;\theta_4^1=1\;\;\theta_4^2=3\;\;\theta_5^1=3$  (55)

that assigns the argument of person and the first argument of both to the right of and picked up to the first participant, the argument of chair and the second argument of to the right of to the second participant, and the argument of backpack and the second argument of picked up to the third participant.

The number L of participants for a sentence s, and the corresponding linking function θ, are produced by a linking process ⊖:s ↦ (L, θ). It is mediated by a grammar and portions of the lexicon Λ. The lexicon portion specifies the arity I and permissible roles of individual lexical entries. With this grammar and lexicon portion, the linking process to be described below can determine that the sentence in Equation 54 has 3 participants and can produce the linking function in Equation 55.

An exemplary grammar used for various experiments herein is shown in Table 18, section (a). Identifications of <<Red>> and <<Green>> indicate terminals and nonterminals used for experiments on various corpora. Other terminals and nonterminals were used in experiments on multiple corpora. A first corpus (<<Red>>) uses 19 lexical entries over 7 parts of speech (2 determiners, 2 adjectives, 5 nouns, 2 spatial-relation prepositions, 4 verbs, 2 adverbs, and 2 motion prepositions). The second corpus (<<Green>>) uses 17 lexical entries over 6 parts of speech (1 determiner, 6 nouns, 2 spatial-relation prepositions, 4 verbs, 2 adverbs, and 2 motion prepositions). Note that the grammar allows for infinite recursion in the noun phrase. The portion of the lexicon that specifies arity and permissible roles used in those experiments is shown in Table 18, section (b).

TABLE 18

(a) S → NP VP
NP → D <<Red>> [A] N [PP]
D → <<Red>>an | the
<<Red>>A → <<Red>>blue | <<Red>>red
N → person | backpack | chair |trash can | <<Green>>traffic cone | <<Greem>>stool | <<Red>>object
PP → P NP
P → to the left of | to the right of
VP → V NP [Adv] [PP$_M$]
V → approached | carried | picked up | put down
Adv → quickly | slowly
PP$_M$ → P$_M$ NP
P$_M$ → towards | away from (b) to the left of: {agent, patient, source, goal, referent}, {referent}
to the right of: {agent, patient, source, goal, referent}, {referent}
approached: {agent}, {goal}
carried: {agent}, {patient}
picked up: {agent}, {patient}
put down: {agent}, {patient}
towards: {agent, patient}, {goal}
away from: {agent, patient}, {source}
other: {agent, patient, source, goal, referent}

The linking process ⊖ operates by first constructing a parse tree of the sentence s given the grammar. We do so by means of a recursive-descent parser. The lexical-category heads in this parse tree map to words used by the sentence tracker. Nominally, the lexical categories, e.g., noun (N), adjective (A), verb (V), adverb (Adv), and preposition (P), serve as heads of the corresponding phrasal categories NP, AP, VP, AdvP, and PP. The structure of the parse tree encodes the linking function between different words in the form of government relations Chomsky (1982); Haegeman (1992); Chomsky (2002). This government relation underlying the linking process ⊖ can be defined formally as in Table 19. For example, we determine that in FIG. 18, the N person governs the P to the right of but not the N chair, and that the P to the right of governs the N chair.

TABLE 19

The lexical categories N, A, V, Adv, and P are heads.
Parse-tree nodes α labeled with heads are governors.
A parse-tree node α dominates a parse-tree node β iff β is a subtree of α.
From X-bar theory Jackendoff (1977), a parse-tree node β is
the maximal projection of a parse-tree node α iff
 α is labeled with a lexical category X,
 β is labeled with the corresponding phrasal category XP,
 β dominates α, and
 no other parse-tree node γ exists where
  γ is labeled with XP,
  β dominates γ, and
  γ dominates α.
A parse-tree node α m-commands a parse-tree node β iff α and β do
not dominate each other and the maximal projection of α dominates β.
A parse-tree node α c-commands a parse-tree node β iff α and β
do not dominate each other and α's immediate parent dominates β.
A parse-tree node α governs a parse-tree node β iff
 α is a governor,
 α m-commands β, and
 no other parse-tree node γ exists where
  γ is a governor,
  γ m-commands β,
  γ c-commands β, and
  γ does not c-command α.

Figure 18:
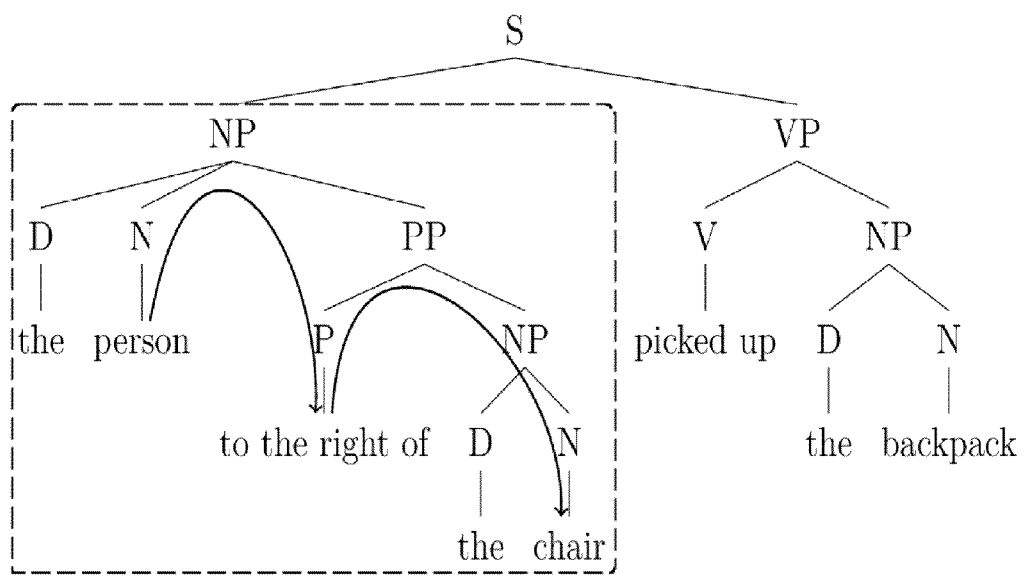
FIG. 18 shows an exemplary parse tree for an example sentence.

FIG. 18 shows an exemplary parse tree for the example sentence The person to the right of the chair picked up the backpack. The portion outlined in dashes indicates the government relations for the P to the right of that are used to determine its arguments. The N person governs the P to the right of, but not the N chair, and the P to the right of governs the N chair.

The government relation, coupled with the lexicon portion, determines the number L of participants and the linking function θ. We construct a word w for each head. The lexicon portion specifies the arity of each lexical entry, namely the fact that person, chair, and backpack are unary and to the right of and picked up are binary. The sole argument for the word associated with each head noun is filled with a distinct participant.[1] The sole argument of the word associated with each unary non-noun head α is filled with the sole argument of the word associated with the head noun that governs α. The first argument of the word associated with each binary non-noun head α is also filled with the sole argument of the word associated with the head noun that governs α. The second argument of the word associated with each binary non-noun head α is filled with the sole argument of the word associated with the head noun that is governed by α. In the example in FIG. 18, the sole arguments of the words associated with the nouns person, chair, and backpack are assigned the distinct participants 1, 2, and 3 respectively. The arguments of the word associated with the preposition to the right of are assigned to participants 1 and 2, since the N person governs the P to the right of which in turn governs the N chair. Similarly, the arguments of the word associated with the verb picked up are assigned to participants 1 and 3, since the N person governs the V picked up which in turn governs the N backpack.

[1] The current manuscript does not concern itself with anaphora, thus we omit discussion of how to support potential coreference. Our implementation, in fact, does support such and mediates such by analysis of the determiners.

We further determine a consistent assignment of roles, one of agent, patient, source, goal, and referent, to participants. The allowed roles for each argument of each word are specified in the lexicon portion. A specification of the arity and permissible roles used for the experiments herein is given in Table 18(b). The specification e: $\{r_1^1, \ldots\}, \ldots, \{r_1^{I_e}, \ldots\}$ means that the arity for lexical entry e is $I_e$ and $r_1^i, \ldots$ constitute the permissible roles for argument i. Each participant is constrained to be assigned a role in the intersection of the sets of permissible roles for each argument of each word where that participant appears. We further constrain the role assignment to assign each role to at most one participant. For the example sentence in Equation 54, the role assignment is computed as follows:

role(1)∈{agent,patient,source,goal,referent}∩{agent, patient}∩{agent} role(2)∈{agent,patient,source,goal, referent}∩{referent} role(3)∈{agent,patient,source,goal, referent}∩{patient} leading to:

role(1)=agent role(2)=referent role(3)=patient (56)

TABLE 20 det(person-2, The-1)
nsubj(picked-9, person-2)
det(right-5, the-4)
prep_to(person-2, right-5)
det(chair-8, the-7)

TABLE 20-continued prep_of(right-5, chair-8)
root(ROOT-0, picked-9)
prt(picked-9, up-10)
det(backpack-12, the-11)
dobj(picked-9, backpack-12)

The above linking process Θ, together with the grammar and the arity and permissible-role specifications in the lexicon, are one way of determining the number L of participants and the linking function θ from the sentence s. It may also be possible to do so with other mechanisms, such as the dependency relations produced by parsing with a dependency grammar. For example, the Stanford Parser Klein and Manning (2003) produces the parse and dependencies in Table 20 for the exemplary sentence diagrammed in Equation 54. This parse can also be used to determine the requisite number of participants and to construct the requisite linking function. The output on the right correctly identifies three participants, person-2, chair-8, and backpack-12. Note how the transitive verb picked-9 distinguishes between its two arguments, identifying person-2 as its first argument through the nsubj dependency and backpack-12 as its second argument through the dobj dependency. Also note how the spatial relation right-5 distinguishes between its two arguments, identifying person-2 as its first argument through the prep_to dependency and chair-8 as its second argument through the prep_of dependency.

Children learn language through exposure to rich perceptual context. They observe events while hearing descriptions of such events. By correlating many events with corresponding descriptions, they learn to map words, phrases, and sentences to meaning representations that refer to the world. They come to know that the noun chair refers to an object class which typically has a back and four legs. They also come to know that the verb approach refers to a dynamic process in which one object moves towards another. These learned concepts are not purely symbolic; they can be used to decide presence or absence of the intended reference in perceptual input. Thus these concepts are perceptually grounded.

When children learn language, they are not usually given information about which words in a sentence correspond to which concepts they see. For example, a child who hears The dog chased a cat while seeing a dog chase a cat, with no prior knowledge about the meaning of any word in this sentence, might entertain at least two possible correspondences or mappings:

(i) dog↦ dog ∧ cat↦ cat or (ii) dog↦ cat ∧ cat↦ dog. With the first, the child might assume that chased means ran after while in the second the child might assume that it means ran before. Thus a child who hears a description in the context of an observed event will need to disambiguate among several possible interpretations of the meanings of the words in that description. Things get worse when this process exhibits referential uncertainty Siskind (1996): multiple simultaneous descriptions in the context of multiple simultaneous events.

Figure 19:
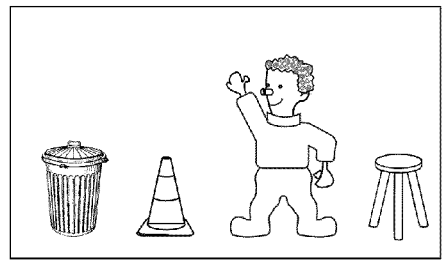
FIG. 19 shows graphical representations of exemplary video frames and corresponding sentences.
Figure 19:
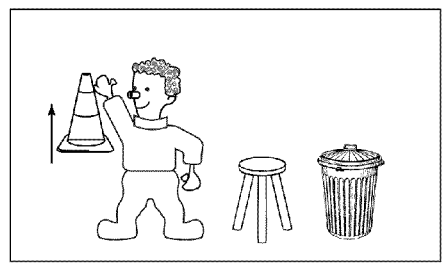
Figure 19:
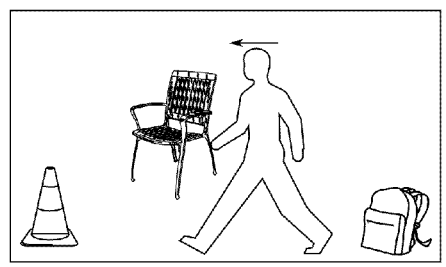
Figure 19:
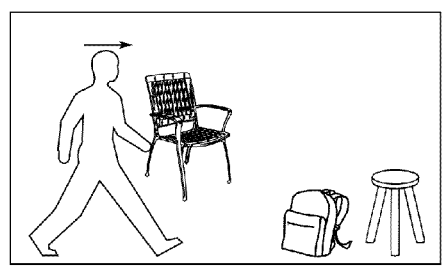

This situation faced by children motivates the formulation shown in FIG. 19, where video clips represent what children see and textual sentences represent what they hear. Note that a given video clip can be paired with more than one sentence and a given sentence can be paired with more than one video clip. Siskind (1996, 2001) showed that even with referential uncertainty and noise, a system based on cross-situational learning Smith et al. (2006, 2011) can robustly acquire a lexicon, mapping words to word-level meanings from sentences paired with sentence-level meanings. However, it did so only for symbolic representations of word- and sentence-level meanings that were not perceptually grounded. An ideal system would not require detailed word-level labelings to acquire word meanings from video but rather could learn language in a largely unsupervised fashion, just as a child does, from video paired with sentences. The algorithm presented in this section can resolve the ambiguity inherent with such referential uncertainty to yield a lexicon with the intended meaning for each word. While this algorithm can solve a problem that is reminiscent to that faced by children, we make no psychological or neurophysiological claims.

FIG. 19 shows exemplary video-sentence pairs in the language-acquisition problem, including exemplary graphical representations of video frames. A video clip can be paired with multiple sentences and a sentence can be paired with multiple video clips.

Figure 20:
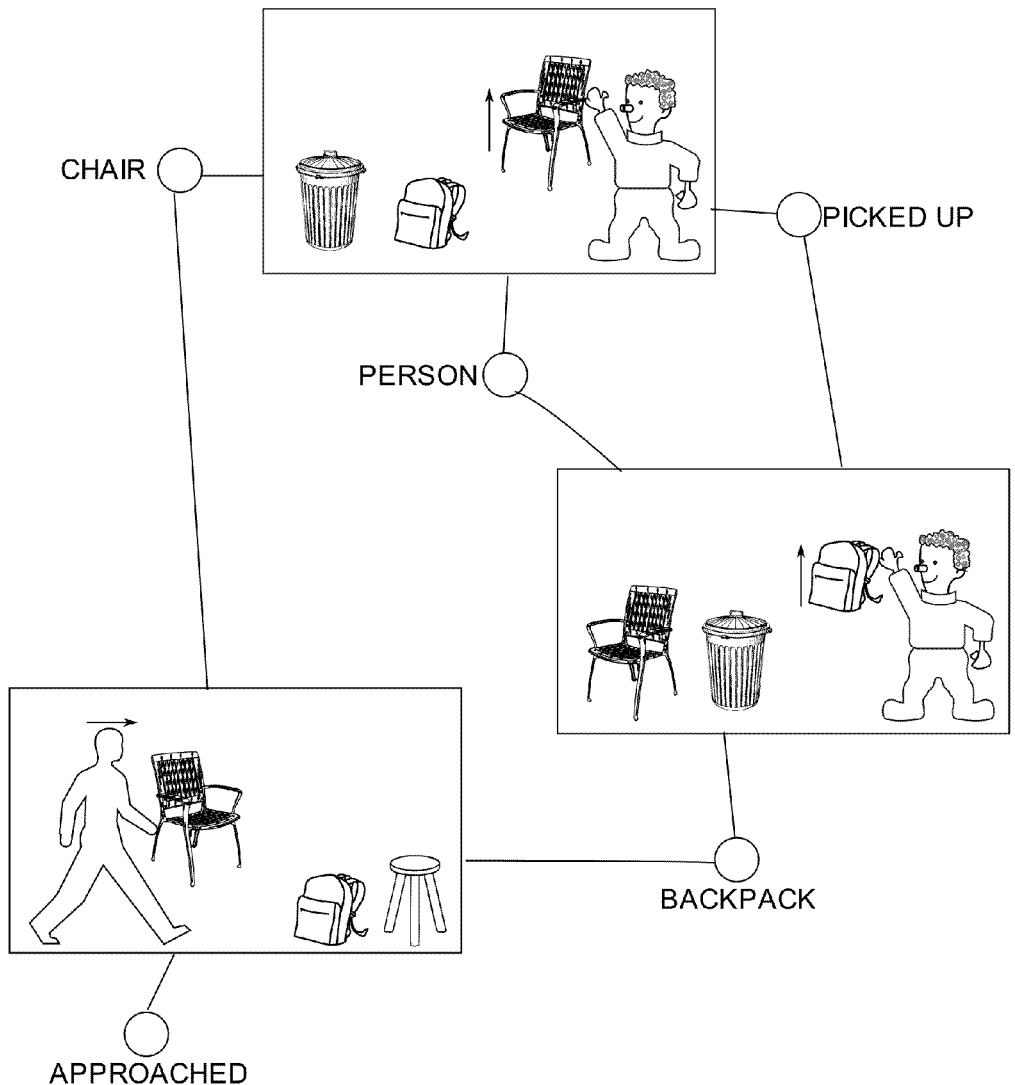
FIG. 20 shows an exemplary network between graphical representations of exemplary video frames.

One can view the language-acquisition task as a constraint-satisfaction problem (CSP), as depicted in FIG. 20. Doing so treats words as variables, each with initially unknown meaning. A video-sentence pair can be viewed as a constraint imposed on the words in that sentence: the words in a sentence are mutually constrained by the requirement that the collection of word meanings allow the sentence to describe the video clip. This constraint will be formulated below using a variant of the sentence tracker. Since the same word may appear in different sentences, a sufficient number of video-sentence pairs will form a connected network. We can do two types of inference on this network. First, one can perform inference across different words in the same sentence. Suppose we know the meanings of all the words in the sentence except for one. In this case, the meaning of the unknown word can be inferred by applying the video-sentence constraint. For example, in FIG. 20, if we know the meaning of backpack and person, the meaning of picked up could be inferred from constraint (a), because that will be the only process that occurred between the person and the backpack. Second, one can perform inference across the same word in different sentences. The meaning of a given word can be shared and exploited by multiple sentences when inferring the meanings of other words in those sentences. For example, after learning the meaning of picked up, from constraint (b), the meaning of chair can also be inferred. Thus, information about word meanings can propagate through the network. As a result, word meanings are mutually constrained as they are learned. Siskind (1996) refers to this learning mechanism as cross-situational learning. In practice, this process starts with no information about any word meanings. But our formulation below using E M Dempster et al. (1977) can propagate partial information about word meanings. Thus by starting with an initial guess at the meaning for each word and iterating this process, we can converge to the intended lexicon.

FIG. 20 shows an exemplary network between graphical representations of exemplary video frames, viewing language acquisition as a constraint-satisfaction problem (CSP) which is solved by propagating information about word meanings around a network. Word meanings of "person" and "backpack" are used to learn word meanings of "picked up" which are then used to learn further word meanings of "chair". This performs inference both across different words in the same sentence, and shown in the bottom right, and the same word in different sentences, as shown in the top center.

As discussed earlier, the sentence tracker supports representing word meanings as HMMs or as FSMS, a special case of HMMs where the state-transition functions and output models are 0/1 (−∞/0 in log space). Output models can be formulated for manually-constructed FSMs as regular expressions over Boolean features computed from the detections using the predicates shown in Table 14. Our procedure for learning word meanings employs HMMs where the state-transition functions and output models are not 0/1. In this case, the output models are derived from the features shown in Table 2. We use $\Phi$ to denote the computation that produces the feature vectors from detections and N to denote the length of such feature vectors. Word models $\lambda$ are extended to incorporate N and $\Phi$.

We employ discrete distributions for our output models h. Further, we assume such distributions are factorial in the features, i.e., the distributions over the features in the feature vector are independent. To this end, we quantize each feature into bins. This means that the output models take the form $$h_e(k, b_1, \ldots, b_{l_e}) = \sum_{n=1}^{N} h_e^n(k, \Phi_e^n(b_1, \ldots, b_{l_e})) \qquad (57)$$

where $$\Phi_e^n(b_1, \ldots, b_{l_e}) \in \{\Phi_{e,1}^n, \ldots, \Phi_{e,Z_e^n}^n\} \qquad (58)$$

$Z_e^n$ indicates the number of bins for feature n for lexical entry e and $\Phi_{e,z}^n$ indicates the quantized value for bin z of feature n for lexical entry e.

Our learning procedure makes five assumptions.

First, our training set contains M samples, each pairing a short video clip $B_m$ with a sentence $s_m$ that describes that clip. The procedure is not able to determine the alignment between multiple sentences and longer video segments. Note that there is no requirement that the clip depict only that sentence. Other objects may be present and other events may occur. In fact, nothing precludes a training set with multiple copies of the same clip, each paired with a different sentence describing a different aspect of that clip. Similarly, nothing precludes a training set with multiple copies of the same sentence, each paired with a different clip that depicts that sentence. Moreover, our procedure potentially can handle a small amount of noise, where a clip is paired with an incorrect sentence that does not describe the clip.

Second, we already have (pre-trained) low-level object detectors capable of detecting instances of our target event participants in individual frames of the video. We allow such detections to be unreliable; our method can handle a moderate amount of false positives and false negatives. We do not need to know the mapping from these object-detection classes to nouns; our procedure determines that. In other words, while our detectors locate and classify objects with symbolic labels like chair, these labels are distinct from lexical entries like chair. Our procedure learns the mapping from lexical entries to object-class labels. This mapping need not be one-to-one and can be noisy.

Third, we know the part of speech $c_e$ associated with each lexical entry e. The particular mapping from lexical entry to part of speech used in various experiments is given in Table 18(a).

Fourth, the word models $\lambda$ for all lexical entries of the same part of speech have the same arity I, the same number K of states, the same feature-vector length N, and the same computation $\Phi$ that produces the feature vectors, together with the associated binning process for quantizing the features. These values are known and not learned. The particular values for these parameters used in various experiments are given in Table 2.

Fifth, we know the linking process ⊖ and the grammar and lexicon portion needed to determine the number L of participants and the linking function θ for each training sentence. The particular linking process used in various experiments is described herein using the grammar and lexicon portion from Table 18. We do not know the track collection J chosen for each training sample. This is determined automatically by methods herein. The grammar, portions of the lexicon Λ, namely the components I, K, N, and Φ, and the linking process θ are prespecified and not learned. Only the state-transition functions a and the output models h″ are learned. One can imagine learning some or all of the grammar, some or all of the nonlearned portions of the lexicon, and perhaps even the linking process ⊖, such as done by Kwiatkowski et al. (2012). We leave such for future work.

We are given a grammar, portions of a lexicon Λ, namely the components I, K, N, and Φ, and a linking process ⊖. The lexicon contains E word models $\lambda_e$ for lexical entries e. We are given a training set of M samples, each a video clip $B_m$ paired with a sentence $s_m$. Let B denote $B_1, \ldots, B_M$ and S denote $s_1, \ldots, s_M$. We use the grammar, the nonlearned portions of the lexicon Λ, and the linking process ⊖ to determine the number L of participants and the linking function θ for each training sentence. If we had the state-transition functions $a_e$ and the output models $h_e''$ for the word models $\lambda_e$ in the lexicon Λ, we could instantiate the sentence tracker from Equation 53 on each training sample to compute a video-sentence score τ for that sample. A side effect of doing this would be to compute the track collection J that yielded that video-sentence score. Moreover, we could compute an aggregate score for the entire training set by summing such per-sample scores. However, we don't know the state-transition functions $a_e$ and the output models $h_e''$. These constitute the unknown meanings of the words in our training set which we wish to learn. We jointly learn $a_e$ and $h_e''$ for all lexical entries e by searching for those that maximize the aggregate score.

We perform that search by Baum-Welch. While Equation 53 constitutes a score that potentially could be maximized, it is easier to adapt a scoring function that is more like a likelihood calculation, than Equation 53, which is more like a MAP estimate, to the EM framework. Thus we convert Equation 53 from log space to linear space and replace the max with a Σ to redefine our scoring function as follows:

$$\sum_{J,K}\left[\prod_{l=1}^{L}\left(\prod_{t=1}^{T}f(b_{j_l}^t)\right)\left(\prod_{t=2}^{T}g(b_{j_l}^{t-1},b_{j_l}^t)\right)\right] \quad (59)$$

$$\left[\prod_{w=1}^{W}\left(\prod_{t=1}^{T}h_{s_w}(k_w^t,B\langle s,t,w,J\rangle)\right)\left(\prod_{t=2}^{T}a_{s_w}(k_w^{t-1},k_w^t)\right)\right]$$

where f, g, h, and a are in linear space. Recall that Equation 49 jointly maximizes the sum of a measure of how well a video clip B depicts a track j and a measure of how well the detection sequence $B_j$ selected from a video clip B by the track j depicts an event model λ. Similarly, Equation 53 jointly maximizes the sum of a measure of how well a video clip B depicts a track collection J and a measure of how well the detection-sequence collection $B_J$ selected from a video clip B by the track collection J depicts a given sentence s, as interpreted by a given lexicon Λ. One can maximize just the first component of this latter sum.

$$\max_J\left[\sum_{l=1}^{L}\left(\sum_{t=1}^{T}f(b_{j_l}^t)\right)+\left(\sum_{t=2}^{T}g(b_{j_l}^{t-1},b_{j_l}^t)\right)\right] \quad (60)$$

This is a variant of Equation 38 for a track collection. One can similarly convert Equation 60 from log space to linear space and replace the max with a Σ to yield:

$$\sum_J\left[\prod_{l=1}^{L}\left(\prod_{t=1}^{T}f(b_{j_l}^t)\right)\left(\prod_{t=2}^{T}g(b_{j_l}^{t-1},b_{j_l}^t)\right)\right] \quad (61)$$

The summand in Equation 61 does not have a probabilistic interpretation. However, if one were to divide the summand by the whole equation, one would obtain the probability of a particular track collection J relative to a distribution over all possible track collections where the probability of a given track collection was proportional to the summand. This probability of a given track collection J is denoted P(J|B).

For a given track collection J, one can similarly maximize just the measure of how well the detection-sequence collection $B_J$ selected from a video clip B by the track collection J depicts a sentence s, as interpreted by a given lexicon Λ.

$$\max_K\left[\sum_{w=1}^{W}\left(\sum_{t=1}^{T}h_{s_w}(k_w^t,B\langle s,t,w,J\rangle)\right)+\left(\sum_{t=2}^{T}a_{s_w}(k_w^{t-1},k_w^t)\right)\right] \quad (62)$$

This is a variant of Equation 40 for a factorial HMM for multiple words.

One can similarly convert Equation 62 from log space to linear space and replace the max with a Σ to yield:

$$\sum_K\left[\prod_{w=1}^{W}\left(\prod_{t=1}^{T}h_{s_w}(k_w^t,B\langle s,t,w,J\rangle)\right)\left(\prod_{t=2}^{T}a_{s_w}(k_w^{t-1},k_w^t)\right)\right] \quad (63)$$

However, in this case, the summand in Equation 63 does have a probabilistic interpretation.

The summand is the joint probability of a state sequence K and $B_J$ depicting a sentence s, as interpreted by a given lexicon Λ:

$$P(K,B_J|s,\Lambda)=P(B_J|K,s,\Lambda)P(K|s,\Lambda).$$

Moreover, Equation 63 as a whole also has a probabilistic interpretation. It is the (marginal) probability of $B_J$ depicting a sentence s, as interpreted by a given lexicon Λ: $P(B_J|s,\Lambda)$. If we divide Equation 59 by Equation 61 we obtain:

$$L(B;s,\Lambda)=\sum_J P(J|B)P(B_J|s,\Lambda) \quad (64)$$

This can be interpreted as the expected probability of $B_J$ depicting a sentence s, as interpreted by a given lexicon Λ, over the track collection distribution underlying P(J|B).

Equations 59 and 61 can both be computed efficiently by the forward algorithm Baum and Petrie (1966). L(B; s, Λ) is taken as a sample score and $$\mathcal{L}(\mathcal{B}, S, \Lambda) = \prod_{m=1}^{M} L(B_m, s_m, \Lambda) \quad (65)$$

is taken as the training-set score. We seek the a and h in $\Lambda$ that maximize $L(B; S, \Lambda)$. Note that both the sample and training-set scores are in [0, 1].

We can find a local maximum to this objective function using the same techniques as used by Baum-Welch. The reestimation formulas can be derived with auxiliary functions that are analogous to those used for HMMs Bilmes (1997). Define $J=J_1, \ldots, J_M$ and $K=K_1, \ldots, K_M$ to be track collections and state-sequence collections for the entire training set. Define $L(B, J, K; S, \Lambda)$ as the product of the summand of Equation 59 over the training set divided by the product of Equation 61 over the training set. Thus we have:

$$\mathcal{L}(\mathcal{B}, S, \Lambda) = \sum_{\mathcal{J}, \mathcal{K}} \mathcal{L}(\mathcal{B}, \mathcal{J}, \mathcal{K}, S, \Lambda) \quad (66)$$

We adopt the following auxiliary function:

$$F(\Lambda, \Lambda') = \sum_{\mathcal{J}, \mathcal{K}} \mathcal{L}(\mathcal{B}, \mathcal{J}, \mathcal{K}; S, \Lambda') \log \mathcal{L}(\mathcal{B}, \mathcal{J}, \mathcal{K}; S, \Lambda) \quad (67)$$

where $\Lambda'$ is the current lexicon and $\Lambda$ is a potential new lexicon.

One can show that $F(\Lambda, \Lambda') \geq F(\Lambda', \Lambda')$ implies $L(B; S, \Lambda) \geq L(B; S, \Lambda')$.

$$F(\Lambda, \Lambda') - F(\Lambda', \Lambda') = \quad (68)$$

$$\mathcal{L}(\mathcal{B}, S, \Lambda') \sum_{\mathcal{J}, \mathcal{K}} \left[ \frac{\mathcal{L}(\mathcal{B}, \mathcal{J}, \mathcal{K}; S, \Lambda')}{\mathcal{L}(\mathcal{B}; S, \Lambda')} \log \frac{\mathcal{L}(\mathcal{B}, \mathcal{J}, \mathcal{K}; S, \Lambda)}{\mathcal{L}(\mathcal{B}, \mathcal{J}, \mathcal{K}; S, \Lambda')} \right] \propto$$

$$\sum_{\mathcal{J}, \mathcal{K}} \left[ P(\mathcal{J}, \mathcal{K} \mid \mathcal{B}, S, \Lambda') \log \frac{\mathcal{L}(\mathcal{B}, \mathcal{J}, \mathcal{K}; S, \Lambda)}{\mathcal{L}(\mathcal{B}, \mathcal{J}, \mathcal{K}; S, \Lambda')} \right] \leq$$

$$\log \sum_{\mathcal{J}, \mathcal{K}} \left[ P(\mathcal{J}, \mathcal{K} \mid \mathcal{B}, S, \Lambda') \frac{\mathcal{L}(\mathcal{B}, \mathcal{J}, \mathcal{K}; S, \Lambda)}{\mathcal{L}(\mathcal{B}, \mathcal{J}, \mathcal{K}; S, \Lambda')} \right] =$$

$$\log \sum_{\mathcal{J}, \mathcal{K}} \frac{\mathcal{L}(\mathcal{B}, \mathcal{J}, \mathcal{K}; S, \Lambda)}{\mathcal{L}(\mathcal{B}; S, \Lambda')} = \log \frac{\mathcal{L}(\mathcal{B}; S, \Lambda)}{\mathcal{L}(\mathcal{B}; S, \Lambda')}$$

The second step above holds because the training-set score $L(B; S, \Lambda')$ is nonnegative. The third step holds due to Jensen (1906) inequality.

Thus given the current lexicon $\Lambda'$, if we find a new lexicon $\Lambda$ such that $F(\Lambda, \Lambda') \geq F(\Lambda', \Lambda')$, one can iterate this process, increasing the training-set score to a local maximum. This can be done by maximizing $F(\Lambda, \Lambda')$ with respect to $\Lambda$.

Since $L(\Lambda, J, K; S, \Lambda)$ is proportional to the product of the summands of Equation 59 over the training set, which is the product of two terms, only the latter of which depends on $\Lambda$, the following holds:

$$F(\Lambda, \Lambda') \propto \sum_{\mathcal{J}, \mathcal{K}} \frac{\mathcal{L}(\mathcal{B}, \mathcal{J}, \mathcal{K}; S, \Lambda')}{\mathcal{L}(\mathcal{B}; S, \Lambda')} \log \mathcal{L}(\mathcal{B}, \mathcal{J}, \mathcal{K}; S, \Lambda) \propto \quad (69)$$

-continued $$\sum_{\mathcal{J}, \mathcal{K}} \frac{\mathcal{L}(\mathcal{B}, \mathcal{J}, \mathcal{K}; S, \Lambda')}{\mathcal{L}(\mathcal{B}, S, \Lambda')}$$

$$\sum_{m=1}^{M} \sum_{w=1}^{W_m} \left( \sum_{t=1}^{T_m} \frac{\log h_{s_{m,w}}(k^t_{m,w}, B_m \langle s_m, t, w, J_m \rangle)}{h} \right) +$$

$$\left( \sum_{t=2}^{T_m} \frac{\log a_{s_{m,w}}(k^{t-1}_{m,w}, k^t_{m,w})}{a} \right)$$

where $T_m$ is the number of frames in the video clip $B_m$ for training sample m, $W_m$ is the number of words in the sentence $s_m$ for training sample m, $s_{m,w}$ is the lexical entry for word w in the sentence $s_m$ for training sample m, and $k_{m,w}{}^t$ is the state $k_w{}^t$ in the state-sequence collection $K_m$ for training sample m.

In the above, $B_m \langle s_m, t, w, J_m \rangle$ is extended to denote $$b^t_{j^1_{\theta^1_{m,w}}}, \ldots, b^t_{j^{I_{s_{m,w}}}_{\theta^{I_{s_{m,w}}}_{m,w}}},$$

the collection of detections selected in frame t of the video clip $B_m$ by the track collection $J_m$ as assigned to the $I_{s_{m,w}}$ arguments of the word model for word w in sentence $s_m$ by the linking function $\theta_{m,w}{}^i$ produced on $s_m$ that determines the participant for argument i of word w for sentence $s_m$.

Thus $F(\Lambda, \Lambda')$ comprises two terms, one of which, H, is a weighted sum of terms h and the other of which, A, is a weighted sum of terms a. One can maximize $F(\Lambda, \Lambda')$ by maximizing H and A independently. These lead to reestimation procedures for the output models h and state-transition functions a.

First consider A. Rewrite the term to explicitly sum over lexical entries e and pairs of states k' and k.

$$A = \sum \frac{\mathcal{L}(\mathcal{B}, k^{t-1}_{m,w} = k', k^t_{m,w} = k; S, \Lambda')}{\mathcal{L}(\mathcal{B}, S, \Lambda')} \log a_e(k', k) \quad (70)$$

$$= \sum \frac{L(B_m, k^{t-1}_{m,w} = k', k^t_{m,w} = k; s_m, \Lambda') \mathcal{L}(\mathcal{B}_{m' \neq m}; S_{m' \neq m}, \Lambda')}{L(B_m; s_m, \Lambda') \mathcal{L}(\mathcal{B}_{m' \neq m}; S_{m' \neq m}, \Lambda')}$$

$$\log a_e(k', k)$$

$$= \sum \frac{L(B_m, k^{t-1}_{m,w} = k', k^t_{m,w} = k; s_m, \Lambda')}{L(B_m; s_m, \Lambda')} \log a_e(k', k)$$

$$\mathcal{L}(\mathcal{B}, k^{t-1}_{m,w} = k', k^t_{m,w} = k; S, \Lambda') = \sum_{e=1}^{E} \sum_{\substack{k'=1, \\ k^{t-1}_{m,w}=k'}}^{K_e} \sum_{\substack{k=1, \\ k^t_{m,w}=k}}^{K_e} \sum_{m=1}^{M} \sum_{w=1}^{W_m} \sum_{t=2}^{T_m} \mathcal{L}(\mathcal{B}, \mathcal{J}, \mathcal{K}; S, \Lambda') \quad (71)$$

where $$L(B_m, k^{t-1}_{m,w} = k', k^t_{m,w} = k; s_m, \Lambda') =$$

$$\sum_{J_m} \sum_{\substack{K_m \\ k^{t-1}_{m,w}=k' \\ k^t_{m,w}=k}} L(B_m, J_m, K_m; s_m, \Lambda')$$

$$\mathcal{L}(\mathcal{B}_{m' \neq m}; S_{m' \neq m}, \Lambda') = \prod_{\substack{m'=1 \\ m' \neq m}}^{M} L(B_{m'}; s_{m'}, \Lambda)$$

The second step in Equation 70 holds because of the assumption that the training samples are i.i.d. Taking the derivative of A with respect to each $a_e(k', k)$, we get the reestimation formula for the state-transition function:

$$a_e(k', k) := \kappa_e(k') \sum_{m=1}^{M} \sum_{w=1}^{W_m} \sum_{t=2}^{T_m} \underbrace{\frac{L(B_m, k_{m,w}^{t-1} = k', k_{m,w}^t = k; s_m, \Lambda')}{L(B_m; s_m, \Lambda')}}_{\xi(m,w,k',k,t)} \quad (72)$$

$s_{m,w}=e$

The coefficient $k_e(k')$ is chosen to normalize the distribution so that it sums to one.

The reestimation formula for the output model can be derived similarly from H. We make use of the fact that the output model is a factorial model where the factors are discrete distributions. In linear space:

$$h_e(k, b_1, \ldots, b_{l_e}) = \prod_{n=1}^{N_e} h_e^n(k, \Phi_e^n(b_1, \ldots, b_{l_e})) \quad (73)$$

Again, rewrite H to explicitly sum over lexical entries e, states k, features n, and bins z.

$$H = \sum \frac{\mathcal{L}(\mathcal{B}, k_{m,w}^t = k, \Phi_e^n(B_m \langle s_m, t, w, J_m \rangle) = \phi_{e,z}^n; S, \Lambda')}{\mathcal{L}(\mathcal{B}, S, \Lambda')} \quad (74)$$
$\log h_e^n(k, \phi_{e,z}^n)$ $$= \sum \frac{L(B_m, k_{m,w}^t = k, \Phi_e^n(B_m \langle s_m, t, w, J_m \rangle) = \phi_{e,z}^n; s_m, \Lambda')}{L(B_m; s_m, \Lambda') \mathcal{L}(\mathcal{B}_{m' \neq m}; S_{m' \neq m}, \Lambda')} \cdot$$
$\mathcal{L}(\mathcal{B}_{m' \neq m}, S_{m' \neq m}, \Lambda') \log h_e^n(k, \phi_{e,z}^n)$ $$= \sum \frac{L(B_m, k_{m,w}^t = k, \Phi_e^n(B_m \langle s_m, t, w, J_m \rangle) = \phi_{e,z}^n; s_m, \Lambda')}{L(B_m; s_m, \Lambda')}$$
$\log h_e^n(k, \phi_{e,z}^n)$ where $\sum$ denotes $\sum_{e=1}^{E} \sum_{k=1}^{K_e} \sum_{n=1}^{N_e} \sum_{z=1}^{Z_e^n} \sum_{m=1}^{M} \sum_{w=1}^{W_m} \sum_{t=1}^{T_m}$ and
$s_{m,w}=e$ where $$\mathcal{L}(\mathcal{B}, k_{m,w}^t = k, \Phi_e^n(B_m \langle s_m, t, w, J_m \rangle) = \phi_{e,z}^n; S, \Lambda') = \quad (75)$$
$$\sum_{\mathcal{J}} \sum_{\mathcal{K}} L(\mathcal{B}, \mathcal{J}, \mathcal{K}; S, \Lambda')$$
$\Phi_e^n(B_m \langle s_m, t, w, J_m \rangle) = \phi_{e,z}^n \quad k_{m,w}^t = k$ $$L(B_m, k_{m,w}^t = k, \Phi_e^n(B_m \langle s_m, t, w, J_m \rangle) = \phi_{e,z}^n; s_m, \Lambda') =$$
$$\sum_{J_m} \sum_{K_m} L(B_m, J_m, K_m; s_m, \Lambda')$$
$\Phi_e^n(B_m \langle s_m,t,w,J_m \rangle)=\phi_{e,z}^n \quad k_{m,w}^t=k$ Taking the derivative of H with respect to each $h_e^n(k, \Phi_{e,z}^n)$, we get the reestimation formula for the output model:

$$h_e^n(k, \phi) := \quad (76)$$
$$\psi_e^n(k) \sum_{m=1}^{M} \sum_{w=1}^{W_m} \sum_{t=1}^{T_m} \underbrace{\frac{L(B_m, k_{m,w}^t = k, \Phi_e^n(B_m \langle s_m, t, w, J_m \rangle) = \phi; s_m, \Lambda')}{L(B_m; s_m, \Lambda')}}_{\delta(m,w,n,k,\phi,t)}$$
$s_{m,w}=e$ The coefficient $\psi_e^n(k)$ is chosen to normalize the distribution so that it sums to one.

The reestimation formulas involve occurrence counting. Since we use factorial HMMs that involve a cross-product lattice and use a scoring function derived from Equation 59 that incorporates both tracking (Equation 38) and word models (Equation 40), we need to count occurrences in the whole cross-product lattice. As an example of such cross-product occurrence counting, when counting the transitions from state k' to k for word w from frame t−1 to t in sample m, i.e., $\xi(m, w, k', k, t)$, we need to count all the possible paths through the adjacent factorial states, i.e., from $j_{m,1}^{t-1}, \ldots, j_{m,L}^{t-1}, k_{m,1}^{t-1}, \ldots, k_{m,W}^{t-1}$ to $j_{m,1}^t, \ldots, j_{m,L}^t, k_{m,1}^t, \ldots k_{m,W}^t$ such that $k_{m,w}^{t-1}=k'$ and $k_{m,w}^t=k$. Similarly, when counting the frequency of being at state k while observing the value $\phi$ as the feature n in frame t of sample m for the word w, i.e., $\delta(m, w, n, k, \phi, t)$, we need to count all the possible paths through the factorial state $j_{m,1}^t, \ldots, j_{m,L}^t, k_{m,1}^t, \ldots, k_{m,W}^t$ such that $k_{m,w}^t=k$ and $\Phi_e^n(B_m \langle s_m, t, w, J_m \rangle)=\phi$.

The reestimation of one word model can depend on the previous estimate for other word models. This dependence happens because the linking function can assign the same participant to arguments of different words in a sentence and the same lexical entry can appear in different training sentences. It is precisely this dependence that leads to cross-situational learning: the former performs inference across different words in the same sentence and the latter performs inference across the same word in different sentences.

Various aspects described herein provide a method for searching a video database for queries in a form of sentences. The method includes receiving a query to be searched; parsing the query into at least one searchable sequence; searching a video database for the searchable sequence; identifying presence of at least one video clip containing the searchable sequence; and outputting the at least one video clip if the at least one video clip has been identified. The query can include nouns and verbs. The searching can be configured to distinguish clips based on (i) an object described as a noun based on a subject; or (ii) a direct object of a verb. The query can include a combination of adjectives, adverbs, and prepositions. The searching can be configured to distinguish between at least one activity that overlaps in a combination of space and time in the video database, and further to differentiate a combination of shared and disjoint participants and objects based on a sentence, e.g., a complex sentence, associated with the at least one activity. The method can include detecting tracking based on a hidden Markov models to yield a single cost function that integrates tracking with event recognition. Multiple detection-based trackers can be combined with multiple hidden Markov models to represent a semantics of the query. There can be a distinct hidden Markov model for each content word or phrase in the query, and a distinct tracker for each person or object playing a role in the event described by the query. The unified cost function can be mathematically optimized by an extended Viterbi algorithm that simultaneously mathematically optimizes a linear combination of all of the trackers and hidden Markov models. The parameters of the hidden Markov models can be jointly trained from a corpus of video clips paired with multi-word sentential annotation. The training can employ a maximum-likelihood criterion. The training can be performed using an extension of a Baum-Welch method to support joint training of multi-word video annotations in an unsupervised fashion without specific annotation as to which word in the annotation corresponds to which concept in the annotated video. Discriminative training can be employed on a combination of positive and negative annotations associated with each video clip by utilizing an extension of the Extended Baum-Welch method to support joint training of multi-word video annotations in an unsupervised fashion without specific annotation as to which word in the annotation corresponds to which concept in the annotated video. The discriminative training can be employed on a combination of positive and negative annotations associated with each video clip by utilizing a Growth Transformation and gradient-descent methods to support joint training of multi-word video annotations in an unsupervised fashion without specific annotation as to which word in the annotation corresponds to which concept in the annotated video. The query can include multiple sentences. The sentences can refer to the same participants (e.g., people and objects). A combination of temporal and causal relations can be specified between the constituent sentences. The response to the query can include one or more sentence(s) that describes the content of the retrieved video.

FIG. 21 is a high-level diagram showing the components of an exemplary data-processing system for analyzing data and performing other analyses described herein, and related components. The system includes a processor 2186, a peripheral system 2120, a user interface system 2130, and a data storage system 2140. The peripheral system 2120, the user interface system 2130 and the data storage system 2140 are communicatively connected to the processor 2186. Processor 2186 can be communicatively connected to network 2150 (shown in phantom), e.g., the Internet or an X.25 network, as discussed below. Processor 286, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 2186 can implement processes of various aspects described herein, e.g., processes shown in FIGS. 22, 23, and 24, processes described in the computer program listing appendix, video search, focus-of-attention, sentence generation, learning, or combinations thereof. Processor 2186 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 2186 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 2120, user interface system 2130, and data storage system 2140 are shown separately from the data processing system 2186 but can be stored completely or partially within the data processing system 2186.

The peripheral system 2120 can include one or more devices configured to provide digital content records to the processor 2186. For example, the peripheral system 2120 can include digital still cameras, digital video cameras, cellular phones, or other data processors. The processor 2186, upon receipt of digital content records from a device in the peripheral system 2120, can store such digital content records in the data storage system 2140.

The user interface system 2130 can include a mouse, a keyboard, another computer (connected, e.g., via a network or a null-modem cable), or any device or combination of devices from which data is input to the processor 2186. The user interface system 2130 also can include a display device, a processor-accessible memory, or any device or combination of devices to which data is output by the processor 2186. The user interface system 2130 and the data storage system 2140 can share a processor-accessible memory.

In various aspects, processor 2186 includes or is connected to communication interface 2115 that is coupled via network link 2116 (shown in phantom) to network 2150. For example, communication interface 2115 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 2115 sends and receives electrical, electromagnetic or optical signals that carry digital or analog data streams representing various types of information across network link 2116 to network 2150. Network link 2116 can be connected to network 2150 via a switch, gateway, hub, router, or other networking device.

Processor 2186 can send messages and receive data, including program code, through network 2150, network link 2116 and communication interface 2115. For example, a server can store requested code for an application program (e.g., a JAVA applet) on a tangible non-volatile computer-readable storage medium to which it is connected. The server can retrieve the code from the medium and transmit it through network 2150 to communication interface 2115. The received code can be executed by processor 2186 as it is received, or stored in data storage system 2140 for later execution.

Data storage system 2140 can include or be communicatively connected with one or more processor-accessible memories configured to store information. The memories can be, e.g., within a chassis or as parts of a distributed system. The phrase "processor-accessible memory" is intended to include any data storage device to or from which processor 2186 can transfer data (using appropriate components of peripheral system 2120), whether volatile or nonvolatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 2140 can be a tangible non-transitory computer-readable storage medium, i.e., a non-transitory device or article of manufacture that participates in storing instructions that can be provided to processor 2186 for execution.

In an example, data storage system 2140 includes code memory 2141, e.g., a RAM, and disk 2143, e.g., a tangible computer-readable rotational storage device such as a hard drive. Computer program instructions are read into code memory 2141 from disk 2143. Processor 2186 then executes one or more sequences of the computer program instructions loaded into code memory 2141, as a result performing process steps described herein. In this way, processor 2186 carries out a computer implemented process. For example, steps of methods described herein, blocks of the flowchart illustrations or block diagrams herein, and combinations of those, can be implemented by computer program instructions. Code memory 2141 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 2186 (and possibly also other processors), to cause functions, acts, or operational steps of various aspects herein to be performed by the processor 2186 (or other processor). Computer program code for carrying out operations for various aspects described herein may be written in any combination of one or more programming language(s), and can be loaded from disk 2143 into code memory 2141 for execution. The program code may execute, e.g., entirely on processor 2186, partly on processor 2186 and partly on a remote computer connected to network 2150, or entirely on the remote computer.

In view of the foregoing, various aspects provide methods of searching videos, highlighting videos, learning lexicons, or generating sentences. A technical effect of various aspects is to provide a visual indication, e.g., in user interface system 2130, of the results of the search, of the highlights in the videos, of the results of applying a learned lexicon to search or highlighting tasks, or of generated sentences corresponding to a video.

The invention is inclusive of combinations of the aspects described herein. References to "a particular aspect" (or "embodiment" or "version") and the like refer to features that are present in at least one aspect of the invention. Separate references to "an aspect" or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A method of testing a video against an aggregate query, the video including image data of each of a plurality of frames, the method comprising automatically performing the following steps using a processor:
    receiving an aggregate query defining one or more participant(s) and one or more condition(s) with respect to the participant(s);
    detecting one or more candidate object(s) in each of the plurality of frames of the video;
    constructing a respective first lattice corresponding to each of the defined participant(s), each first lattice including a plurality of nodes, wherein each node in each first lattice includes a respective first factor corresponding to one of the candidate objects detected in one of the frames of the video;
    constructing a respective second lattice corresponding to each of the identified condition(s), each second lattice including a plurality of nodes having respective second factors;
    constructing an aggregate lattice using the respective first lattice(s) and the respective second lattice(s), the aggregate lattice including a plurality of nodes, wherein each of the nodes of the aggregate lattice includes a scoring factor computed using the first factor in a corresponding one of the nodes in a corresponding one of the first lattice(s) and the second factor in a corresponding one of the nodes in a corresponding one of the second lattice(s);
    determining whether the video corresponds to the aggregate query by determining respective aggregate score(s) of one or more path(s) through the aggregate lattice, each path including a respective plurality of the nodes in the aggregate lattice.

2. The method according to claim 1, the receiving step including parsing a textual query to determine the one or more participant(s) identified in the textual query and the one or more condition(s) identified in the textual query with respect to the defined participant(s).

3. The method according to claim 2, wherein the textual query includes at least two words having respective, different parts of speech selected from the group consisting of noun, verb, adjective, adverb, and preposition.

4. The method according to claim 1, further including locating a path through the aggregate lattice having a preferred respective aggregate score.

5. The method according to claim 1, wherein the condition(s) include at least one asymmetric condition relating to two of the participant(s).

6. The method according to claim 1, wherein at least one of the condition(s) includes two arguments and the parsing step includes identifying a respective one of the participant(s) for each of the arguments.

7. The method according to claim 1, further including repeating the detecting, constructing-first-lattice(s), constructing-second-lattice(s), constructing-aggregate-lattice, and determining steps with respect to each of a plurality of videos, wherein the determining step includes selecting one of the aggregate score(s) for each video as a respective score for that video.

8. The method according to claim 7, further including selecting one or more video(s) in the plurality of videos using the respective scores and presenting a visual indication of the selected video(s) via a user interface.

9. The method according to claim 1, further including, if the video does correspond to the aggregate lattice, providing tracking data of which of the detected candidate object(s) were determined to correspond to path(s) through the lattice having selected aggregate score(s).

10. The method according to claim 9, further including modifying the image data of the video to include respective visual indicator(s) for at least one of the detected candidate object(s) in the tracking data, wherein each visual indicator is applied to a plurality of the frames of the video.

11. The method according to claim 1, wherein:
    the step of constructing the respective second lattice(s) includes determining a parameter of each respective second lattice using a lexicon having one or more lexicon parameter(s);
    the determining step includes determining a discrimination score for the video using at least one of the aggregate score(s); and
    the method further includes adjusting one or more of the lexicon parameter(s) using the determined discrimination score and repeating the constructing-second-lattice, constructing-aggregate-lattice, and determining steps using the lexicon having the adjusted parameter(s).

12. The method according to claim 11, wherein the adjusting step includes adjusting the one or more of the parameter(s) substantially using a Baum-Welch algorithm.

13. The method according to claim 11, further including repeating the detecting, constructing-first-lattice(s), constructing-second-lattice(s), constructing-aggregate-lattice, and determining steps for each of a plurality of videos and respective textual queries, wherein the adjusting-parameters step includes forming a composite score from the discrimination scores determined for each of the videos and adjusting the one or more of the lexicon parameter(s) based on the composite score.

14. The method according to claim 13, further including, for each of the plurality of videos:
a) receiving at least one respective negative aggregate query that does not correspond to the respective video; and
b) repeating the constructing-first-lattice(s), constructing-second-lattice(s), constructing-aggregate-lattice, and determining steps for each of the plurality of videos and respective negative aggregate queries to provide respective competition scores;
c) wherein the adjusting step includes forming a composite competition score using the determined respective competition scores and further adjusting the one or more of the lexicon parameter(s) based on the determined composite competition score.

15. The method according to claim 11, further including repeating the detecting, constructing-first-lattice(s), constructing-second-lattice(s), constructing-aggregate-lattice, and determining steps for a second aggregate query, wherein the second aggregate query includes a condition corresponding to a part of speech not found in the aggregate query.

16. The method according to claim 1, wherein the step of determining the respective aggregate score(s) of the one or more path(s) includes using substantially a Viterbi algorithm to determine the one of the path(s) through the aggregate lattice that is mathematically optimal.

17. A method of providing a description of a video, the method comprising automatically performing the following steps using a processor:
detecting one or more candidate object(s) in each of a plurality of frames of the video using image data of the plurality of frames;
generating a candidate description including one or more participant(s) and one or more condition(s) applied to the participant(s), the conditions and participants selected from a linguistic model;
constructing a plurality of respective component lattices corresponding to the participant(s) or condition(s), wherein at least one of the component lattices includes a node corresponding to one of the candidate objects detected in one of the frames of the video;
producing an aggregate lattice having a plurality of nodes, each of which includes a respective factor computed from corresponding nodes in a respective plurality of corresponding ones of the component lattices;
determining a score for the video with respect to the candidate description by determining an aggregate score for a path through the aggregate lattice;
if the aggregate score does not satisfy a termination condition, altering the candidate description by adding to it one or more participant(s) or condition(s) selected from the linguistic model, and repeating the constructing, producing, and determining steps with respect to the altered candidate description.

18. The method according to claim 17, wherein the determining step includes using substantially a Viterbi algorithm to determine the path through the aggregate lattice that is mathematically optimal.

19. A method of testing a video against an aggregate query, the video including image data of each of a plurality of frames, the method comprising automatically performing the following steps using a processor:
receiving an aggregate query defining one or more participant(s) and one or more condition(s) with respect to the participant(s);
detecting one or more candidate object(s) in each of the plurality of frames of the video;
providing a unified cost function using the detected candidate object(s) for computing how closely an input combination of the candidate object(s) corresponds to one or more object track(s) and how closely the corresponding one or more object track(s) correspond to the participant(s) and the condition(s);
determining whether the video corresponds to the aggregate query by mathematically optimizing the unified cost function to select a combination of the detected candidate object(s) that has an aggregate cost with respect to the participant(s) and the condition(s).

* * * * *